US012576585B2

(12) United States Patent
Stromenger et al.

(10) Patent No.: US 12,576,585 B2
(45) Date of Patent: Mar. 17, 2026

(54) ADDITIVE MANUFACTURING SYSTEMS WITH FIXED SUBSTRATES

(71) Applicant: Align Technology, Inc., San Jose, CA (US)

(72) Inventors: Shawn Scott Stromenger, Milpitas, CA (US); Michael Christopher Cole, San Jose, CA (US); Peter Dorfinger, Woodside, CA (US)

(73) Assignee: Align Technology, Inc., San Jose, CA (US)

( * ) Notice: Subject to any disclaimer, the term of this patent is extended or adjusted under 35 U.S.C. 154(b) by 146 days.

(21) Appl. No.: 18/495,159

(22) Filed: Oct. 26, 2023

(65) Prior Publication Data

US 2024/0140031 A1 May 2, 2024

Related U.S. Application Data

(60) Provisional application No. 63/381,098, filed on Oct. 26, 2022.

(51) Int. Cl.
B29C 64/223 (2017.01)
B29C 64/124 (2017.01)
(Continued)

(52) U.S. Cl.
CPC .......... B29C 64/223 (2017.08); B29C 64/124 (2017.08); B29C 64/147 (2017.08);
(Continued)

(58) Field of Classification Search
CPC ............................ B29C 64/223; B29C 64/147
See application file for complete search history.

(56) References Cited

U.S. PATENT DOCUMENTS 5,607,540 A * 3/1997 Onishi .................. B29C 64/147
156/235
6,210,162 B1 4/2001 Chishti et al.
(Continued)

FOREIGN PATENT DOCUMENTS

WO 2015075094 A1 5/2015
WO 2016078838 A1 5/2016
(Continued)

OTHER PUBLICATIONS

Weng, Zixiang et al., 3D printing of ultra-high viscosity resin by a linear scan-based vat photopolymerization system, Nature Communications, 2023, 14:4303, 9 pages.
(Continued)

*Primary Examiner* — Timothy Kennedy
(74) *Attorney, Agent, or Firm* — FORTEM IP LLP

(57) ABSTRACT

Systems, devices, and methods for additive manufacturing of objects are provided. In some embodiments, a system for fabricating an object includes a flexible substrate, a carriage coupled to the flexible substrate, an actuator, at least one recoater supported by the carriage, and an energy source. The flexible substrate can be configured to carry a precursor material. The carriage can vertically displace an active region of the flexible substrate away from a remaining region of the flexible substrate and toward a build platform. The actuator can be configured to move the carriage relative to the flexible substrate. The at least one recoater can be configured to apply the precursor material to the flexible substrate. The energy source can be configured to output energy toward the precursor material at the active region of the flexible substrate to form a portion of an object on the build platform.

20 Claims, 24 Drawing Sheets

(51) Int. Cl.

| | |
|---|---|
| *B29C 64/147* | (2017.01) |
| *B29C 64/214* | (2017.01) |
| *B29C 64/245* | (2017.01) |
| *B33Y 30/00* | (2015.01) |
| *B29L 31/00* | (2006.01) |

(52) U.S. Cl.
CPC .......... *B29C 64/214* (2017.08); *B29C 64/245* (2017.08); *B33Y 30/00* (2014.12); *B29L 2031/753* (2013.01)

(56) References Cited

U.S. PATENT DOCUMENTS

| | | | |
|---|---|---|---|
| 6,309,215 B1 | 10/2001 | Phan et al. | |
| 6,450,807 B1 | 9/2002 | Chishti et al. | |
| 6,497,574 B1 | 12/2002 | Miller | |
| 6,749,414 B1 | 6/2004 | Hanson et al. | |
| 6,830,450 B2 | 12/2004 | Knopp et al. | |
| 6,957,118 B2 | 10/2005 | Kopelman et al. | |
| 6,976,627 B1 | 12/2005 | Culp et al. | |
| 7,092,784 B1 | 8/2006 | Simkins | |
| 7,192,273 B2 | 3/2007 | McSurdy, Jr. | |
| 7,220,124 B2 | 5/2007 | Taub et al. | |
| 7,236,842 B2 | 6/2007 | Kopelman et al. | |
| 7,245,977 B1 | 7/2007 | Simkins | |
| 7,261,533 B2 | 8/2007 | Wrosz et al. | |
| 7,335,024 B2 | 2/2008 | Wen | |
| 7,384,266 B2 | 6/2008 | Wen | |
| 7,435,084 B2 | 10/2008 | Liu et al. | |
| 7,472,789 B2 | 1/2009 | Wu et al. | |
| 7,476,100 B2 | 1/2009 | Kuo | |
| 7,481,647 B2 | 1/2009 | Sambu et al. | |
| 7,604,181 B2 | 10/2009 | Culp et al. | |
| 7,641,828 B2 | 1/2010 | DeSimone et al. | |
| 7,648,360 B2 | 1/2010 | Kuo | |
| 7,674,422 B2 | 3/2010 | Kuo | |
| 7,711,447 B2 | 5/2010 | Lu et al. | |
| 7,748,199 B2 | 7/2010 | Sankaran et al. | |
| 7,802,987 B1 | 9/2010 | Phan | |
| 7,819,659 B2 | 10/2010 | Wen | |
| 7,831,322 B2 | 11/2010 | Liu et al. | |
| 7,840,373 B2 | 11/2010 | Culp et al. | |
| 7,892,474 B2 | 2/2011 | Shkolnik et al. | |
| 7,922,490 B2 | 4/2011 | Wen | |
| 7,957,824 B2 | 6/2011 | Boronvinskih et al. | |
| 8,019,465 B2 | 9/2011 | Spiridonov et al. | |
| 8,030,588 B2 | 10/2011 | Culp et al. | |
| 8,087,932 B2 | 1/2012 | Liu | |
| 8,540,501 B2* | 9/2013 | Yasukochi ............. | B33Y 10/00 425/374 |
| 8,636,513 B2 | 1/2014 | Wen | |
| 8,765,031 B2 | 7/2014 | Li et al. | |
| 8,776,391 B1 | 7/2014 | Kaza et al. | |
| 9,108,338 B2 | 8/2015 | Sirovskiy et al. | |
| 9,403,238 B2 | 8/2016 | Culp | |
| 9,700,385 B2 | 7/2017 | Webber | |
| 9,844,424 B2 | 12/2017 | Wu et al. | |
| 9,943,386 B2 | 4/2018 | Webber et al. | |
| 9,943,991 B2 | 4/2018 | Tanugula et al. | |
| 10,162,264 B2 | 12/2018 | McLeod et al. | |
| 10,336,102 B2 | 7/2019 | Cole | |
| 10,495,973 B2 | 12/2019 | Cole | |
| 10,537,406 B2 | 1/2020 | Wu et al. | |
| 10,783,629 B2 | 9/2020 | Parpara et al. | |
| 10,888,395 B2 | 1/2021 | Kopelman | |
| 10,993,783 B2 | 5/2021 | Wu et al. | |
| 11,045,283 B2 | 6/2021 | Riley et al. | |
| 11,103,330 B2 | 8/2021 | Webber et al. | |
| 11,189,021 B2 | 11/2021 | Shah et al. | |
| 11,273,011 B2 | 3/2022 | Shanjani et al. | |
| 11,295,444 B2 | 4/2022 | Cherkas et al. | |
| 11,318,667 B2 | 5/2022 | Mojdeh et al. | |
| 11,370,173 B2 | 6/2022 | Kelly et al. | |
| 11,420,362 B2 | 8/2022 | Mojdeh et al. | |
| 11,511,485 B2 | 11/2022 | Mojdeh et al. | |
| 11,534,277 B2 | 12/2022 | Chavez et al. | |
| 11,564,777 B2 | 1/2023 | Kopelman et al. | |
| 11,602,413 B2 | 3/2023 | Chen et al. | |
| 11,666,415 B2 | 6/2023 | Wang et al. | |
| 11,793,606 B2 | 10/2023 | Cam et al. | |
| 2004/0243361 A1 | 12/2004 | Steuben et al. | |
| 2006/0093982 A1 | 5/2006 | Wen | |
| 2006/0093987 A1 | 5/2006 | Wen | |
| 2006/0093993 A1 | 5/2006 | Wen | |
| 2006/0127850 A1 | 6/2006 | Wen | |
| 2006/0127857 A1 | 6/2006 | Liu et al. | |
| 2006/0127858 A1 | 6/2006 | Wen | |
| 2006/0127859 A1 | 6/2006 | Wen | |
| 2006/0127860 A1 | 6/2006 | Wen | |
| 2006/0172250 A1 | 8/2006 | Wen | |
| 2006/0199145 A1 | 9/2006 | Liu et al. | |
| 2007/0092853 A1 | 4/2007 | Liu et al. | |
| 2007/0243502 A1 | 10/2007 | Wen | |
| 2008/0083348 A1 | 4/2008 | Kuo et al. | |
| 2009/0148814 A1 | 6/2009 | Li et al. | |
| 2013/0241113 A1 | 9/2013 | Geers et al. | |
| 2014/0061974 A1 | 3/2014 | Tyler | |
| 2014/0265034 A1 | 9/2014 | Dudley | |
| 2015/0097315 A1 | 4/2015 | DeSimone et al. | |
| 2015/0266237 A1* | 9/2015 | Comb .................... | G03G 15/24 264/401 |
| 2016/0081769 A1 | 3/2016 | Kimura et al. | |
| 2017/0135792 A1 | 5/2017 | Webber | |
| 2017/0135793 A1 | 5/2017 | Webber et al. | |
| 2017/0165032 A1 | 6/2017 | Webber et al. | |
| 2018/0345578 A1* | 12/2018 | Enslow ................ | B29C 64/245 |
| 2019/0046297 A1 | 2/2019 | Kopelman et al. | |
| 2019/0298494 A1 | 10/2019 | Webber et al. | |
| 2020/0079025 A1* | 3/2020 | Rice ...................... | B29C 64/218 |
| 2020/0290262 A1 | 9/2020 | Aguilar Mendez et al. | |
| 2021/0030516 A1 | 2/2021 | O'Leary et al. | |
| 2021/0146619 A1 | 5/2021 | Shusteff et al. | |
| 2021/0187859 A1 | 6/2021 | Gmeiner et al. | |
| 2021/0259809 A1 | 8/2021 | O'Leary et al. | |
| 2022/0227051 A1 | 7/2022 | Regehly | |
| 2023/0111118 A1* | 4/2023 | Raventós Sánchez ..................... | B29C 64/236 264/308 |

FOREIGN PATENT DOCUMENTS

| | | |
|---|---|---|
| WO | 2017115076 A1 | 7/2017 |
| WO | 2018032022 A1 | 2/2018 |
| WO | 2020070639 A1 | 4/2020 |
| WO | 2020245456 A1 | 12/2020 |
| WO | 2021087061 A2 | 5/2021 |
| WO | 2021130657 A1 | 7/2021 |
| WO | 2021130661 A1 | 7/2021 |
| WO | 2022011456 A1 | 1/2022 |

OTHER PUBLICATIONS

Tillett, David, BCN3D introduces new 3D printing technology, Plastics Machinery & Manufacturing, Mar. 2, 2022, https://www.plasticsmachinerymanufacturing.com/additive-manufacturing/article/21258898/bcn3d-introduces-new-3d-printing-technology, 8 pages.
BCN3D, BCN3D unveils Viscous Lithography Manufacturing (VLM)™, a new resin-based 3D printing technology to unlock manufacturing autonomy, BCN3D Technologies, Inc., 2022, 9 pages.

* cited by examiner

700

710      716      702

730a                          730b
730c          728a            730d
730e          728b            730f
730g                          730h
730i                          730j 704
708                    736

800

810                  802
      816   828a          828b
830c                            830d 830a        804              830b
      808              836

1200 —

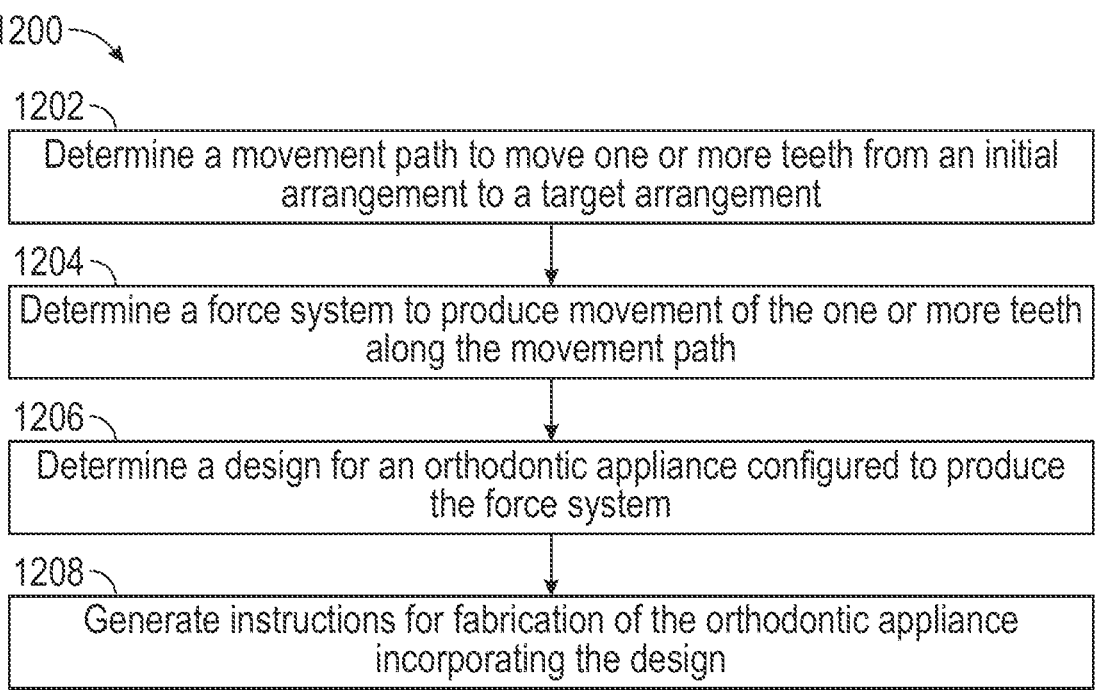

1202 —
Determine a movement path to move one or more teeth from an initial arrangement to a target arrangement 1204 —
Determine a force system to produce movement of the one or more teeth along the movement path 1206 —
Determine a design for an orthodontic appliance configured to produce the force system 1208 —
Generate instructions for fabrication of the orthodontic appliance incorporating the design

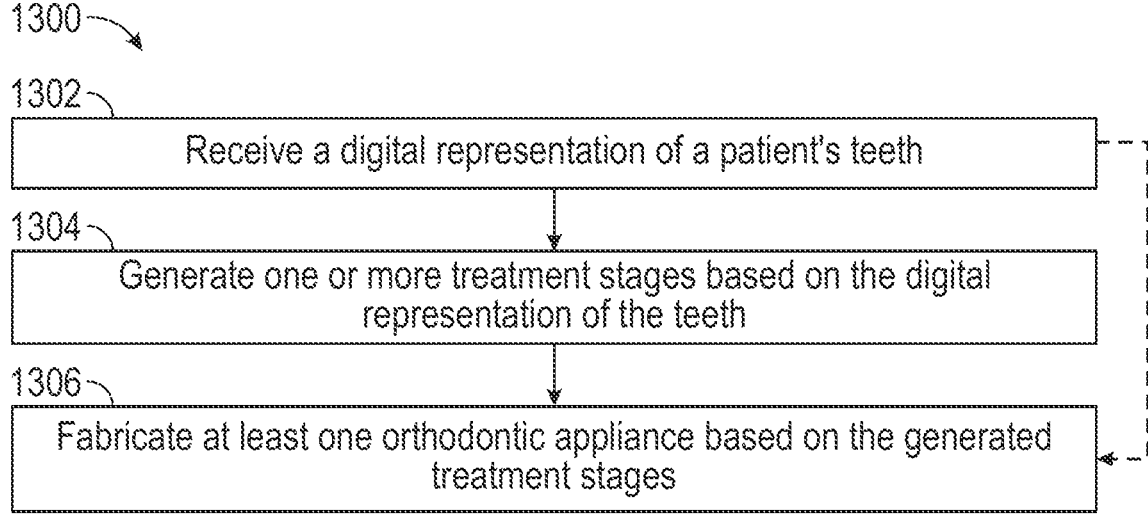

1302 —
Receive a digital representation of a patient's teeth

1304 —
Generate one or more treatment stages based on the digital representation of the teeth 1306 —
Fabricate at least one orthodontic appliance based on the generated treatment stages

FIG. 13

ADDITIVE MANUFACTURING SYSTEMS WITH FIXED SUBSTRATES

CROSS-REFERENCE TO RELATED APPLICATION(S)

The present application claims the benefit of priority to U.S. Provisional Application No. 63/381,098, filed Oct. 26, 2022, the disclosure of which is incorporated by reference herein in its entirety.

TECHNICAL FIELD

The present technology generally relates to additive manufacturing, and in particular, to additive manufacturing systems with fixed substrates.

BACKGROUND

Additive manufacturing encompasses a variety of technologies that involve building up 3D objects from multiple layers of material. Many conventional additive manufacturing systems use vat-based processes in which the object is formed from a large tank of photopolymerizable resin. However, such processes may require significant amounts of resin, may lack sufficient print accuracy, and may not be compatible with resins that exhibit desirable mechanical properties when polymerized. As an alternative, some additive manufacturing systems form the object from a thin layer of resin that circulates on a loop of carrier film. The loop typically includes a seam where the ends of the film are joined together, which may interfere with the print. Other shortcomings of additive manufacturing systems that use a film loop include: limited choice of materials for the film (e.g., restricted to materials that are capable of forming a good seam); inability to print in multiple directions, thus resulting in slower print speeds; film replacement is time-consuming and cannot be performed during a print cycle; and challenges in synchronizing the print process with the movement of the film loop.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

FIG. 12 illustrates a method for designing an orthodontic appliance, in accordance with embodiments of the present technology.

FIG. 13 illustrates a method for digitally planning an orthodontic treatment and/or design or fabrication of an appliance, in accordance with embodiments of the present technology.

DETAILED DESCRIPTION

Figure 1:
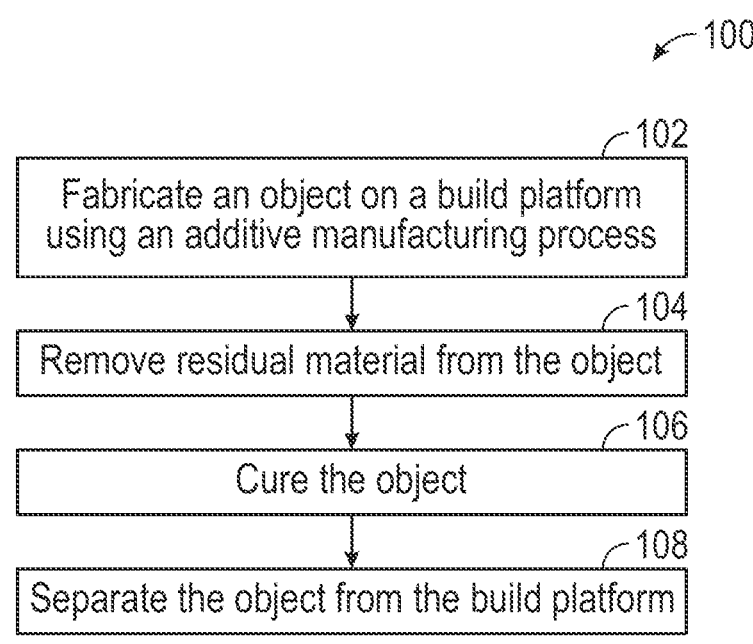
FIG. 1 is a flow diagram providing a general overview of a method for fabricating and post-processing an additively manufactured object, in accordance with embodiments of the present technology.

The present technology relates to systems, methods, and devices for additive manufacturing of objects. In some embodiments, for example, a system for fabricating an object includes a flexible substrate (e.g., a film) configured to carry a precursor material (e.g., a photopolymerizable resin), and a carriage coupled to the flexible substrate. The carriage can vertically displace an active region of the flexible substrate (e.g., an active print surface) away from a remaining region of the flexible substrate (e.g., one or more inactive or idle surfaces) and toward a build platform. The system can also include an actuator configured to move the carriage relative to the flexible substrate (e.g., in first and second lateral directions), such that the section of the flexible substrate corresponding to the active region changes as the carriage moves. The system can also include at least recoater supported by the carriage and configured to apply the precursor material to the flexible substrate. For example, the carriage can include a pair of recoaters respectively located at opposite sides of the carriage, with each recoater alternating between applying material to and removing material from the flexible substrate, depending on the movement direction of the carriage. Additionally, the system can include an energy source configured to output energy (e.g., light) toward the precursor material on the active region of the flexible substrate to form a portion of an object on the build platform.

The present technology can provide numerous advantages over conventional additive manufacturing systems. For example, the embodiments described herein can use a linear flexible substrate, rather than a flexible substrate connected into a loop, thus eliminating the constraint that the flexible substrate be made out of materials that can form a smooth seam. The embodiments herein can also allow the flexible substrate to be replaced during system operation, which can be beneficial when using precursor materials that may damage the flexible substrate over time, and/or when the flexible substrate is made out of a material that is more susceptible to such damage. Thus, the embodiments herein can accommodate a wider range of precursor materials and flexible substrate types. Additionally, the embodiments herein can allow for bidirectional printing, thus providing a higher print speed.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

As used herein, the terms "vertical," "lateral," "upper," "lower," "left," "right," etc., can refer to relative directions or positions of features of the embodiments disclosed herein in view of the orientation shown in the Figures. For example, "upper" or "uppermost" can refer to a feature positioned closer to the top of a page than another feature. These terms, however, should be construed broadly to include embodiments having other orientations, such as inverted or inclined orientations where top/bottom, over/under, above/below, up/down, and left/right can be interchanged depending on the orientation.

The headings provided herein are for convenience only and do not interpret the scope or meaning of the claimed present technology. Embodiments under any one heading may be used in conjunction with embodiments under any other heading.

I. Overview of Additive Manufacturing Technology

FIG. 1 is a flow diagram providing a general overview of a method 100 for fabricating and post-processing an additively manufactured object, in accordance with embodiments of the present technology. The method 100 can be used to produce many different types of additively manufactured objects, such as orthodontic appliances (e.g., aligners, palatal expanders, retainers, attachment placement devices, attachments), restorative objects (e.g., crowns, veneers, implants), and/or other dental appliances (e.g., oral sleep apnea appliances, mouth guards). Additional examples of dental appliances and associated methods that are applicable to the present technology are described in Section III below.

The method 100 begins at block 102 with fabricating an object on a build platform using an additive manufacturing process. The additive manufacturing process can implement any suitable technique known to those of skill in the art. Additive manufacturing (also referred to herein as "3D printing") includes a variety of technologies which fabricate 3D objects directly from digital models through an additive process. In some embodiments, additive manufacturing includes depositing a precursor material onto a build platform. The precursor material can be cured, polymerized, melted, sintered, fused, and/or otherwise solidified to form a portion of the object and/or to combine the portion with previously formed portions of the object. In some embodiments, the additive manufacturing techniques provided herein build up the object geometry in a layer-by-layer fashion, with successive layers being formed in discrete build steps. Alternatively or in combination, the additive manufacturing techniques described herein can allow for continuous build-up of an object geometry.

Examples of additive manufacturing techniques include, but are not limited to, the following: (1) vat photopolymerization, in which an object is constructed from a vat or other bulk source of liquid photopolymer resin, including techniques such as stereolithography (SLA), digital light processing (DLP), continuous liquid interface production (CLIP), two-photon induced photopolymerization (TPIP), and volumetric additive manufacturing; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) material extrusion, in which material is drawn though a nozzle, heated, and deposited layer-by-layer, such as fused deposition modeling (FDM) and direct ink writing (DIW); (5) powder bed fusion, including techniques such as direct metal laser sintering (DMLS), electron beam melting (EBM), selective heat sintering (SHS), selective laser melting (SLM), and selective laser sintering (SLS); (6) sheet lamination, including techniques such as laminated object manufacturing (LOM) and ultrasonic additive manufacturing (UAM); and (7) directed energy deposition, including techniques such as laser engineering net shaping, directed light fabrication, direct metal deposition, and 3D laser cladding. Optionally, an additive manufacturing process can use a combination of two or more additive manufacturing techniques.

For example, the additively manufactured object can be fabricated using vat photopolymerization process in which light is used to selectively cure a vat or other bulk source of a curable material (e.g., a polymeric resin). Each layer of curable material can be selectively exposed to light in a single exposure (e.g., DLP) or by scanning a beam of light across the layer (e.g., SLA). Vat polymerization can be performed in a "top-down" or "bottom-up" approach, depending on the relative locations of the material source, light source, and build platform.

As another example, the additively manufactured object can be fabricated using high temperature lithography (also known as "hot lithography"). High temperature lithography can include any photopolymerization process that involves heating a photopolymerizable material (e.g., a polymeric resin). For example, high temperature lithography can involve heating the material to a temperature of at least 30° C., 40° C., 50° C., 60° C., 70° C., 80° C., 90° C., 100° C., 110° C., or 120° C. In some embodiments, the material is heated to a temperature within a range from 50° C. to 120° C., from 90° C. to 120° C., from 100° C. to 120° C., from 105° C. to 115° C., or from 105° C. to 110° C. The heating can lower the viscosity of the photopolymerizable material before and/or during curing, and/or increase reactivity of the photopolymerizable material. Accordingly, high temperature lithography can be used to fabricate objects from highly viscous and/or poorly flowable materials, which, when cured, may exhibit improved mechanical properties (e.g., stiffness, strength, stability) compared to other types of materials. For example, high temperature lithography can be used to fabricate objects from a material having a viscosity of at least 5 Pa-s, 10 Pa-s, 15 Pa-s, 20 Pa-s, 30 Pa-s, 40 Pa-s, or 50 Pa-s at 20° C. Representative examples of high-temperature lithography processes that may be incorporated in the methods herein are described in International Publication Nos. WO 2015/075094, WO 2016/078838, WO 2018/032022, WO 2020/070639, WO 2021/130657, and WO 2021/130661, the disclosures of each of which are incorporated herein by reference in their entirety.

In some embodiments, the additively manufactured object is fabricated using continuous liquid interphase production (also known as "continuous liquid interphase printing") in which the object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Representative examples of continuous liquid interphase production processes that may be incorporated in the methods herein are described in U.S. Patent Application Publication Nos. 2015/0097315, 2015/0097316, and 2015/0102532, the disclosures of each of which are incorporated herein by reference in their entirety.

As another example, a continuous additive manufacturing method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety. In another example, a continuous additive manufacturing method can involve extruding a composite material composed of a curable liquid material surrounding a solid strand. The composite material can be extruded along a continuous three-dimensional path in order to form the object. Such methods are described in U.S. Pat. No. 10,162,264 and U.S. Patent Application Publication No. 2014/0061974, the disclosures of which are incorporated herein by reference in their entirety. In yet another example, a continuous additive manufacturing method can utilize a "heliolithography" approach in which the liquid photopolymer is cured with focused radiation while the build platform is continuously rotated and raised.

Accordingly, the object geometry can be continuously built up along a spiral build path. Such methods are described in U.S. Patent Application Publication No. 2014/0265034, the disclosure of which is incorporated herein by reference in its entirety.

In a further example, the additively manufactured object can be fabricated using a volumetric additive manufacturing (VAM) process in which an entire object is produced from a 3D volume of resin in a single print step, without requiring layer-by-layer build up. During a VAM process, the entire build volume is irradiated with energy, but the projection patterns are configured such that only certain voxels will accumulate a sufficient energy dosage to be cured. Representative examples of VAM processes that may be incorporated into the present technology include tomographic volumetric printing, holographic volumetric printing, multiphoton volumetric printing, and xolography. For instance, a tomographic VAM process can be performed by projecting 2D optical patterns into a rotating volume of photosensitive material at perpendicular and/or angular incidences to produce a cured 3D structure. A holographic VAM process can be performed by projecting holographic light patterns into a stationary reservoir of photosensitive material. A xolography process can use photoswitchable photoinitiators to induce local polymerization inside a volume of photosensitive material upon linear excitation by intersecting light beams of different wavelengths. Additional details of VAM processes suitable for use with the present technology are described in U.S. Pat. No. 11,370,173, U.S. Patent Application Publication No. 2021/0146619, U.S. Patent Application Publication No. 2022/0227051, International Publication No. WO 2017/115076, International Publication No. WO 2020/245456, International Publication No. WO 2022/011456, and U.S. Provisional Patent Application No. 63/181,645, the disclosures of each of which are incorporated herein by reference in their entirety.

In yet another example, the additively manufactured object can be fabricated using a powder bed fusion process (e.g., selective laser sintering) involving using a laser beam to selectively fuse a layer of powdered material according to a desired cross-sectional shape in order to build up the object geometry. As another example, the additively manufactured object can be fabricated using a material extrusion process (e.g., fused deposition modeling) involving selectively depositing a thin filament of material (e.g., thermoplastic polymer) in a layer-by-layer manner in order to form an object. In yet another example, the additively manufactured object can be fabricated using a material jetting process involving jetting or extruding one or more materials onto a build surface in order to form successive layers of the object geometry.

The additively manufactured object can be made of any suitable material or combination of materials. As discussed above, in some embodiments, the additively manufactured object is made partially or entirely out of a polymeric material, such as a curable polymeric resin. The resin can be composed of one or more monomer components that are initially in a liquid state. The resin can be in the liquid state at room temperature (e.g., 20° C.) or at an elevated temperature (e.g., a temperature within a range from 50° C. to 120° C.). When exposed to energy (e.g., light), the monomer components can undergo a polymerization reaction such that the resin solidifies into the desired object geometry. Representative examples of curable polymeric resins and other materials suitable for use with the additive manufacturing techniques herein are described in International Publication Nos. WO 2019/006409, WO 2020/070639, and WO 2021/

087061, the disclosures of each of which are incorporated herein by reference in their entirety.

Optionally, the additively manufactured object can be fabricated from a plurality of different materials (e.g., at least two, three, four, five, or more different materials). The materials can differ from each other with respect to composition, curing conditions (e.g., curing energy wavelength), material properties before curing (e.g., viscosity), material properties after curing (e.g., stiffness, strength, transparency), and so on. In some embodiments, the additively manufactured object is formed from multiple materials in a single manufacturing step. For instance, a multi-tip extrusion apparatus can be used to selectively dispense multiple types of materials from distinct material supply sources in order to fabricate an object from a plurality of different materials. Examples of such methods are described in U.S. Pat. Nos. 6,749,414 and 11,318,667, the disclosures of which are incorporated herein by reference in their entirety. Alternatively or in combination, the additively manufactured object can be formed from multiple materials in a plurality of sequential manufacturing steps. For instance, a first portion of the object can be formed from a first material in accordance with any of the fabrication methods herein, then a second portion of the object can be formed from a second material in accordance with any of the fabrication methods herein, and so on, until the entirety of the object has been formed.

After the additively manufactured object is fabricated, the object can undergo one or more additional process steps, also referred to herein as "post-processing." As described in detail below with respect to blocks 104-108, post-processing can include removing residual material from the object, curing the object, and/or separating the object from the build platform.

For example, at block 104, the method 100 continues with removing residual material from the object. The excess material can include excess precursor material (e.g., uncured resin) and/or other unwanted material (e.g., debris) that remains on or within the object after the additive manufacturing process. The residual material can be removed in many different ways, such as by exposing the object to a solvent (e.g., via spraying, immersion), heating or cooling the object, applying a vacuum to the object, blowing a pressurized gas onto the object, applying mechanical forces to the object (e.g., vibration, agitation, centrifugation, tumbling, brushing), and/or other suitable techniques. Optionally, the residual material can be collected and/or processed for reuse.

At block 106, the method 100 can optionally include curing the object. This additional curing step (also known as "post-curing") can be used in situations where the object is still in a partially cured "green" state after fabrication. For example, the energy used to fabricate the object in block 102 may only partially polymerize the precursor material forming the object. Accordingly, the post-curing step may be needed to fully cure (e.g., fully polymerize) the object to its final, usable state. Post-curing can provide various benefits, such as improving the mechanical properties (e.g., stiffness, strength) and/or temperature stability of the object. Post-curing can be performed by heating the object, applying radiation (e.g., UV, visible, microwave) to the object, or suitable combinations thereof. In other embodiments, however, the post-curing process of block 106 is optional and can be omitted.

At block 108, the method 100 can include separating the object from the build platform. The build platform can mechanically support the object during fabrication and/or the post-processing steps described herein. The object can be connected to the build platform via a sacrificial region of material (e.g., supports and/or a raft), and/or can be directly connected to the build platform without any sacrificial regions.

The method 100 illustrated in FIG. 1 can be modified in many different ways. For example, although the above steps of the method 100 are described with respect to a single object, the method 100 can be used to sequentially or concurrently fabricate and post-process any suitable number of objects, such as tens, hundreds, or thousands of additively manufactured objects. As another example, the ordering of the processes shown in FIG. 1 can be varied (e.g., the process of block 108 can be performed before and/or concurrently with the processes of blocks 104 and/or 106). Some of the processes of the method 100 can be omitted, such as the process of block 106.

Additionally, the method 100 can include processes not shown in FIG. 1, such as cleaning the object (e.g., washing, solvent extraction), annealing the object, trimming the object to remove structures that are not intended to be present in the final product, and/or packaging the object for shipment. Optionally, the method 100 can include modifying at least one surface of the object. The surface modifications can be applied to some or all of the surfaces of the object (e.g., the exterior and/or interior surfaces) to alter one or more surface characteristics, such as the surface finish (e.g., roughness, waviness, lay), porosity, visual appearance (e.g., gloss, transparency, visibility of print lines), hydrophobicity, and/or chemical reactivity. In some embodiments, the surface modifications include removing material from the object, e.g., by polishing, abrading, blasting, etc. Alternatively or in combination, the surface modifications can include applying an additional material to the object. For example, the additional material can be a coating, such as a polymeric coating. The coating can be applied to one or more surfaces of the object for various purposes, including, but not limited to: providing a smooth surface finish, which can be beneficial for aesthetics and/or to improve user comfort if the object is intended to be in contact with the user's body (e.g., an orthodontic appliance worn on the teeth); coloring and/or applying other aesthetic features to the object; improving scratch resistance and/or other mechanical properties; providing antimicrobial properties; and incorporating therapeutic agents into the object for controlled release.

Figure 2:
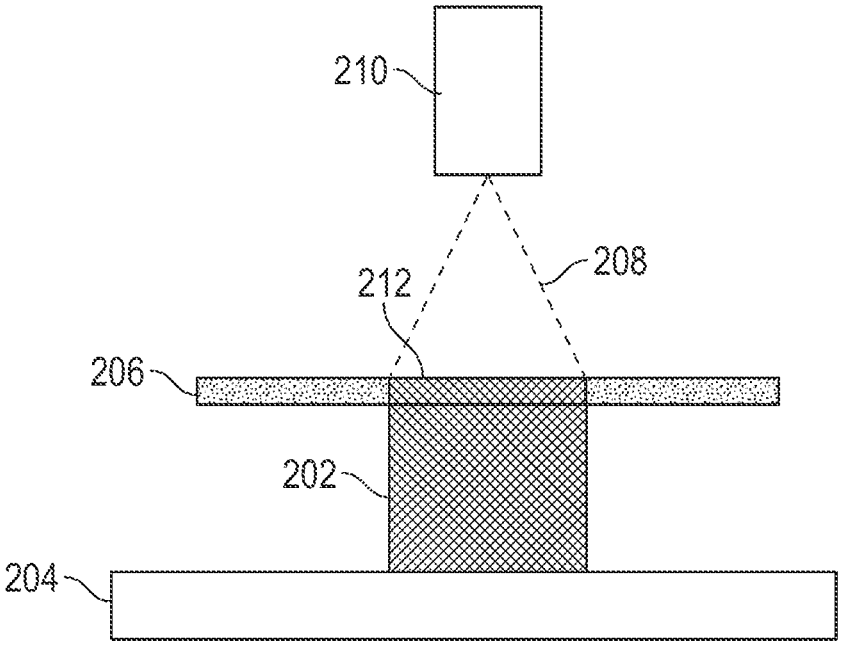
FIG. 2 is a partially schematic diagram providing a general overview of an additive manufacturing process, in accordance with embodiments of the present technology.

FIG. 2 is a partially schematic diagram providing a general overview of an additive manufacturing process, in accordance with embodiments of the present technology. In the illustrated embodiment, an object 202 is fabricated on a build platform 204 (e.g., a print bed, tray, plate, film, sheet, or other planar substrate) from a series of cured material layers, with each layer having a geometry corresponding to a respective cross-section of the object 202. To fabricate an individual object layer, a layer of uncured material 206 (e.g., polymerizable resin) is brought into contact with the build platform 204 (when fabricating the first layer of the object 202) or with the previously formed portion of the object 202 on the build platform 204 (when fabricating subsequent layers of the object 202). In some embodiments, the uncured material 206 is formed on and supported by a substrate (not shown), such as a film. Energy 208 (e.g., light) from an energy source 210 (e.g., a laser, projector, or light engine) is then applied to the uncured material 206 to form a cured material layer 212 on the build platform 204 or on the object 202. The remaining uncured material 206 can then be moved away from the build platform 204 (e.g., by lowering the build platform 204 and/or by raising the uncured material 206), thus leaving the cured material layer 212 in place on the build platform 204 and/or object 202. The fabrication process can then be repeated with a fresh layer of uncured material 206 to build up the next layer of the object 202.

The illustrated embodiment shows a "top down" configuration in which the energy source 210 is positioned above and directs the energy 208 down toward the build platform 204, such that the object 202 is formed on the upper surface of the build platform 204. Accordingly, the build platform 204 can be incrementally lowered relative to the energy source 210 as successive layers of the object 202 are formed. In other embodiments, however, the additive manufacturing process of FIG. 2 can be performed using a "bottom up" configuration in which the energy source 210 is positioned below and directs the energy 208 up toward the build platform 204, such that the object 202 is formed on the lower surface of the build platform 204. Accordingly, the build platform 204 can be incrementally raised relative to the energy source 210 as successive layers of the object 202 are formed.

Although FIG. 2 illustrates a representative example of an additive manufacturing process, this is not intended to be limiting, and the embodiments described herein can be adapted to other types of additive manufacturing systems (e.g., vat-based systems) and/or other types of additive manufacturing processes (e.g., material jetting, binder jetting, material extrusion, powder bed fusion, sheet lamination, directed energy deposition).

Figure 3A:
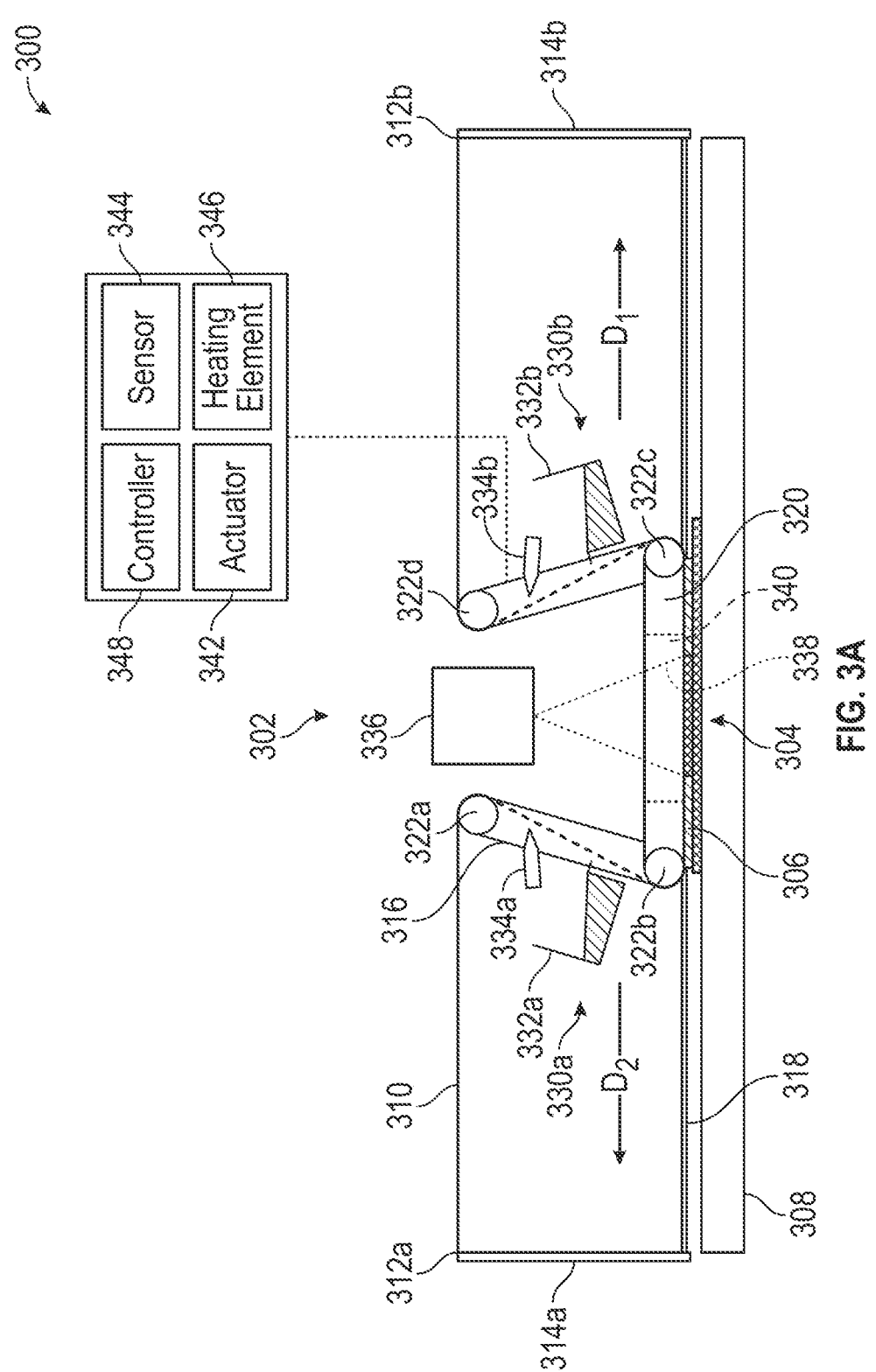
FIG. 3A is a partially schematic diagram showing a side view of a system for additive manufacturing configured in accordance with embodiments of the present technology.
Figure 3B:
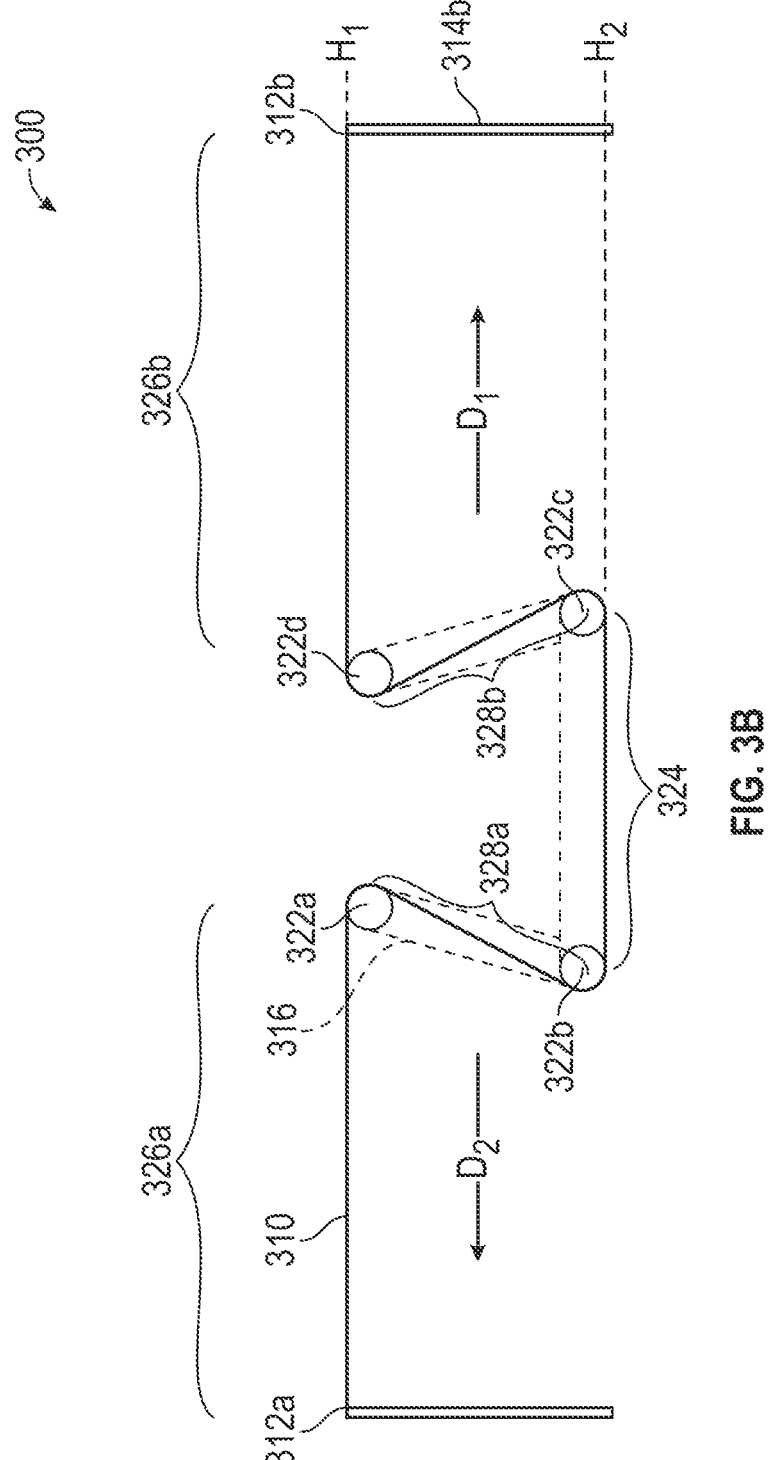
FIG. 3B is a simplified view of the system of FIG. 3A.

II. Additive Manufacturing Systems with Fixed Substrates and Associated Methods FIGS. 3A-3H are partially schematic diagrams providing a general overview of an additive manufacturing system 300 ("system 300"), in accordance with embodiments of the present technology. Specifically, FIG. 3A illustrates the components of the system 300, FIG. 3B is a simplified view of the system 300, and FIGS. 3C-3H illustrate the operation of the system 300.

Referring first to FIG. 3A, the system 300 includes a printer assembly 302 configured to fabricate one or more objects 304, such as one or more orthodontic appliances (e.g., aligners, palatal expanders, attachment placement devices, attachments, retainers, mouth guards). The printer assembly 302 is configured to deposit a precursor material 306 (e.g., a polymeric resin, or other curable and/or solidifiable material) on a build platform 308 (e.g., a print bed, tray, plate, film, sheet, or other planar substrate) to form the object 304.

The system 300 includes a flexible substrate 310 (e.g., a film, sheet, strip, tape) configured to carry a layer of the precursor material 306 on a surface thereof. The flexible substrate 310 can be made out of a material that is sufficiently adherent to allow the precursor material 306 to be coated thereon, but also allows for removal of the precursor material 306 after curing and/or via mechanical techniques such as scraping. In some embodiments, the flexible substrate 310 is made partially or entirely out of a polymeric material, such as polytetrafluoroethylene (PTFE). Optionally, the flexible substrate 310 can be a single continuous piece of material, e.g., without seams or other discontinuities resulting from joining multiple pieces of material together.

In the illustrated embodiment, the flexible substrate 310 is an elongate structure extending from a first end 312a to a second end 312b opposite the first end 312a. The length of the flexible substrate 310 as measured between the first end 312a and the second end 312b can be at least 10 cm, 20 cm, 30 cm, 40 cm, 50 cm, 60 cm, 70 cm, 80 cm, 90 cm, or 1 m. The first end 312a and second end 312b can be respectively coupled to a first support 314a and a second support 314b (e.g., posts, frames, struts). The first end 312a and second end 312b can be fixed in a stationary position relative while the printer assembly 302 is operating.

In some embodiments, the printer assembly 302 includes a printer carriage 316 coupled to the flexible substrate 310. The printer carriage 316 can be configured to move relative to the flexible substrate 310, e.g., along one or more lateral directions. For example, in the illustrated embodiment, the printer carriage 316 is movable along a first direction $D_1$ toward the second end 312b of the flexible substrate 310 and/or along a second, opposite direction $D_2$ toward the first end 312a of the flexible substrate 310. Optionally, the system 300 can include a set of rails 318 extending laterally (e.g., parallel to the length of the flexible substrate 310) to guide the movement of the printer carriage 316. The printer carriage 316 can be slidably coupled to the rails 318 (e.g., via bearings, wheels, or other connecting elements—not shown) so that the printer carriage 316 is constrained to move along the rails 318.

The printer carriage 316 can include a frame 320 that supports the components of the printer carriage 316. For example, the printer carriage 316 can include a plurality of rollers 322a-322d (collectively, "rollers 322") for coupling to the flexible substrate 310. In the illustrated embodiment, for example, the carriage includes four rollers 322 mounted on the frame 320: a first roller 322a located at an upper left portion of the printer carriage 316; a second roller 322b located at a lower left portion of the printer carriage 316; a third roller 322c located at a lower right portion of the printer carriage 316; and a fourth roller 322d located at an upper right portion of the printer carriage 316. The first roller 322a and fourth roller 322d may be referred to herein as "idle rollers," and the second roller 322b and third roller 322c may be referred to herein as "peel rollers." The flexible substrate 310 can extend at least partially around each roller 322. For example, the flexible substrate 310 can extend continuously from the first end 312a to the first roller 322a, then to the second roller 322b, then to the third roller 322c, then to the fourth roller 322d, and then to the second end 312b.

In other embodiments, however, the printer carriage 316 can include a different number of rollers 322. For example, there can be additional rollers between the idle rollers and the peel rollers. Moreover, some or all of the rollers 322 illustrated in FIG. 3A can instead be located at different portions of the printer carriage 316.

Referring next to FIG. 3B (in which selected components of the system 300 have been omitted for clarity), the coupling between the printer carriage 316 and the flexible substrate 310 can define a plurality of functional regions of the flexible substrate 310. For example, the printer carriage 316 can displace a region of the flexible substrate 310 ("active region 324") away from one or more remaining regions of the flexible substrate 310 and toward the build platform 308. As shown in FIG. 3A, the build platform 308 can be located below the printer carriage 316, such that the printer carriage 316 displaces the active region 324 downward relative to the rest of the flexible substrate 310. The active region 324 can be the region of the flexible substrate 310 that extends between the second roller 322b and the third roller 322c. As shown in FIG. 3B, the active region 324 can be a generally horizontal segment of the flexible substrate 310 that is pushed by the printer carriage 316 to a displaced vertical position (e.g., height H 2) proximate to the build platform 308 (e.g., proximate to the upper surface of the build platform 308 and/or to a previously formed portion of the object 304 on the build platform 308). The active region 324 can be the active surface of the flexible substrate 310 where the precursor material 306 is cured to form the object 304, as described further below.

The remaining regions of the flexible substrate 310 can include a first idle region 326a and a second idle region 326b. The first and second idle regions 326a, 326b of the flexible substrate 310 can be generally horizontal segments that remain at an initial vertical position (e.g., height Hi) away from the build platform 308. The initial vertical position can be higher than the displaced vertical position and can correspond to the vertical positions of the first and second ends 312a, 312b of the flexible substrate 310. In some embodiments, the first idle region 326a extends from the first end 312a of the flexible substrate 310 to the first roller 322a, and the second idle region 326b extends from the fourth roller 322d to the second end 312b of the flexible substrate 310. The first and second idle regions 326a, 326b can be inactive or idle surfaces of the flexible substrate 310 that are not currently carrying any precursor material 306, as described further below.

The remaining regions of the flexible substrate 310 can also include a first intermediate region 328a and a second intermediate region 328b. The first intermediate region 328a can be located between the first idle region 326a and the active region 324, and the second intermediate region 328b can be located between the active region 324 and the second idle region 326b. As shown in FIG. 3B, the first intermediate region 328a is located at the left side of the printer carriage 316 and extends between the first roller 322a and the second roller 322b; and the second intermediate region 328b is located at the right side of the printer carriage 316 and extends between the third roller 322c and the fourth roller 322d. The first and second intermediate regions 328a, 328b can be angled segments that connect the first and second idle regions 326a, 326b to the active region 324, respectively. Accordingly, the first and second intermediate regions 328a, 328b can each include one end at or near the initial vertical position (e.g., height Hi) and another end at or near the displaced vertical position (e.g., height H 2). The first and second intermediate regions 328a, 328b can include surfaces of the flexible substrate 310 where precursor material 306 is applied and/or removed, as described further below. The angle of each intermediate region 328a, 328b can be selected to facilitate application and/or removal of the precursor material 306. For example, the angle of each intermediate region 328a, 328b as measured from vertical can be at least 2°, 5°, 10°, 15°, 20°, 25°, 30°, 35°, 40°, 45°, 50°, or 60°.

In some embodiments, when the printer carriage 316 moves, the rollers 322 rotate so that the flexible substrate 310 moves relative to the carriage. Accordingly, the sections of the flexible substrate 310 corresponding to the active region 324, first idle region 326a, second idle region 326b, first intermediate region 328a, and second intermediate region 328b can change as the printer carriage 316 moves. For example, when the printer carriage 316 is moving in the first direction D₁, the section of the flexible substrate 310 that was at the second idle region 326b can advance partially or entirely into the second intermediate region 328b, the section of the flexible substrate 310 that was at the second intermediate region 328b can advance partially or entirely into the active region 324, the section of the flexible substrate 310 that was at the active region 324 can advance partially or entirely into the first intermediate region 328a, and/or the section of the flexible substrate 310 that was at the first intermediate region 328a can advance partially or entirely into the first idle region 326a. Conversely, when the printer carriage 316 is moving in the second direction D₂, the section of the flexible substrate 310 that was at the first idle region 326a can advance partially or entirely into the first intermediate region 328a, the section of the flexible substrate 310 that was at the first intermediate region 328a can advance partially or entirely into the active region 324, the section of the flexible substrate 310 that was at the active region 324 can advance partially or entirely into the second intermediate region 328b, and/or the section of the flexible substrate 310 that was at the second intermediate region 328b can advance partially or entirely into of the second idle region 326b. The movement of the flexible substrate 310 relative to the printer carriage 316 can thus be used to circulate the precursor material 306 to the active region 324 for forming the object 304, as described further below.

Referring again to FIG. 3A, the printer carriage 316 can include at least one material source configured to apply the precursor material 306 to the flexible substrate 310. For example, the printer carriage 316 can include a first recoater 330a and a second recoater 330b that are coupled to the frame 320. The first recoater 330a and second recoater 330b can be located at opposite sides of the printer carriage 316. In the illustrated embodiment, the first recoater 330a is located at the left side of the printer carriage 316 proximate to the first intermediate region 328a of the flexible substrate 310, and the second recoater 330b is located at the right side of the printer carriage 316 proximate to the second intermediate region 328b of the flexible substrate 310.

The first and second recoaters 330a, 330b can include respective reservoirs 332a, 332b (collectively, "reservoirs 332") for storing and applying the precursor material 306 to the respective intermediate regions 328a, 328b of the flexible substrate 310. The reservoirs 332 can be or include tanks, vats, bottles, bags, or any other suitable container for holding a volume of the precursor material 306. Optionally, each reservoir 332 can include or be coupled to a fill control mechanism (e.g., pump, displacement block, or other component for moving fluid—not shown) configured to adjust the level of the precursor material 306 in the reservoir. In some embodiments, the first and second recoaters 330a, 330b also include nozzles, ports, channels, spouts, etc., to direct the precursor material 306 out of the respective reservoirs and onto the surface of the flexible substrate 310. The first and second recoaters 330a, 330b can also include one or more blades (e.g., doctor blades, recoater blades) that smooth the deposited precursor material 306 into a relatively thin, uniform layer. For example, the precursor material 306 can be formed into a layer having a thickness within a range from 200 microns to 300 microns, or any other desired thickness.

In some embodiments, the first and second recoaters 330a, 330b also include respective decoaters 334a, 334b (collectively, "decoaters 334") for removing the precursor material 306 from the respective intermediate regions 328a, 328b of the flexible substrate 310. The decoaters 345 can be or include scrapers, blades (e.g., doctor blades), or any other device suitable for removing the layer of precursor material 306 from the surface of the flexible substrate 310. Optionally, each decoater 334 can direct the removed precursor material 306 back into the corresponding reservoir 332 for reuse. Additional features and examples of recoaters and decoaters suitable for use with the present technology are described further below.

The printer assembly 302 also includes an energy source 336 (e.g., a projector or light engine) configured to output energy 338 (e.g., light, such as UV light) to cure or otherwise solidify the precursor material 306 into a portion of the object 304. In the illustrated embodiment, the energy source 336 is supported by the printer carriage 316 and is mounted on the frame 320 so that the energy 338 is directed downward toward the active region 324 of the flexible substrate 310. The frame 320 can include an aperture 340 (e.g., window, opening, gap) formed therein to allow the energy 338 to pass through. The flexible substrate 310 can be partially or completely transparent to the wavelength of the energy 338 to allow the energy 338 to pass through the active region 324 and onto the portion of the precursor material 306 carried by the active region 324. During operation, the energy 338 can be patterned or scanned in a suitable pattern onto the precursor material 306, thus forming a layer of solidified (e.g., cured) material onto the build platform 308 (any reference herein to forming an element "onto" or "on" the build platform 308 can refer to forming the element directly on the surface of the build platform 308, and/or can refer to forming the element directly on another element that is supported by the build platform 308 (such as a previously formed layer of material)). The geometry of the solidified material can correspond to the desired cross-sectional geometry for the object 304.

The system 300 can include additional functional components that are included in and/or operably coupled to the printer assembly 302, such as at least one actuator 342, at least one sensor 344, at least one heating element 346, and/or a controller 348 (these components are shown schematically in FIG. 3A for purposes of simplicity). For example, the actuator 342 can be or include a motor or other mechanism configured to actuate the movement of the printer carriage 316 relative to the flexible substrate 310. Optionally, the system 300 can include multiple actuators 342 that actuate the movement of other components of the system 300, such as the flexible substrate 310, build platform 308, first recoater 330a, second recoater 330b, reservoirs 332, decoaters 334, and/or energy source 336.

The sensor 344 can be configured to monitor the status of one or more components of the system 300, such as the amount of precursor material 306 in the reservoirs 332, the temperature of the precursor material 306, the position of the printer carriage 316, the position of the build platform 308, the state of the flexible substrate 310 (e.g., whether the flexible substrate 310 is damaged, abraded, or otherwise should be replaced), the energy output of the energy source 336, etc. The system 300 can include any suitable number of sensors 344, such as one, two, three, four, five, or more sensors 344. The sensors 344 can be located proximate to and/or coupled to any suitable portion of the system 300, such as on or near the build platform 308, printer assembly 302, flexible substrate 310, printer carriage 316, frame 320, rollers 322, first recoater 330a, second recoater 330b, reservoirs 332, decoaters 334, energy source 336, and/or actuator 342. Examples of sensor types suitable for use with the system 300 include, but are not limited to: position sensors, angle sensors (e.g., rotary encoders), motion sensors (e.g., accelerometers, gyroscopes), distance and/or proximity sensors (e.g., ultrasonic sensors, time-of-flight sensors, rangefinders), fluid level sensors, pressure sensors, flow sensors, temperature sensors, imaging devices (e.g., cameras), and optical sensors (e.g., refractometers, spectrophotometers).

The heating element 346 (e.g., heat lamp, heater plate, adhesive heater, thermoelectric heater) can be used to heat one or more components of the system 300 to a desired temperature. In some embodiments, for example, the system 300 is used in a high temperature lithography process utilizing a highly viscous precursor material 306 (e.g., a highly viscous resin), as described further below. Accordingly, the heating element 346 can heat the precursor material 306 to lower the viscosity to a range suitable for additive manufacturing. The heating element 346 can apply heat directly to the precursor material 306, or can heat a component that is thermally coupled to the precursor material 306, such as the build platform 308, flexible substrate 310 (e.g., the first intermediate region 328a, second intermediate region 328b, and/or active region 324) and/or reservoirs 332. The system 300 can include any suitable number of heating elements 346, such as one, two, three, four, five, or more heating elements 346. In other embodiments, however, the heating element 346 is optional and can be omitted.

The controller 348 can be operably coupled to the printer assembly 302 and build platform 308 to control the operation thereof. The controller 348 can be or include a computing device including one or more processors and memory storing instructions for performing the additive manufacturing operations described herein. For example, the controller 348 can receive a digital data set (e.g., a 3D model) representing the object 304 to be fabricated, determine a plurality of object cross-sections to build up the object 304 from the precursor material 306, and can transmit instructions to the energy source 336 to output the energy 338 to form the object cross-sections. As another example, the controller 348 can receive sensor data from one or more sensors 344, and can adjust the operation of one or more components of the system 300 based on the sensor data. Examples of operational parameters that can be controlled by the controller 348 include, but are not limited to: the energy application parameters of the energy source 336 (e.g., energy intensity, energy dosage, exposure time, exposure pattern, energy wavelength, energy type), the position of the build platform 308 (e.g., height relative to the printer assembly 302), the position of the printer assembly 302 (e.g., height relative to the build platform 308), the position of the printer carriage 316 (e.g., lateral position relative to the flexible substrate 310), the movement of the printer carriage 316 (e.g., movement speed, movement direction), the distance between the flexible substrate 310 and the first recoater 330a, the distance between of the flexible substrate 310 and the second recoater 330b, deposition of the precursor material 306 by the first recoater 330a, deposition of the precursor material 306 by the second recoater 330b, removal of the precursor material 306 by the first decoater 334a, removal of the precursor material 306 by the second recoater 330b, operation of the actuator 342, operation of the sensor 344, and/or the amount of heating applied by the heating element 346.

Figures 3C, 3D:
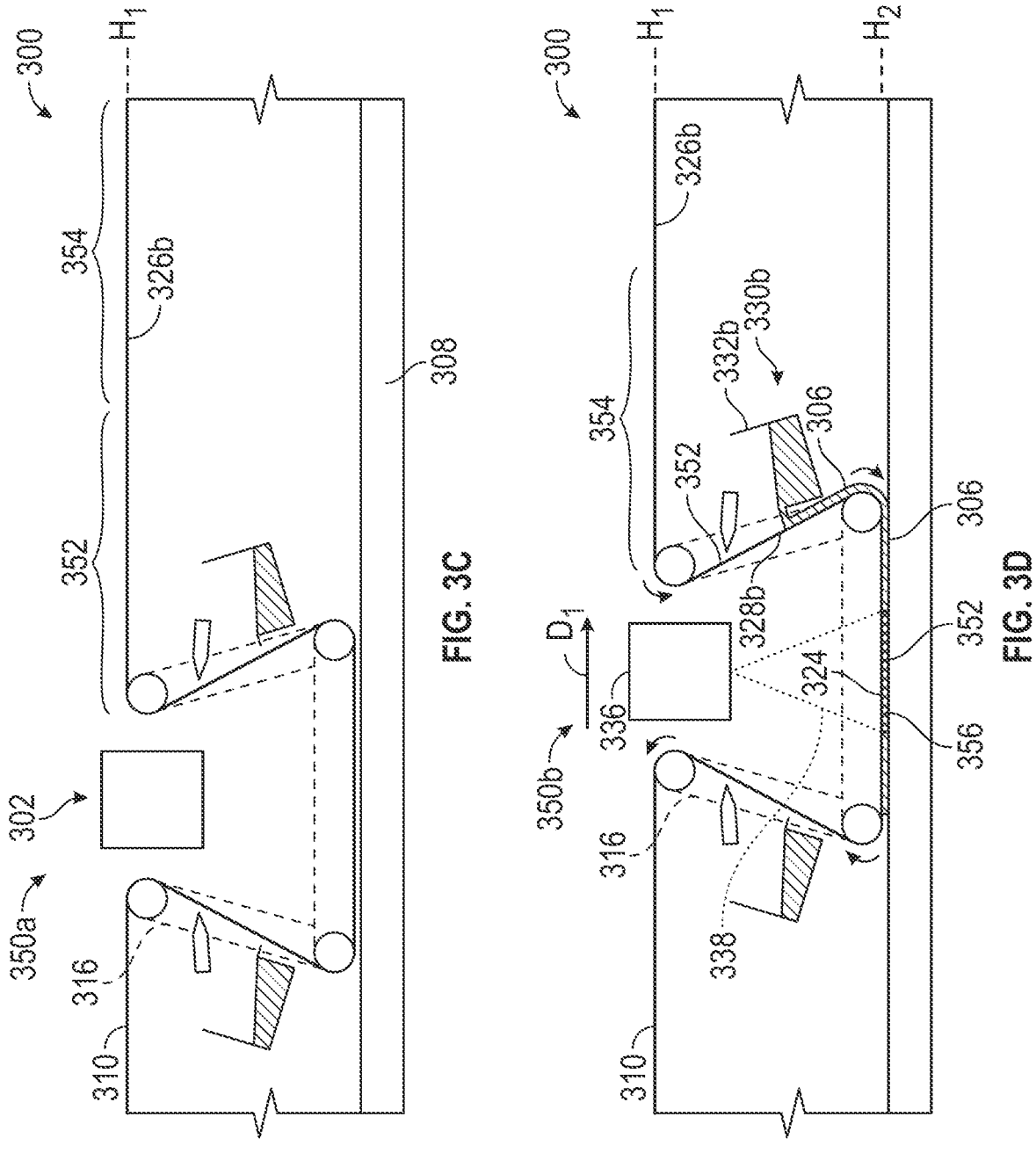
FIGS. 3C-3H illustrate various stages of operation of the system of FIG. 3A.

Referring next to FIGS. 3C-3H (in which selected components of the system 300 have been omitted for clarity), the system 300 can be operated to build up the object 304 from the precursor material 306 in a layer-by-layer process. Referring first to FIG. 3C, in a first stage of operation of the system 300, the printer carriage 316 is at a first position 350a relative to the flexible substrate 310. In the illustrated embodiment, the flexible substrate 310 includes a first section 352 and a second section 354 that are connected to each other. When the printer carriage 316 is in the first position, the first and second sections 352, 354 are both in the second idle region 326b of the flexible substrate 310, and are both at the initial vertical position (e.g., height Hi) away from the build platform 308.

Referring next to FIG. 3D, during a second stage of operation of the system 300, the printer carriage 316 can move in the first direction $D_1$ to a second position 350b relative to the flexible substrate 310. As the printer carriage 316 moves, the rollers 322 rotate so that the flexible substrate 310 advances along the printer carriage 316 opposite the direction of motion of the printer carriage 316. For example, the first section 352 of the flexible substrate 310 can advance out of the second idle region 326b and into the second intermediate region 328b. As the first section 352 moves through the second intermediate region 328b, the second recoater 330b can deposit a layer of the precursor material 306 onto the first section 352. The thickness of the layer of the precursor material 306 can be determined at least in part by the distance between the reservoir 332b and the surface of the flexible substrate 310 at the second intermediate region 328b, as described further below.

As the printer carriage 316 continues to move toward the second position 350b, the first section 352 of the flexible substrate 310 can advance into the active region 324, and can thus move downward into the displaced vertical position (e.g., height H 2). As a result, the precursor material 306 that was applied to the first section 352 can be conveyed proximate to the build platform 308. In some embodiments, the distance between the active region 324 and the build platform 308 can be adjustable so that the precursor material 306 is brought into direct contact with the surface of the build platform 308 (when printing the initial layer of the object 304) or with the surface of the object 304 (when printing subsequent layers of the object 304). For example, the build platform 308 can include or be coupled to a motor (not shown) that raises and/or lowers the build platform 308 to the desired height during the operation of the system 300. Alternatively or in combination, the printer assembly 302 can be raised and/or lowered relative to the build platform 308.

The energy source 336 can direct the energy 338 toward the precursor material 306 at the active region 324 of the flexible substrate 310 to form a first portion of the object 304 ("first object portion 356") on the build platform 308. For example, the energy 338 can be patterned, scanned, or otherwise applied onto the precursor material 306 to solidify (e.g., cure) at least part of the precursor material 306 at the active region 324, thus forming the first object portion 356 directly onto the build platform 308 and/or onto a previously formed portion of the object 304.

In some embodiments, the energy 338 is applied to the precursor material 306 as the printer carriage 316 is moving, and the controller 348 coordinates the application of the energy 338 with the movement of the printer carriage 316 to form the desired object geometry. For example, the energy source 336 can be a scrolling or scanning light engine (e.g., a scrolling digital light processing engine) that outputs the energy 338 in a dynamically changing pattern in coordination with the motion of the printer carriage 316. In other embodiments, however, the energy 338 can be applied to the precursor material 306 while the printer carriage 316 is stationary, e.g., the movement of the printer carriage 316 is paused while the energy source 336 outputs a static pattern of energy 338, and resumes after the energy application is completed.

Figures 3E, 3F:
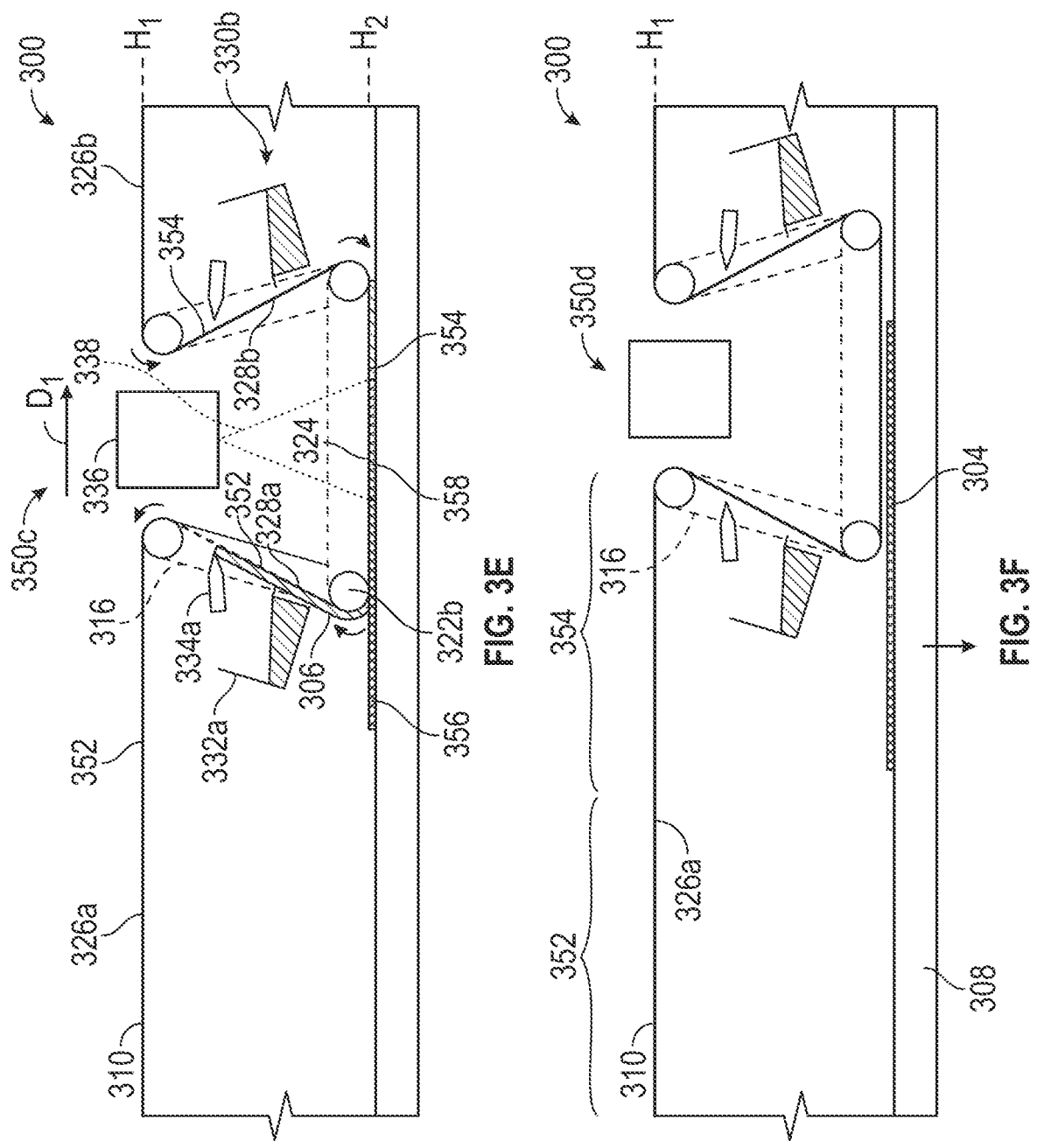

Referring next to FIG. 3E, during a third stage of operation of the system 300, the printer carriage 316 can continue moving in the first direction $D_1$ to a third position 350c relative to the flexible substrate 310. The continued movement of the printer carriage 316 can cause the first section 352 of the flexible substrate 310 to advance out of the active region 324, through the first intermediate region 328a, and into the first idle region 326a (and thus reverting back to the initial vertical position).

As the first section 352 moves past the roller 322b between the active region 324 and the first intermediate region 328a, the radius of curvature of the flexible substrate 310 at and/or near the roller 322b can produce a peel force that separates the first object portion 356 from the remaining precursor material 306 on the first section 352 of the flexible substrate 310. The peel force can be sufficiently high such that all or substantially all of the first object portion 356 remains on the build platform 308. The peel force can depend on the peel angle of the flexible substrate 310, and the peel angle can correlate to the radius of curvature of the flexible substrate 310. The radius of curvature of the flexible substrate 310 can be the same or similar (e.g., within 10%) as the radius of the roller 322b. For example, the roller 322b can have a radius of at least 5 mm, 10 mm, 12 mm, 15 mm, or 20 mm.

The remaining precursor material 306 on the first section 352 of the flexible substrate 310 (e.g., precursor material 306 that was not solidified by the energy 338) can be carried to the first decoater 334a at the first intermediate region 328a. The first decoater 334a can be proximate to or in direct contact with the flexible substrate 310 at the first intermediate region 328a. As the first section 352 advances through the first intermediate region 328a, the first decoater 334a can scrape the remaining precursor material 306 from the first section 352 of the flexible substrate 310. Thus, the first section 352 can be substantially free of any remaining precursor material 306 when advanced to the first idle region 326a of the flexible substrate 310. The removed precursor material 306 can be directed into the reservoir 332a (e.g., in embodiments where the precursor material 306 will be reused in the same printing operation) or into a separate collection device (e.g., in embodiments where the precursor material 306 will be reused in a separate printing operation or will be discarded).

Concurrently, the second section 354 of the flexible substrate 310 can advance from the second idle region 326b, through the second intermediate region 328b, and to the active region 324. The second recoater 330b can deposit a layer of the precursor material 306 onto the second section 354 as the second section 354 moves through the second intermediate region 328b. The deposition of the precursor material 306 can occur in a similar manner as described above with respect to the first section 352.

The second section 354 can then advance into the active region 324 and downward into the displaced vertical position (e.g., height H 2), such that the precursor material 306 on the second section 354 is conveyed proximate to the build platform 308. The energy source 336 can then direct the energy 338 toward the precursor material 306 at the active region 324 of the flexible substrate 310 to form a second portion of the object 304 ("second object portion 358") on the build platform 308. As shown in FIG. 3E, the second object portion 358 can be part of the same cross-section of the object 304 as the first object portion 356. The process of forming the second object portion 358 can be performed in a similar manner as described above in connection with the first object portion 356.

Subsequently, the printer carriage 316 can continue to move in the first direction $D_1$ to advance the second section 354 of the flexible substrate 310 out of the active region 324, through the first intermediate region 328a, and into the first idle region 326a. This process can cause the second object portion 358 to peel off from the second section 354, and can also cause the remaining precursor material 306 to be scraped off the second section 354 by the first decoater 334a, as described above.

Referring next to FIG. 3F, during a fourth stage of operation, the printer carriage 316 can continue moving along the first direction $D_1$ until the entire object cross-section has been formed, and the printer carriage 316 reaches a fourth position 350d. In some embodiments, when the printer carriage 316 is in the fourth position 350d, both the first and second sections 352, 354 are in the first idle region 326a and have reverted back to the initial vertical position (e.g., H 1). The build platform 308 can then be lowered by a predetermined amount and/or the printer carriage 316 can be raised by a predetermined amount to create space for the next cross-section of the object 304.

Figures 3G, 3H:
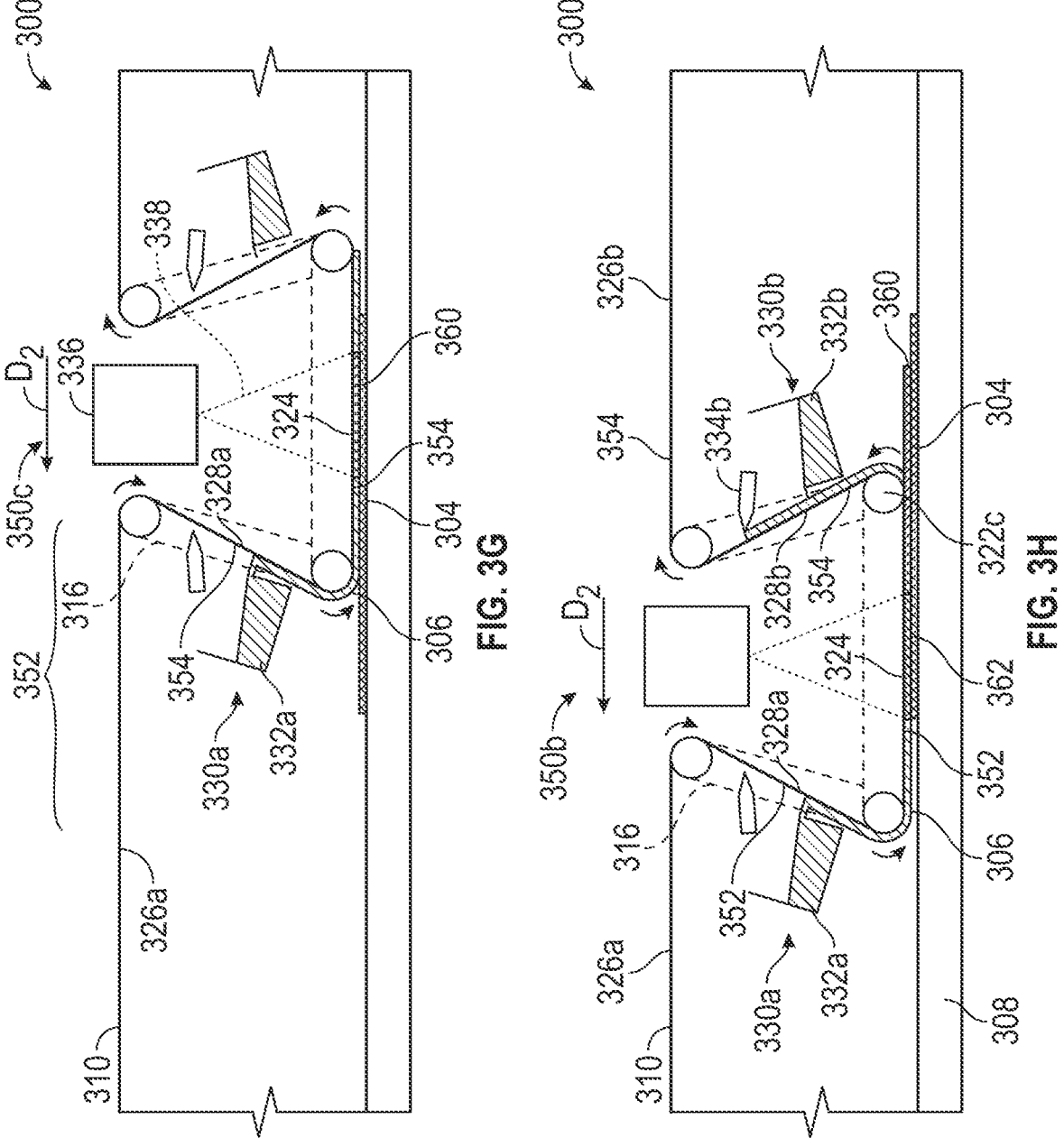

Referring next to FIG. 3G, during a fifth stage of operation of the system 300, the movement of the printer carriage 316 can be reversed, such that the printer carriage 316 moves in the second, opposite direction $D_2$ back to the third position 350c. Accordingly, the flexible substrate 310 can be advanced along the printer carriage 316 in the reverse direction. As shown in FIG. 3G, the second section 354 of the flexible substrate 310 can advance from the first idle region 326a, through the first intermediate region 328a, and to the active region 324. The first recoater 330a can apply a layer of the precursor material 306 from the reservoir 332a onto the second section 354 as the second section 354 passes through the first intermediate region 328a. When the second section 354 reaches the active region 324, the energy source 336 can apply energy 338 to the precursor material 306 carried thereon to form a third portion of the object 304 ("third object portion 360") on the build platform 308, in accordance with the processes described above. In the illustrated embodiment, the third object portion 360 is deposited on a previously formed cross-section of the object (e.g., the first and/or second object portions 356, 358— reference numbers are omitted in FIG. 3G for purposes of simplicity).

Referring next to FIG. 3H, during a sixth stage of operation of the system 300, the printer carriage 316 can continue moving in the second direction $D_2$ back to the second position 350b relative to the flexible substrate 310. The continued movement of the printer carriage 316 can advance the second section 354 of the flexible substrate 310 out of the active region 324, through the second intermediate region 328b, and into the second idle region 326b. This process can cause the third object portion 360 to peel off from the second section 354, by virtue of the peel force due to the roller 322c between the active region 324 and the second intermediate region 328b. The remaining precursor material 306 can be scraped off the second section 354 by the second decoater 334b, and can be directed into the reservoir 332b or a separate collection device.

Concurrently, the first section 352 of the flexible substrate 310 can advance from the first idle region 326a, through the first intermediate region 328a, and into the active region 324. The first recoater 330a can apply a layer of the precursor material 306 from the reservoir 332a onto the first section 352 as the first section 352 passes through the first intermediate region 328a. When the first section 352 reaches the active region 324, the energy source 336 can apply energy 338 to the precursor material 306 carried thereon to form a fourth portion of the object 304 ("fourth object portion 362") on the build platform 308, in accordance with the processes described above. In the illustrated embodiment, the fourth object portion 362 is part of the same cross-section as the third object portion 360, and is deposited on a previously formed cross-section of the object (e.g., the first and/or second object portions 356, 358—reference numbers are omitted in FIG. 3H for purposes of simplicity).

The printer carriage 316 can continue moving in the second direction $D_2$ until the entire object cross-section has been formed and the printer carriage 316 returns to the first position 350a. Subsequently, the operations illustrated in FIGS. 3B-3H can be repeated to sequentially build up the object 304 from a plurality of cross-sections.

In some embodiments, the system 300 is configured to form the object 304 while the printer carriage 316 is moving in the first direction $D_1$ (e.g., as described with respect to FIGS. 3D and 3E) and also while the printer carriage 316 is moving in the second direction $D_2$ (e.g., as described with respect to FIGS. 3G and 3H). This capability, also referred to herein as "bidirectional printing," can be advantageous for increasing the print speed of the system 300. For example, the object 304 can be rapidly built up as the printer carriage 316 moves back and forth along the build platform 308, with the first and second recoaters 330a, 330b alternatingly applying a fresh layer of precursor material 306 to the flexible substrate 310, and the first and second decoaters 334a, 334b alternatingly removing remaining precursor material 306 from the flexible substrate 310. In other embodiments, however, the system 300 can instead be configured to operate in a unidirectional manner, e.g., the object 304 is formed while the printer carriage 316 is moving in the first direction $D_1$ only or in the second direction $D_2$ only.

In some embodiments, the flexible substrate 310 of the system 300 is considered to be "fixed" in that the first end 312a and second end 312b of the flexible substrate 310 remain stationary during a printing operation, while the printer carriage 316 moves. Additionally or alternatively, the lateral position (x- and y-coordinates) of each location on the flexible substrate 310 can remain constant during the printing operation, even though the vertical position (z-coordinate) may change as the printer carriage 316 moves along the flexible substrate 310. Accordingly, the correspondence between each x- and y-coordinate on the flexible substrate 310 and the x- and y-coordinates of the build platform 308 can be fixed, thus simplifying the control algorithms for coordinating the output of the energy source 336 with the movement of the printer carriage 316.

Although FIGS. 3A-3H depict fabrication of a single object 304, in other embodiments, the system 300 can concurrently fabricate multiple objects 304 on the build platform 308. For example, when the printer carriage 316 is moving in the first direction $D_1$, the system 300 can print a respective first cross-section of each object 304 on the build platform 308, in accordance with the processes described above; subsequently, when the printer carriage 316 is moving in the second, opposite direction D 2, the system 300 can print a respective second cross-section of each object 304 onto the corresponding first cross-section of that object; and so on.

Additionally, although FIGS. 3A-3H illustrate a representative example of a system 300 for additive manufacturing that forms objects from a fluid precursor material (e.g., a photopolymerizable resin), this is not intended to be limiting, and the methods described herein can be implemented using other types of additive manufacturing systems, such as material jetting systems, binder jetting systems, material extrusion systems, powder bed fusion systems, sheet lamination systems, or directed energy deposition systems.

FIGS. 4A-4D illustrate an additive manufacturing system 400 ("system 400") configured in accordance with embodiments of the present technology. The features and operation of the system 400 can be generally similar to those of the system 300 of FIGS. 3A-3H. Accordingly, like numbers (e.g., flexible substrate 310 versus flexible substrate 410) are used to identify similar or identical structures, and the following discussion of the system 400 of FIGS. 4A-4D will focus on those features that differ from or were not previously described in detail with respect to the embodiments of FIGS. 3A-3H. Additionally, any of the features described in connection with the system 300 of FIGS. 3A-3H can be incorporated into the system 400 of FIGS. 4A-4D, and vice-versa.

Figure 4A:
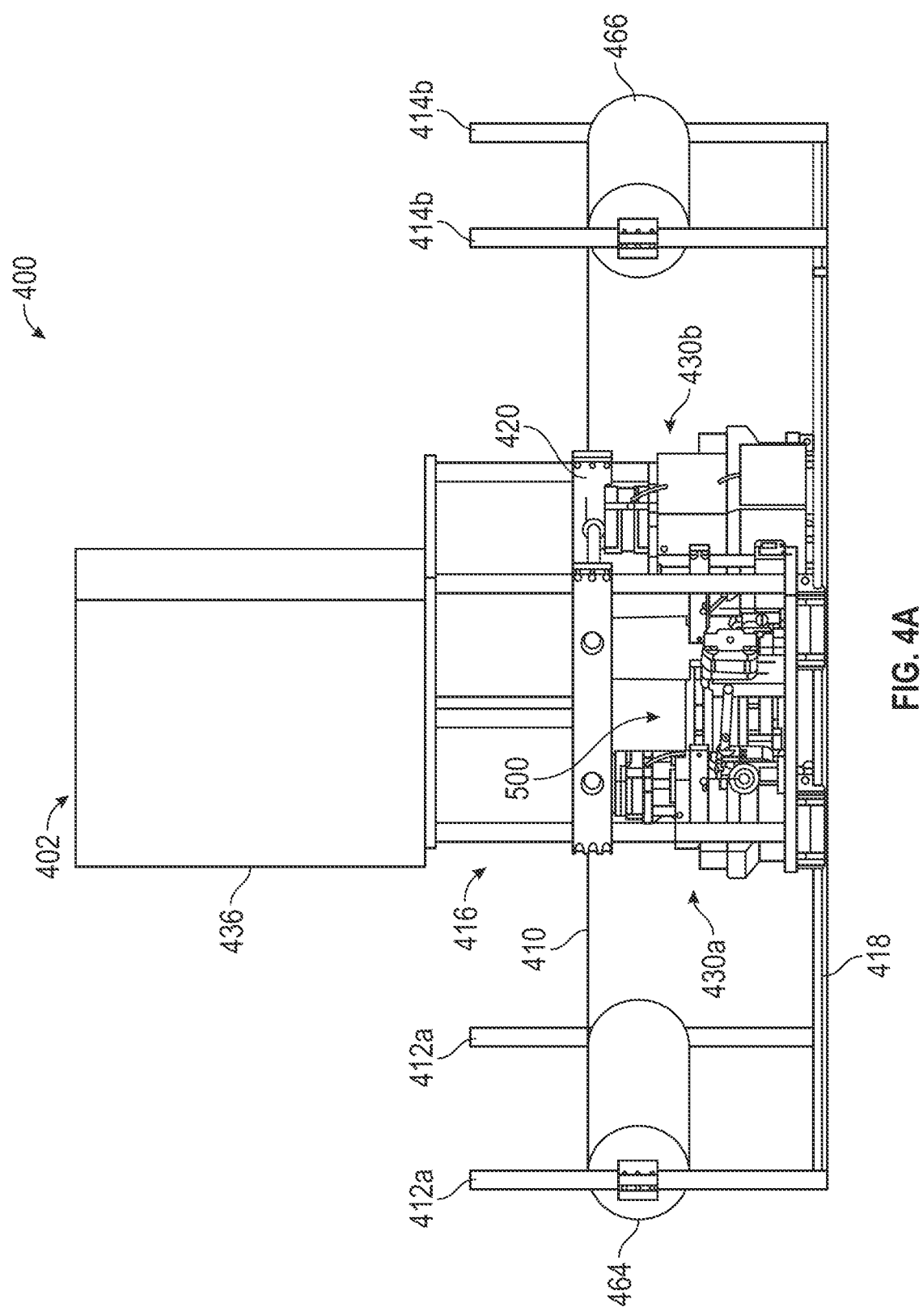
FIG. 4A is a perspective view of an additive manufacturing system configured in accordance with embodiments of the present technology.
Figure 4B:
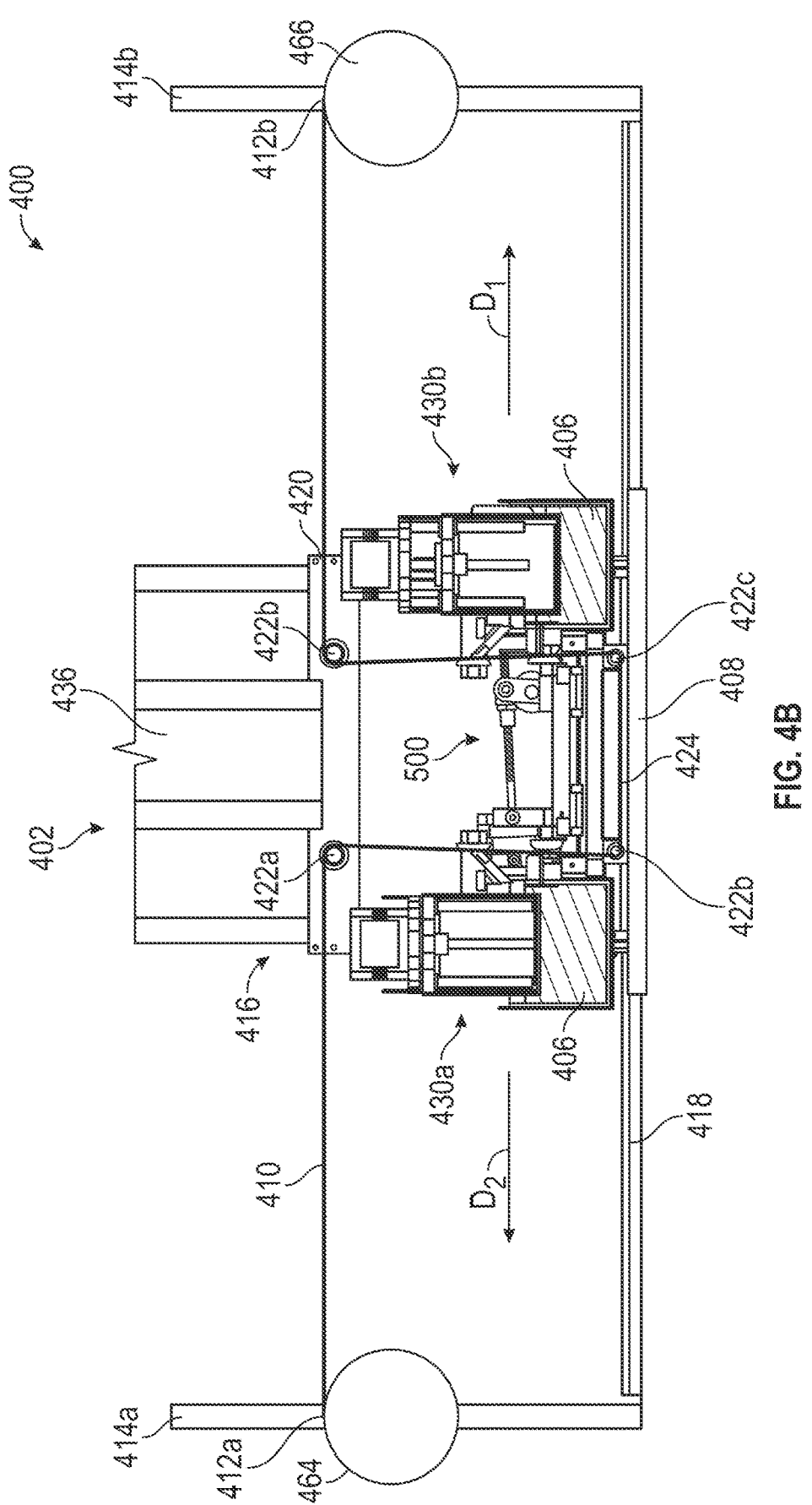
FIG. 4B is a cross-sectional side view of the system of FIG. 4A.

FIG. 4A is a perspective view of the system 400 and FIG. 4B is a cross-sectional side view of the system 400. Referring to FIGS. 4A and 4B together, the system 400 includes a movable printer assembly 402 configured to build up an object (not shown) via an additive manufacturing process. The principle of operation of the system 400 can be generally similar to that of the system 300 of FIGS. 3A-3H. Briefly, the printer assembly 402 can include a movable printer carriage 416 that is coupled to a flexible substrate 410 via a plurality of rollers 422a-422d (collectively, "rollers 422"—FIG. 4B). The printer carriage 416 can slide on rails 418 in a first direction $D_1$ and a second, opposite direction $D_2$ (FIG. 4B) relative to the flexible substrate 410, and the rollers 422 can rotate to advance the flexible substrate 410 along the printer carriage 416 in the opposite direction. As the printer carriage 416 moves, a precursor material 406 is alternatingly applied to the flexible substrate 410 by a first recoater 430a and a second recoater 430b mounted at opposite sides of the printer carriage 416. The movement of the printer carriage 416 can cause the section of the flexible substrate 410 carrying the precursor material 406 to be advanced to an active region 424 proximate to a build platform 408. An energy source 436 mounted on the printer carriage 416 can apply energy to the precursor material 406 at the active region 424 to form a portion of the object. Accordingly, as the printer carriage 416 moves back and forth along the build platform 408, the flexible substrate 410 can continuously supply precursor material 406 to the active region 424 to build up the object in a layer-by-layer manner.

In some embodiments, the flexible substrate 410 is partially or entirely replaceable without disassembling the flexible substrate 410 from the system 400. For example, as best seen in FIG. 4B, the flexible substrate 410 can include a first end 412a connected to a feed roll 464, and a second end 412b connected to a used roll 466. In other embodiments, the connection can be reversed, with the first end 412a being connected to the used roll 466 and the second end 412b being connected to the feed roll 464. The feed roll 464 can be a fresh roll of substrate material that has not yet been used, while the used roll 466 can be substrate material that has already been used (e.g., previously been in contact with the precursor material 406 during a printing operation).

The feed roll 464 and the used roll 466 can be rotatably coupled to a set of first supports 414a and a set of second supports 414b (e.g., posts, struts), respectively, at opposite sides of the system 400. In some embodiments, the system 400 includes one or more actuators (e.g., motors—not shown) that are coupled to the feed roll 464 and the used roll 466 to actuate the rotation thereof. When the printer assembly 402 is operating (e.g., when the printer assembly 402 is moving and/or forming an object) the feed roll 464 and the used roll 466 can remain stationary, such that the first and second ends 412a, 412b of the flexible substrate 410 are fixed. When replacement of the flexible substrate 410 is desired, the feed roll 464 and the used roll 466 can be rotated (e.g., in a clockwise direction) to unspool new substrate material from the feed roll 464 and spool used substrate material into the used roll 466, thus advancing the flexible substrate 410 relative to the printer assembly 402. In some embodiments, the entire flexible substrate 410 is replaced at a time, e.g., the flexible substrate 410 is advanced by at least the entire length of the flexible substrate 410. In other embodiments, only a portion of the flexible substrate 410 is replaced at a time, e.g., the flexible substrate 410 is advanced by less than the entire length of the flexible substrate 410, such as by no more than 1 cm, 2 cm, 5 cm, 10 cm, 15 cm, or 20 cm.

In some embodiments, the flexible substrate 410 is replaced during a time period when the printer assembly 402 is paused, such as between print passes (e.g., after the printer assembly 402 has finished moving in the first direction $D_1$ and before the printer assembly 402 starts moving in the second direction $D_2$, or vice-versa), between print cycles (e.g., after the printer assembly 402 has completed a print pass in the first direction $D_1$ and a print pass in the second direction $D_2$), and/or between print operations (e.g., after the printer assembly 402 has finished forming a set of one or more objects). For example, the flexible substrate 410 can be partially or completely replaced after a predetermined number of print passes, print cycles, and/or print operations, such as after two, three, four, five, ten, twenty, fifty, or more print passes, print cycles, and/or print operations. Optionally, the flexible substrate 410 can be partially or completely replaced after each print pass, after each print cycle, and/or after each print operation. The replacement of the flexible substrate 410 can be performed manually by a human operator, automatically based on instructions from a controller of the system 400, or suitable combinations thereof.

The configuration of the flexible substrate 410, feed roll 464, and used roll 466 described herein allows the flexible substrate 410 to be quickly replaced with minimal disruption to the operation of the system 400. This approach can be beneficial in embodiments where the precursor material 406 includes components (e.g., fillers) that may abrade, degrade, adhere to, contaminate, or otherwise damage the flexible substrate 410 over time; and/or in embodiments where the flexible substrate 410 is made out of a material that is more susceptible to such damage. Accordingly, the system 400 can be compatible with a wider range of precursor materials 406 and/or types of flexible substrates 410.

Figure 4C:
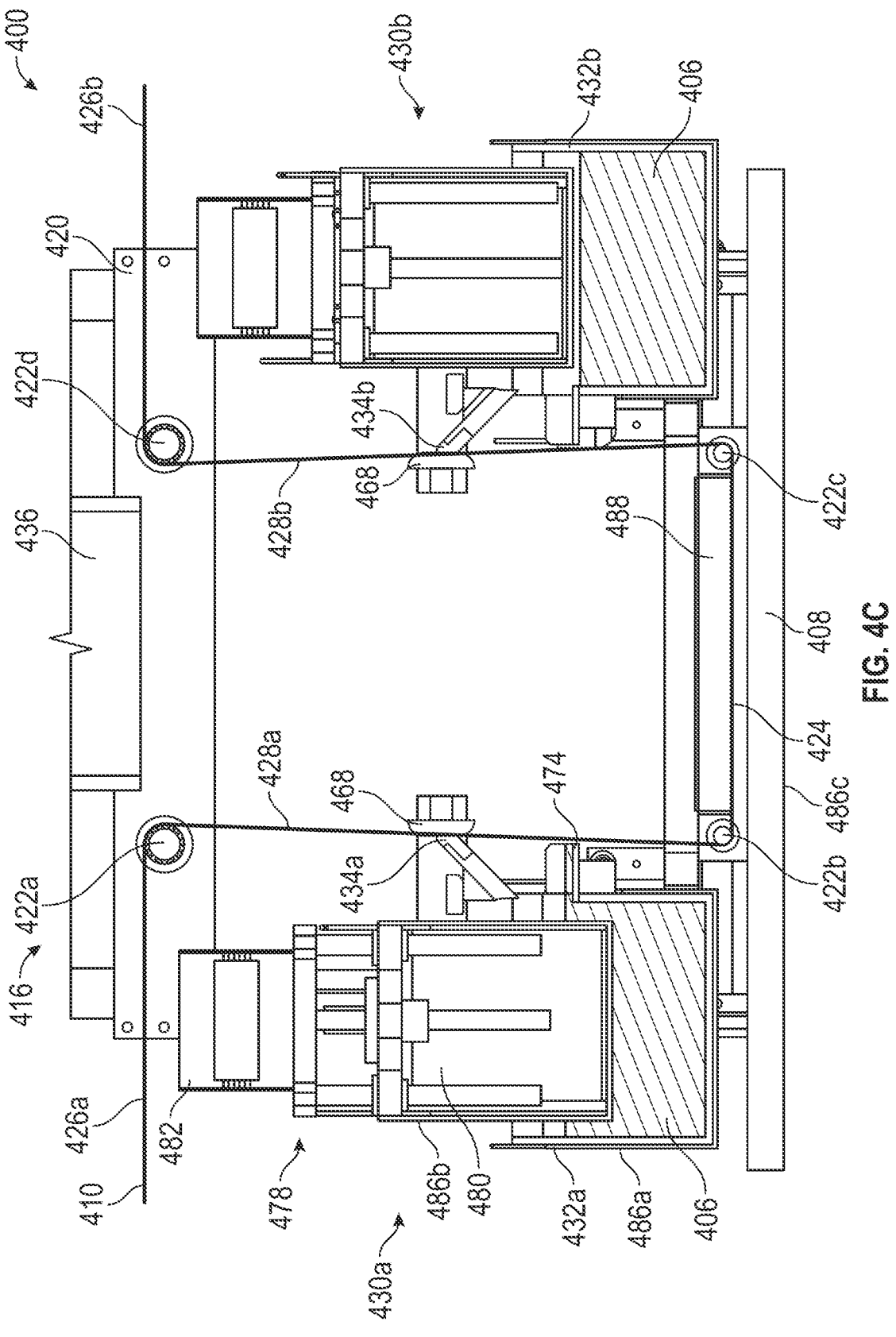
FIG. 4C is a cross-sectional side view of a printer carriage of the system of FIG. 4A.

FIG. 4C is a cross-sectional side view of the printer carriage 416 of the system 400. The printer carriage 416 can include a frame 420 that is coupled to and supports the first and second recoaters 430a, 430b. In the illustrated embodiment, the first recoater 430a is mounted at a first side portion (e.g., left side portion) of the frame 420 proximate to a first intermediate region 428a of the flexible substrate 410, and the second recoater 430b is mounted at a second, opposite side portion (e.g., right side portion) of the frame 420 proximate to a second intermediate region 428b of the flexible substrate 410. The first recoater 430a can include a first reservoir 432a configured to apply the precursor material 406 to the first intermediate region 428a (e.g., when the printer carriage 416 is moving in the second direction $D_2$), and the second recoater 430b can include a second reservoir 432b configured to apply the precursor material 406 to the second intermediate region 428b (e.g., when the printer carriage 416 is moving in the first direction $D_1$).

In some embodiments, the first recoater 430a includes a first decoater 434a configured to remove the precursor material 406 from the first intermediate region 428a (e.g., when the printer carriage 416 is moving in the first direction $D_1$), and the second recoater 430b includes a second decoater 434b configured to remove the precursor material 406 from the second intermediate region 428b (e.g., when the printer carriage 416 is moving in the second direction D 2). The first decoater 434a can be positioned above the first reservoir 432a so the precursor material 406 removed from the first intermediate region 428a falls back into the first reservoir 432a, and the second decoater 434b can be positioned above the second reservoir 432b so the precursor material 406 removed from the second intermediate region 428b falls back into the second reservoir 432b. Optionally, a respective backstop 468 (e.g., a bumper, bar, strut, roller) can be positioned against the flexible substrate 410 to maintain contact between the first and second decoaters 434a, 434b and the first and second intermediate regions 428a, 428b, respectively.

Figure 4D:
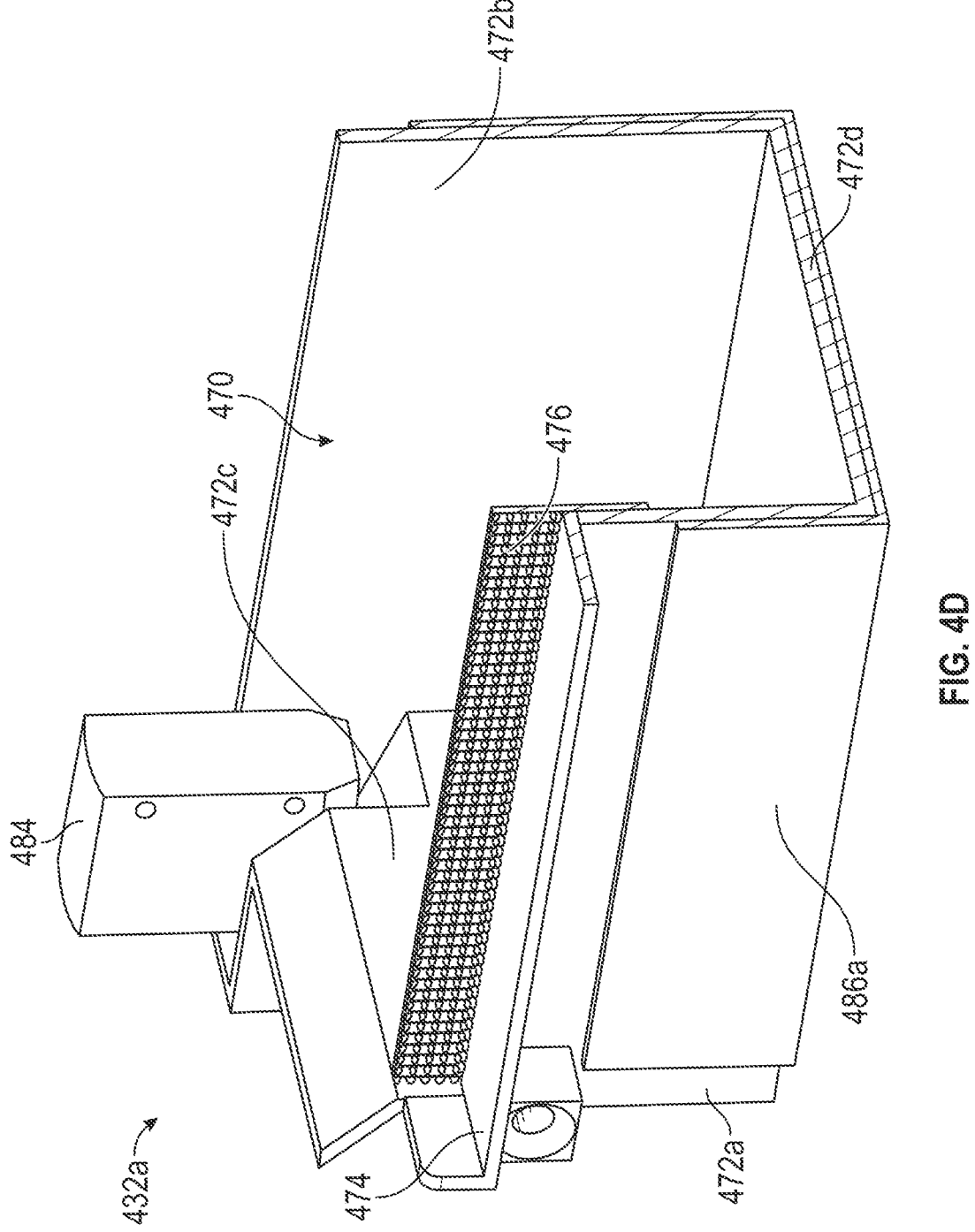
FIG. 4D is a perspective view of a reservoir of the system of FIG. 4A.

FIG. 4D is a perspective view of the first reservoir 432a (the second reservoir 432b can be similar or identical to the first reservoir 432a). The first reservoir 432a includes a plurality of walls defining a cavity 470 for containing the precursor material 406. In the illustrated embodiment, the first reservoir 432a has a generally rectangular shape with four side walls (only three side walls 472a-472c are shown—the fourth side wall is omitted in FIG. 4D for visualization purposes) and a bottom wall 472d. The top portion of the first reservoir 432a can be open, e.g., to permit insertion of a displacement block, as described below. In other embodiments, however, the first reservoir 432a can have a different shape (e.g., square, cylindrical, spherical), and the number and geometry of the walls can be varied accordingly.

The cavity 470 can be large enough to hold sufficient precursor material 406 for completing a printing operation without refilling the first reservoir 432a. For example, the cavity 470 can be configured hold at least 50 mL, 100 mL, 200 mL, 500 mL, or 1 L of the precursor material 406. This approach can be advantageous to avoid refilling during a printing operation. In other embodiments, however, the first reservoir 432a can be configured to permit refilling during printing, e.g., the first reservoir 432a can include or be coupled to a port, nozzle, tubing, pump, etc., that supplies additional precursor material 406 from a separate material source.

As previously described, during the operation of the system 400, the first reservoir 432a can be configured to apply the precursor material 406 to a neighboring section of the flexible substrate 410 (e.g., the first intermediate region 428a). In the illustrated embodiment, the side wall 472a closest to the flexible substrate 410 has a lower height than the remaining side walls 472b, 472c to allow the precursor material 406 to flow out from the first reservoir 432a and onto the flexible substrate 410. As shown in FIG. 4C, the first intermediate region 428a of the flexible substrate 410 can be angled, with the lower portion of the first intermediate region 428a being close to the first reservoir 432a than the upper portion of the first intermediate region 428a, such that the precursor material 406 exiting the first reservoir 432a flows directly onto the upper surface of the first intermediate region 428a.

Optionally, the first reservoir 432a can include a shelf 474 (best seen in FIG. 4D) that is connected to the side wall 472a. The shelf 474 can be a generally flat structure that facilitates application of a uniform layer of the precursor material 406 onto the flexible substrate 410. The edge of the shelf 474 can act as a recoater blade to smooth the surface of the deposited material layer. In other embodiments, however, the shelf 474 can be replaced with another material deposition structure (e.g., spout, nozzle, aperture), or can be omitted altogether.

In some embodiments, the first reservoir 432a includes a filter 476 (e.g., a mesh, screen, porous material) used to capture debris and/or other unwanted components present in the precursor material 406, e.g., to avoid contaminating the printed object, damaging the flexible substrate 410, and/or otherwise interfering with the operation of the system 400. For example, the filter 476 can be advantageous in embodiments in which precursor material 406 that is removed from the flexible substrate 410 by the first decoater 434a (FIG. 4C) is returned to the first reservoir 432a for reuse, e.g., in case fragments of solidified precursor material 406 are present in the removed material. In the illustrated embodiment, the filter 476 is coupled to the side wall 472a at a location proximate to the shelf 474, such that any precursor material 406 exiting the first reservoir 432a passes through the filter 476 before being deposited onto the flexible substrate 410. Alternatively or additionally, the first reservoir 432a can include a filter 476 at a different location, e.g., to filter the precursor material 406 before it enters the first reservoir 432a. In other embodiments, the filter 476 is optional and can be omitted.

Referring again to FIG. 4C, the first and second recoaters 430a, 430b can each include a respective fill control mechanism 478 for controlling the application of the precursor material 406 from the respective reservoir 432a, 432b (reference numbers are shown for the fill control mechanism 478 of the first recoater 430a only, for purposes of simplicity). In the illustrated embodiment, the fill control mechanism 478 includes a displacement block 480 configured to fit at least partially within the cavity 470 of the first reservoir 432a (the features and operation of the displacement block 480 for the second reservoir 432b can be the same). The displacement block 480 can be coupled to an actuator 482 (e.g., a motor, linear actuator), that adjusts the positioning of the displacement block 480 relative to the first reservoir 432a.

The displacement block 480 can be used to control the level of precursor material 406 within the first reservoir 432a, and thus, the flow of the precursor material 406 out of the first reservoir 432a. For example, when the first recoater 430a is idle (e.g., not being used to apply precursor material 406), the displacement block 480 can be lifted partially or entirely out of the cavity 470. Accordingly, the level of the precursor material 406 within the first reservoir 432a can remain below the height of the shelf 474, such that the precursor material 406 does not flow out of the first reservoir 432a. When the first recoater 430a is active (e.g., being used to apply precursor material 406 to the flexible substrate 410), the displacement block 480 can be lowered partially or entirely into the cavity 470. The lowering of the displacement block 480 can displace a corresponding volume of the precursor material 406, thus raising the level of the precursor material 406 within the first reservoir 432a. Once the level of the precursor material 406 reaches or exceeds the height of the shelf 474, the precursor material 406 can flow out of the first reservoir 432a and onto the flexible substrate 410.

In some embodiments, the fill control mechanism 478 includes a fill sensor 484 (FIG. 4D) configured to monitor the level of the precursor material 406. For example, the fill sensor 484 can be coupled to and/or positioned at least partially within the first reservoir 432a to detect the level of the precursor material 406 within the cavity 470. The fill sensor 484 can be an optical sensor, ultrasonic sensor, contact sensor, or any other suitable sensor type capable of monitoring fluid level. The positioning of the displacement block 480 can be controlled based on the sensor data from the fill sensor 484. For example, when the first recoater 430a is idle, the displacement block 480 can be raised until the sensor data indicates that the level of the precursor material 406 is below a predetermined value (e.g., below the height of the shelf 474). When the first recoater 430a is active, the displacement block 480 can be lowered until the sensor data indicates that the level of the precursor material 406 is greater than or equal to the predetermined value (e.g., greater than or equal to the height of the shelf 474). Additionally, as the precursor material 406 flows out of the first reservoir 432a, the displacement block 480 can be gradually lowered based on the sensor data to maintain a consistent level of the precursor material 406, and thus, a substantially constant flow rate out of the first reservoir 432a.

Alternatively or additionally, the fill control mechanism 478 can use other types of devices to control the level of the precursor material 406, such as pumps, components that displace the precursor material 406 via expansion (e.g., a balloon), components that displace the precursor material 406 by altering the volume of the cavity 470 (e.g., by moving one or more of the walls 472a-472d), or suitable combinations thereof. Optionally, the fill control mechanism 478 can be omitted altogether.

In some embodiments, the system 400 includes at least one heating element configured to heat the precursor material 406 to a desired temperature. This configuration can be advantageous in embodiments where the object is formed using high temperature lithography, as previously described. The system 400 can include heating elements at any of the following locations: on or within the first reservoir 432a (e.g., heating element 486a coupled to the outer surface of the first reservoir 432a), on or within the second reservoir 432b, on or within the displacement block 480 (e.g., heating element 486b coupled to the outer surface of the displacement block 480), on or within the build platform 408 (e.g., heating element 486c coupled to the bottom surface of the build platform 408), proximate to the flexible substrate 410 (e.g., on or within a transparent plate 488 positioned against the active region 424 of the flexible substrate 410), and/or any other suitable location. The heating elements can be or include heat lamps, heater plates, adhesive heaters, thermo-electric heaters, and the like.

Figure 5A:
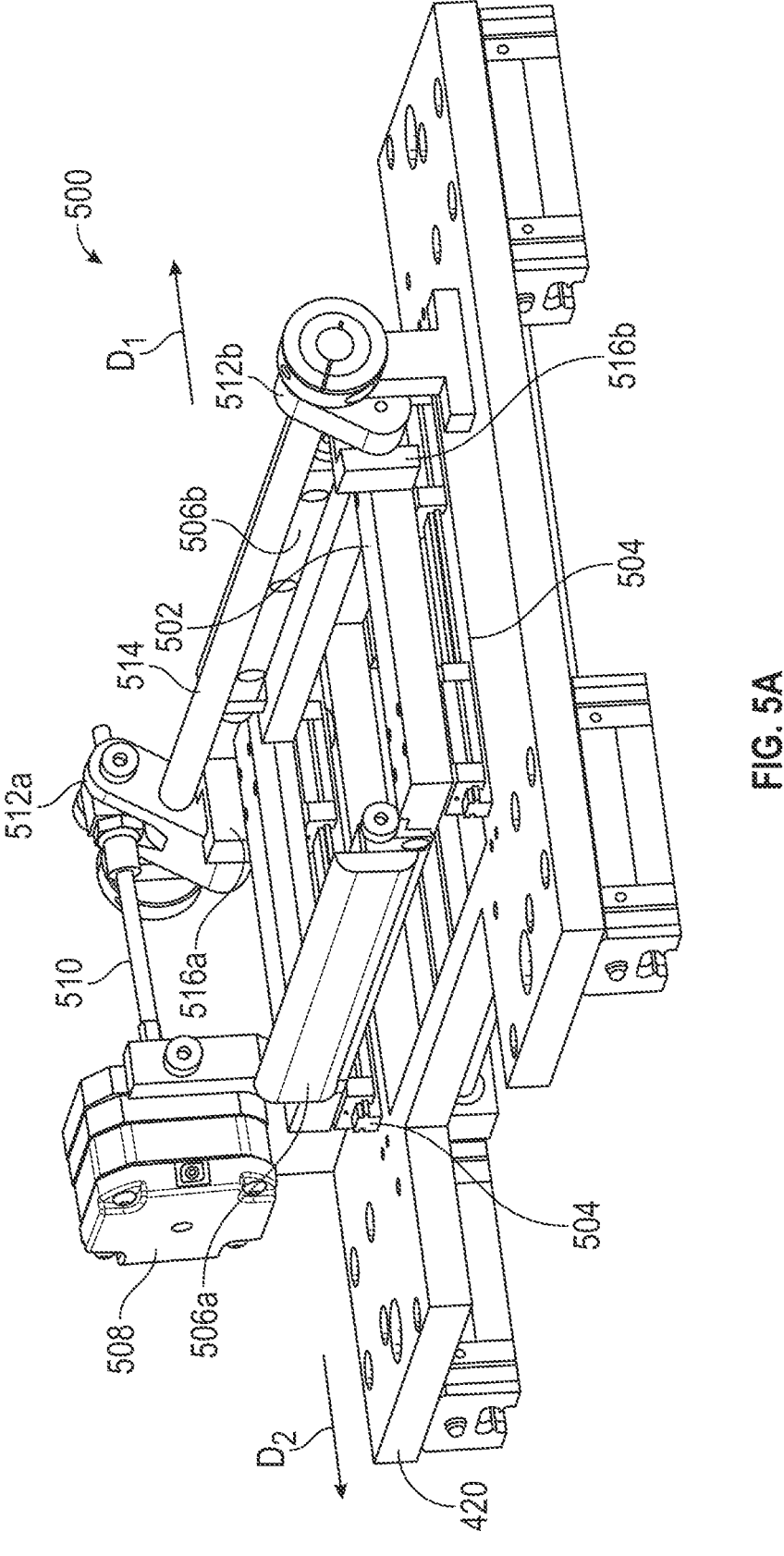
FIG. 5A is a perspective view of a backstop mechanism configured in accordance with embodiments of the present technology.
Figure 5B:
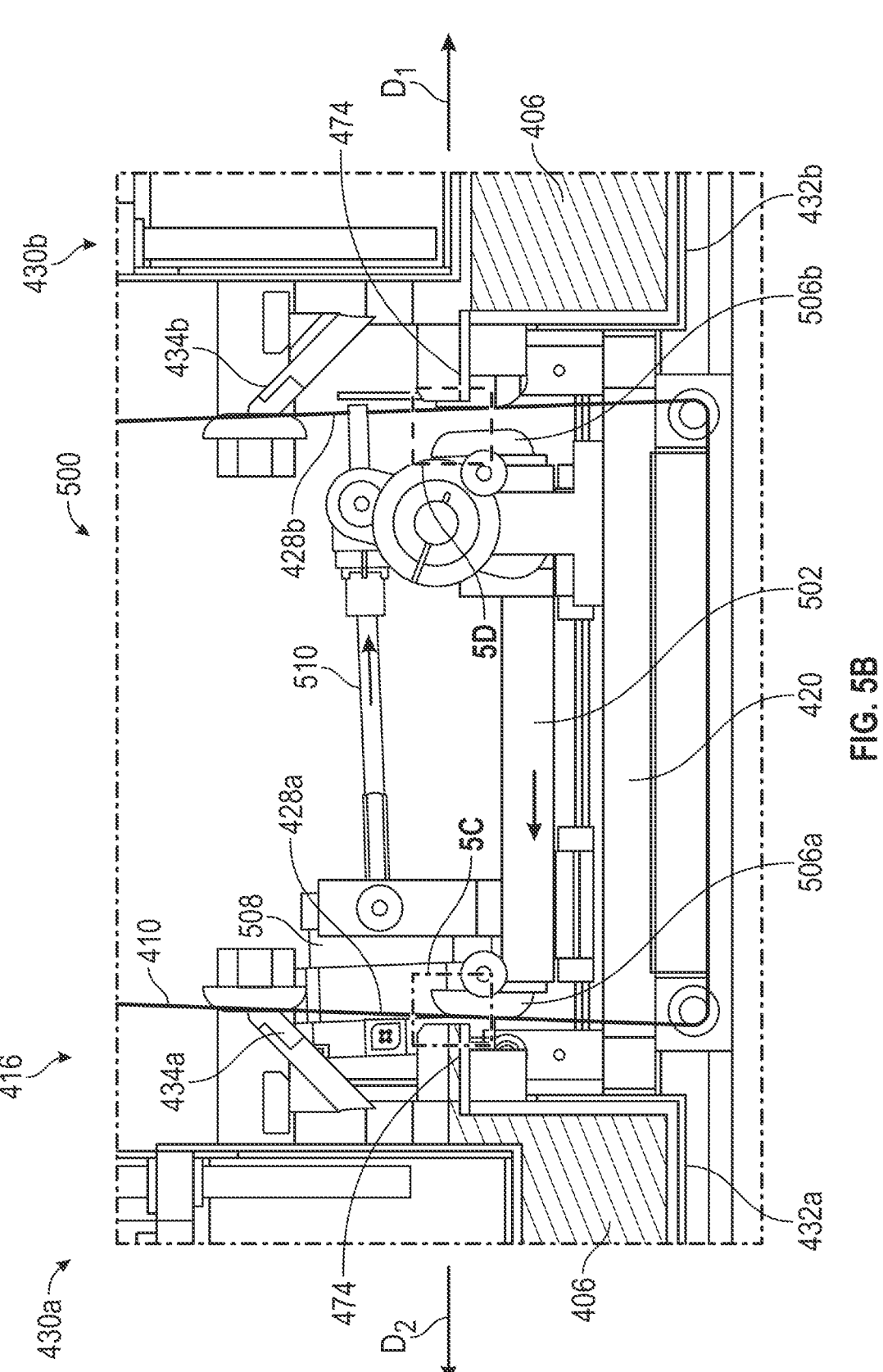
FIG. 5B is a cross-sectional side view of the backstop mechanism of FIG. 5A in a first configuration, together with a portion of the printer carriage of the system of FIG. 4A.
Figure 5C:
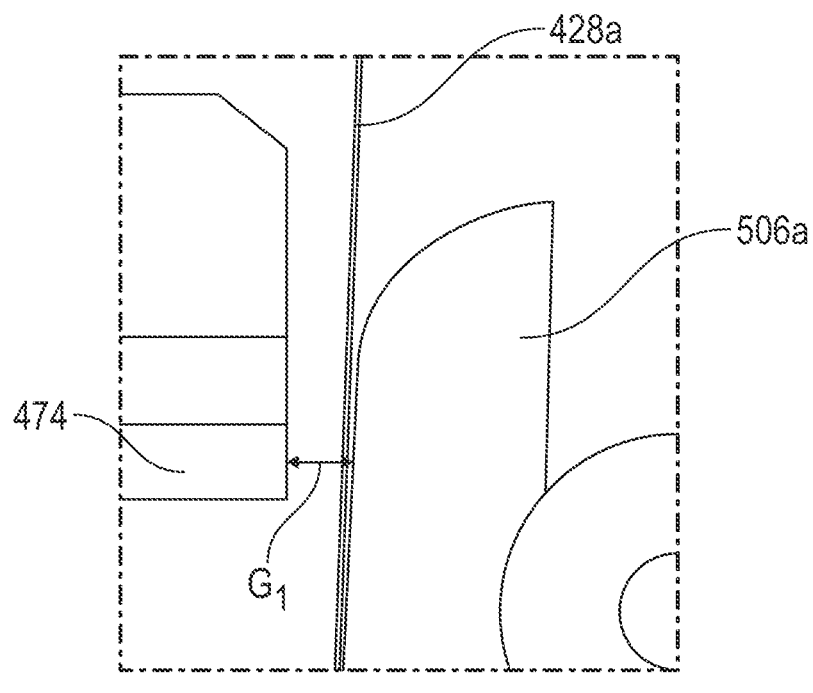
FIG. 5C is a closeup view of a portion of FIG. 5B.

FIGS. 5A-5C illustrate a backstop mechanism 500 that may be incorporated in the system 400 of FIGS. 4A-4D (the backstop mechanism 500 is not shown in FIG. 4C for purposes of clarity). For example, the backstop mechanism 500 can be used to control the distance between the flexible substrate 410, the first recoater 430a, and the second recoater 430b.

FIG. 5A is a perspective view of the backstop mechanism 500. The backstop mechanism 500 includes a backstop carriage 502 that is slidably mounted on the frame 420 of the printer carriage 416 via a pair of rails 504. The backstop carriage 502 includes a first backstop 506a and a second backstop 506b at opposite sides of the backstop carriage 502. The first and second backstops 506a, 506b can be elongate members (e.g., bumpers, bars, struts, rollers) configured to contact the flexible substrate 410, as described further below. As shown in FIG. 5A, the first and second backstops 506a, 506b can have rounded surfaces to avoid puncturing or otherwise damaging the flexible substrate 410.

The backstop mechanism 500 can include an actuator 508 (e.g., a stepper motor) coupled to the backstop carriage 502 to control the movement of the backstop carriage 502. In the illustrated embodiment, for example, the backstop carriage 502 can be moved relative to the frame 420 in the first direction $D_1$ and the second direction $D_2$. The actuator 508 can be coupled to the backstop carriage 502 via a lead screw 510. The use of a lead screw 510 can be beneficial for preventing the backstop carriage 502 from moving backward under the load applied to the backstop carriage 502 by the precursor material 406 on the flexible substrate 410.

The lead screw 510 can be pivotally coupled to a first drive pivot 512a. When driven by the actuator 508, the lead screw 510 moves the first drive pivot 512a, which in turn pushes on a first drive block 516a attached to a side (e.g., back side) of the backstop carriage 502. The first drive pivot 512a can be coupled to a second drive pivot 512b at the opposite side (e.g., front side) of the backstop carriage 502 via a drive shaft 514. Thus, the second drive pivot 512b can move concurrently with the first drive pivot 512a to push on a second drive block 516b attached to the backstop carriage 502. The forces applied by the first and second drive pivots 512a, 512b to the first and second drive blocks 516a, 516b can move the backstop carriage 502, and thus, the first and second back stops 506a, 506b, laterally relative to the frame 420.

FIG. 5B is a cross-sectional side view of the backstop mechanism 500 together with a portion of the printer carriage 416. In FIG. 5B, the backstop mechanism 500 is in a first configuration in which the backstop carriage 502 is shifted in the second direction $D_2$ toward the first recoater 430a and away from the second recoater 430b (e.g., by using the actuator 508 to drive the lead screw 510 along the first direction $D_1$). Accordingly, the first backstop 506a moves toward the first recoater 430a and the second backstop 506b moves away from the second recoater 430b.

In the first configuration, the first backstop 506a engages the inner surface of the first intermediate region 428a of the flexible substrate 410 to reduce the distance between the first intermediate region 428a and the first reservoir 432a of the first recoater 430a. Specifically, as best seen in FIG. 5C, the first backstop 506a can maintain a first gap distance $G_1$ between the tip of the shelf 474 of the first reservoir 432a and the adjacent surface of the first intermediate region 428a. The first gap distance $G_1$ can be the same as or similar to (e.g., within 10%) within a targeted layer thickness for the precursor material 406 on the flexible substrate 410. For example, the first gap distance $G_1$ can be no more than 10 mm, 5 mm, 4 m, 3 mm, 2 mm, 1 mm, 900 μm, 800 μm, 700 μm, 600 μm, 500 μm, 400 μm, 300 μm, 200 μm, or 100 μm. Additionally, the first backstop 506a can prevent the first intermediate region 428a from being pushed backwards (e.g., in the first direction $D_1$) by the force of the precursor material 406 flowing out of the first reservoir 432a.

Figure 5D:
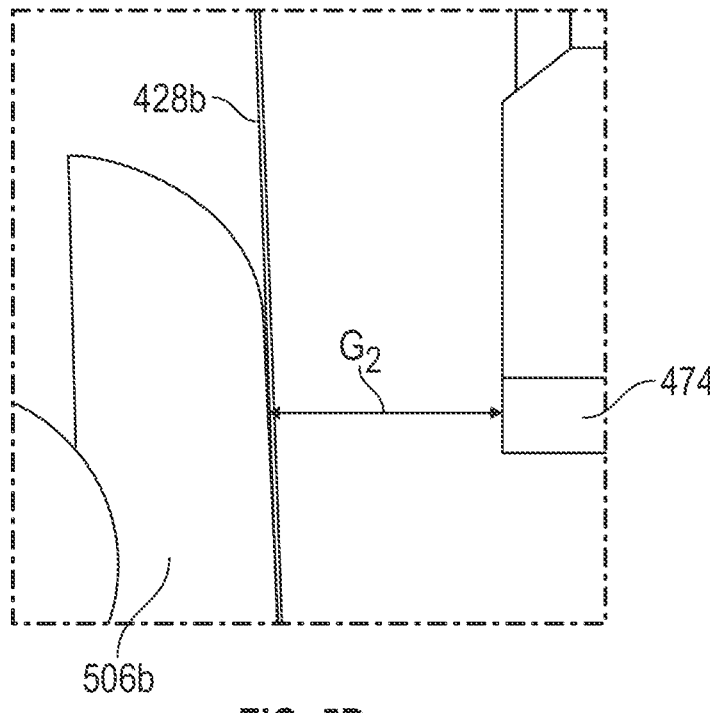
FIG. 5D is a closeup view of a portion of FIG. 5B.

When the backstop mechanism 500 is in the first configuration, the second backstop 506b can increase the distance between the second intermediate region 428b of the flexible substrate 410 and the second reservoir 432b of the second recoater 430b. Specifically, as best seen in FIG. 5D, the second backstop 506b can create a second, larger gap distance $G_2$ between the tip of the shelf 474 of the second reservoir 432b and the adjacent surface of the second intermediate region 428b. The second gap distance $G_2$ can be sufficiently large so the shelf 474 of the second reservoir 432b does not contact the remaining precursor material 406 on the second intermediate region 428b, thus allowing the second decoater 434b to scrape off the remaining precursor material 406 into the second reservoir 432b. For example, the second gap distance $G_2$ can be at least 500 μm, 1 mm, 2 mm, 3 mm, 4 mm, 5 mm, 10 mm, 20 mm, or 50 mm.

25

26

Figure 5E:
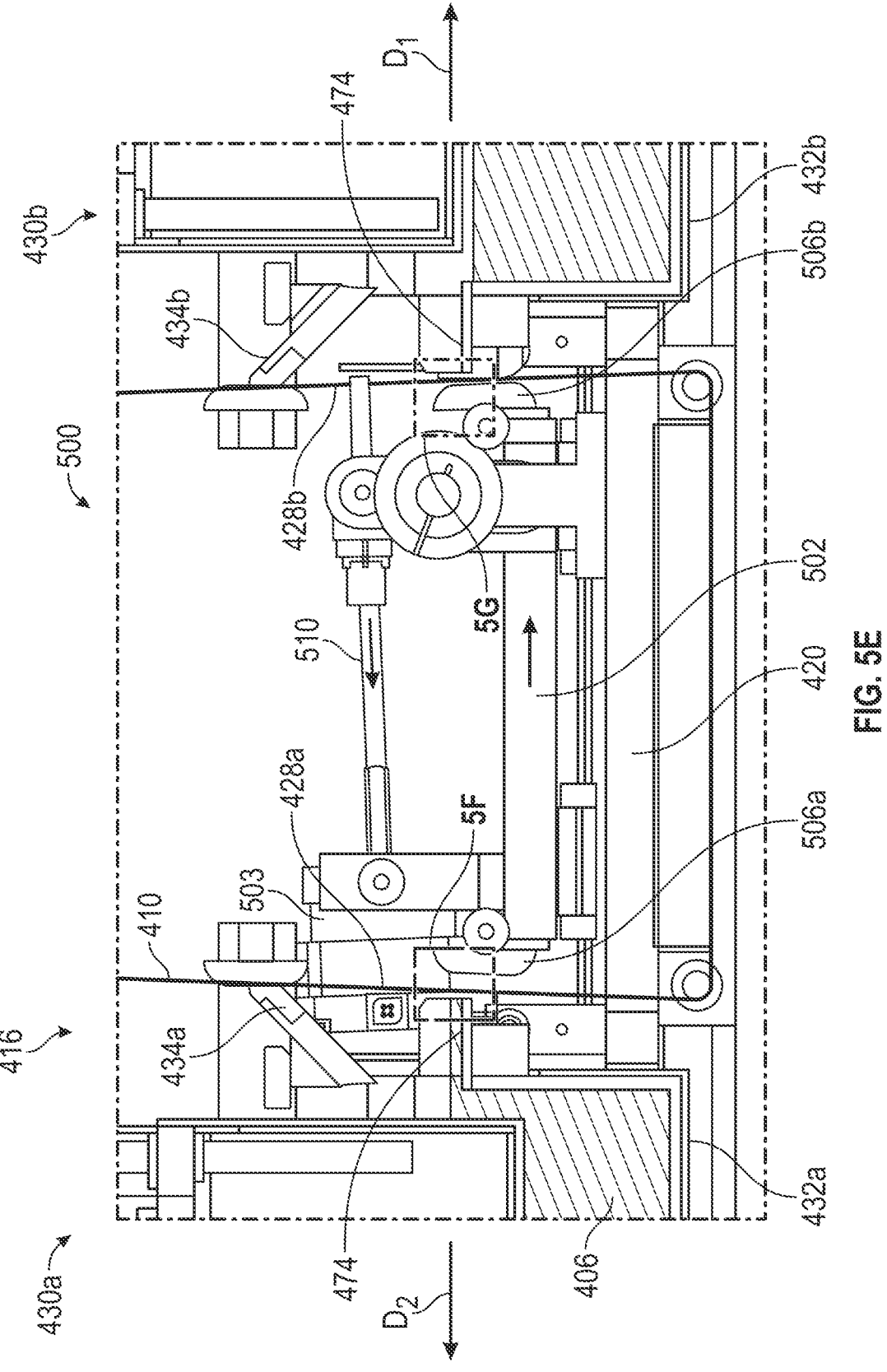
FIG. 5E is a cross-sectional side view of the backstop mechanism of FIG. 5A in a second configuration, together with a portion of the printer carriage of the system of FIG. 4A.
Figure 5F:
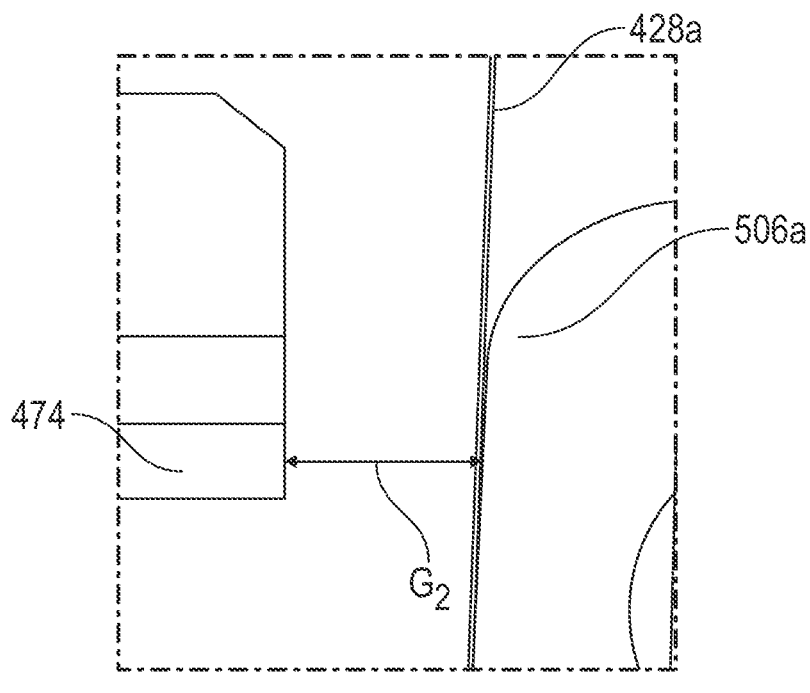
FIG. 5F is a closeup view of a portion of FIG. 5E.
Figure 5G:
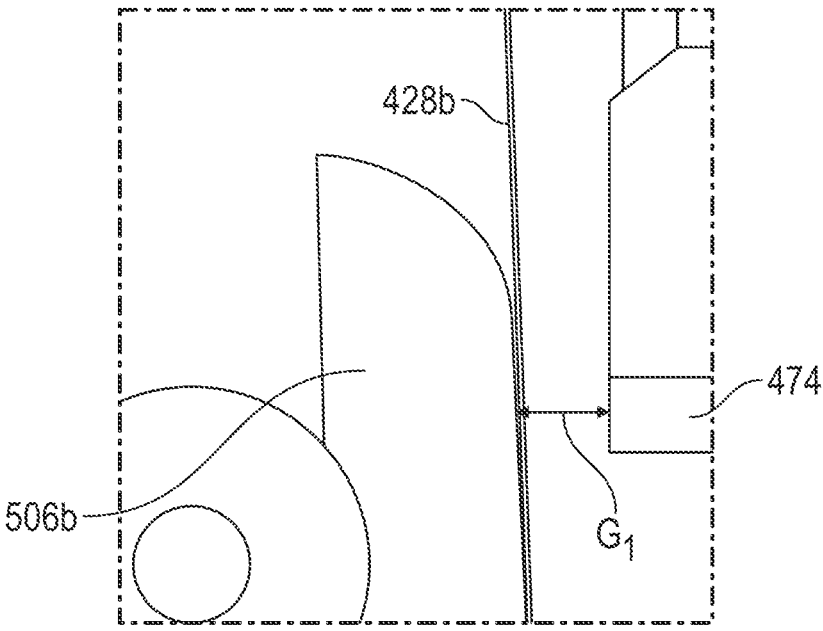
FIG. 5G is a closeup view of a portion of FIG. 5E.

FIG. 5E is a cross-sectional side view of the backstop mechanism 500 together with a portion of the printer carriage 416. In FIG. 5E, the backstop mechanism 500 is in a second configuration in which the backstop carriage 502 is shifted in the first direction $D_1$ toward the second recoater 430b and away from the first recoater 430a (e.g., by using the actuator 508 to drive the lead screw 510 along the second direction D 2). Accordingly, the first backstop 506a moves away from the first recoater 430a and the second backstop 506b moves toward the second recoater 430b. In the second configuration, the second backstop 506b engages the inner surface of the second intermediate region 428b of the flexible substrate 410 to reduce the distance between the tip of the shelf 474 of the second reservoir 432b and the adjacent surface of the second intermediate region 428b to the first gap distance $G_1$ (FIG. 5G). Conversely, the tip of the shelf 474 of the first reservoir 432a becomes separated from the adjacent surface of the first intermediate region 428a by the second, larger gap distance $G_2$ (FIG. 5F).

The movement of the backstop mechanism 500 can be coordinated with the movement of the printer carriage 416 (e.g., via a controller of the system 400). For example, when the printer carriage 416 is moving in the first direction $D_1$, the backstop mechanism 500 can be moved toward the second recoater 430b (which is applying precursor material 406 to the flexible substrate 410) and away from the first recoater 430a (which is removing precursor material 406 from the flexible substrate 410). When the printer carriage 416 is moving in the second direction $D_2$, the backstop mechanism 500 can be moved toward the first recoater 430a (which is applying precursor material 406 to the flexible substrate 410) and away from the idle second recoater 430b (which is removing precursor material 406 from the flexible substrate 410).

Figure 6A:
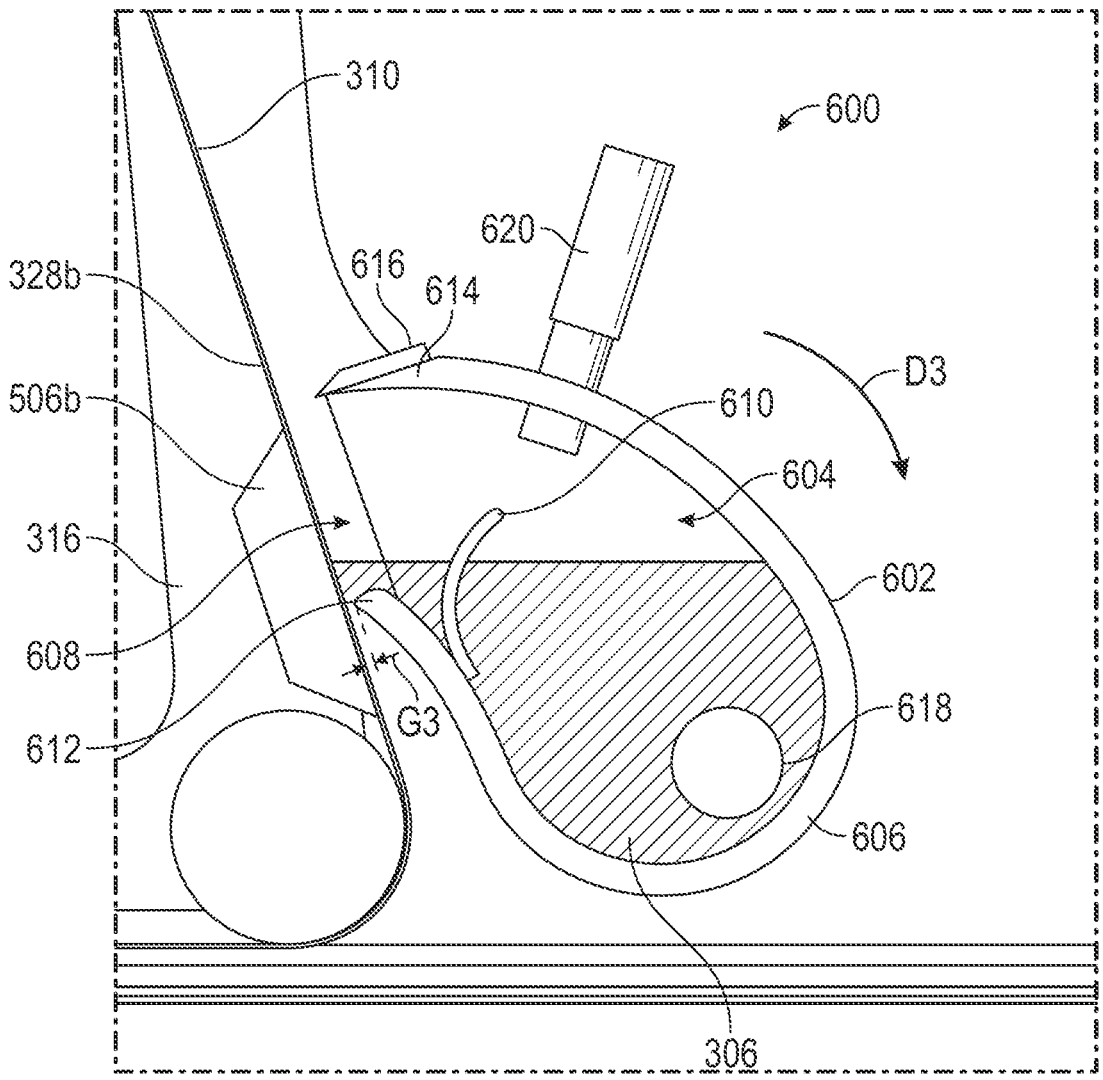
FIG. 6A is a cross-sectional side view of a recoater in an active configuration, in accordance with embodiments of the present technology.
Figure 6B:
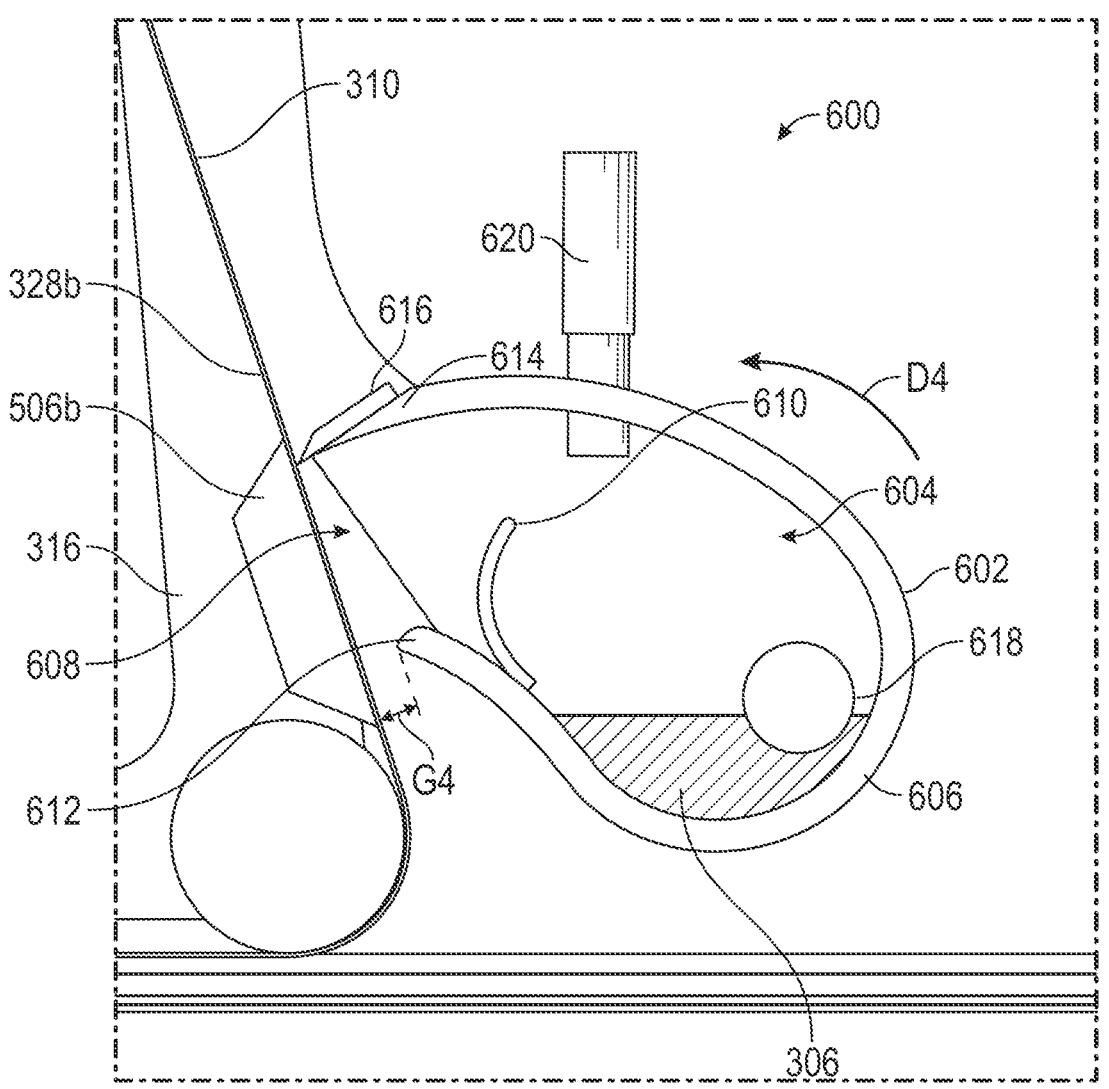
FIG. 6B is a cross-sectional side view of the recoater of FIG. 6A in an idle configuration.

FIGS. 6A and 6B are cross-sectional side views of a recoater 600 configured in accordance with embodiments of the present technology. Although the recoater 600 is described in connection with the components of the system 300 of FIGS. 3A-3H, this is not intended to be limiting, and the recoater 600 can be used with any of the other systems described herein, such as the system 400 of FIGS. 4A-4D. For example, the recoater 600 can be used as an alternative or in addition to any of the other embodiments of recoaters described herein.

Referring first to FIG. 6A, the recoater 600 includes a reservoir 602 having an internal cavity 604 configured to hold a precursor material 306. In the illustrated embodiment, the reservoir 602 has a curved housing 606 with an ovoid shape. Alternatively, the housing 606 can have a different shape, such as spheroid, oblong, cylindrical, rectangular, or any other suitable geometry. In some embodiments, the reservoir 602 has a relatively compact size, which can be beneficial for reducing the overall footprint of the recoater 600. For example, the reservoir 602 can have a volume less than or equal to 500 mL, 200 mL, 100 mL, 50 mL, 20 mL, or 10 mL.

The housing 606 includes an opening 608 (e.g., aperture, window, hole) that allows the precursor material 306 to flow out of the cavity 604 and onto the adjacent surface of the flexible substrate 310 (e.g., onto the second intermediate region 328b). Optionally, the reservoir 602 can include a filter 610 (e.g., a mesh, screen, porous material) to capture debris and/or other contaminants in the precursor material 306. The filter 610 can be positioned within the cavity 604 proximate to the opening 608 such that any precursor material 306 exiting the reservoir 602 passes through the filter 610 before being deposited onto the flexible substrate 310.

In some embodiments, the housing 606 includes a lower lip 612 and an upper lip 614 that at least partially surround and define the opening 608. The lower lip 612 can be located at the bottom portion of the opening 608 and can be positioned proximate to the flexible substrate 310 when the recoater 600 is mounted to the printer carriage 316. The lower lip 612 can be configured to direct the precursor material 306 onto the flexible substrate 310 in a thin, uniform layer when the recoater 600 is active, as described further below. The upper lip 614 can include a decoater 616 (e.g., scraper, blade). Although the decoater 616 is illustrated as being a discrete component that is coupled to the upper lip 614, in other embodiments, the decoater 616 can be integrated into the upper lip 614 (e.g., the upper lip 614 itself serves as the decoater 616). The decoater 616 can be used to remove the precursor material 306 from the flexible substrate 310 when the recoater 600 is idle, as described further below.

Optionally, the reservoir 602 can include a port 618 formed in the housing 606 and fluidly coupled to the cavity 604. The port 618 can be coupled to a source of the precursor material 306 (e.g., via tubing, channels, nozzles—not shown), such that the precursor material 306 can be introduced into the reservoir 602 and/or withdrawn from the reservoir 602 via the port 618. The level of precursor material 306 within the reservoir 602 can be controlled by a fill control mechanism (e.g., a pump—not shown) that drives the precursor material 306 from the source into the reservoir 602, and/or from the reservoir 602 back into the source, depending on whether the recoater 600 is currently active or idle, as described further below.

In some embodiments, the level of precursor material 306 within the reservoir 602 is controlled based on sensor data generated by a fill sensor 620 (e.g., optical sensor, ultrasonic sensor, contact sensor). For example, as shown in FIG. 6A, the fill sensor 620 can be coupled to an upper portion of the housing 606, and can include a portion within the cavity 604 and a portion exterior to the housing 606 (e.g., to facilitate coupling to a controller). In other embodiments, the fill sensor 620 can be positioned differently, e.g., coupled to a lower portion of the housing 606, contained entirely within the housing 606, etc.

In some embodiments, the recoater 600 is pivotally coupled to the printer carriage 316, such that the recoater 600 can be moved between an active configuration (FIG. 6A) and an idle configuration (FIG. 6B) by tilting the recoater 600. The tilting of the recoater 600 can be actuated by a motor or other suitable actuator operably coupled to the recoater 600 (not shown).

For example, the recoater 600 can be moved to the active configuration shown in FIG. 6A by rotating the recoater 600 along direction $D_3$ (e.g., a clockwise direction), thus moving the lower lip 612 of the reservoir 602 toward the flexible substrate 310, while moving the upper lip 614 of the reservoir 602 away from the flexible substrate 310. When the recoater 600 is in the active configuration, the lower lip 612 can be spaced apart from the adjacent surface of the flexible substrate 310 by a first gap distance $G_3$. The first gap distance $G_3$ can be the same as or similar to (e.g., within 10%) within a targeted layer thickness for the precursor material 306 on the flexible substrate 310. For example, the first gap distance $G_3$ can be no more than 10 mm, 5 mm, 4 m, 3 mm, 2 mm, 1 mm, 900 μm, 800 μm, 700 μm, 600 μm, 500 μm, 400 μm, 300 μm, 200 μm, or 100 μm. Optionally, a backstop (e.g., second backstop 506*b*) can be positioned against the opposite surface of the flexible substrate 310 to prevent the flexible substrate 310 from being pushed backwards by the precursor material 306, as described elsewhere herein.

When the recoater 600 is in the active configuration, the fill control mechanism can pump precursor material 306 into the reservoir 602 via the port 618 until the level of the precursor material 306 reaches a predetermined threshold value (e.g., greater than or equal to the height of the lower lip 612), based on data from the fill sensor 620. Accordingly, the precursor material 306 can flow out of the cavity 604, over the lower lip 612, and onto the surface of the flexible substrate 310. As the precursor material 306 flows out of the reservoir 602, the fill control mechanism can regulate the amount and rate of precursor material 306 entering the reservoir 602 based on the sensor data to maintain a consistent level of the precursor material 306, and thus, a substantially constant flow rate out of the reservoir 602.

Referring next to FIG. 6B, when the recoater 600 is idle, the recoater 600 can be rotated in the opposite direction $D_4$ (e.g., counterclockwise), thus moving the lower lip 612 away from the flexible substrate 310, while moving the upper lip 614 toward the flexible substrate 310. When the recoater 600 is in the idle configuration, the lower lip 612 can be spaced apart from the adjacent surface of the flexible substrate 310 by a second, greater gap distance $G_4$. The second gap distance $G_4$ can be sufficiently large so the lower lip 612 does not contact the precursor material 306 on the flexible substrate 310. For example, the second gap distance $G_4$ can be at least 500 μm, 1 mm, 2 mm, 3 mm, 4 mm, 5 mm, 10 mm, 20 mm, or 50 mm.

When the recoater 600 is in the idle configuration, the decoater 616 can be proximate to or in contact with the surface of the flexible substrate 310. Accordingly, when the flexible substrate 310 is advanced past the decoater 616, the decoater 616 can scrape any remaining precursor material 306 off the flexible substrate 310 and into the cavity 604 of the reservoir 602. Concurrently, the fill control mechanism can monitor the level of precursor material 306 within the reservoir 602 via the fill sensor 620. If the level is nearing or exceeding a predetermined value (e.g., the height of the lower lip 612), the fill control mechanism can pump the precursor material 306 out of the reservoir 602 via the port 618 to prevent the reservoir 602 from overflowing.

In some embodiments, the present technology provides systems, methods, and devices suitable for fabricating an object from a plurality of different materials (e.g., at least two, three, four, five, or more different materials). The materials can differ from each other with respect to composition, curing conditions (e.g., curing energy wavelength), material properties before curing (e.g., viscosity), material properties after curing (e.g., stiffness, strength, transparency), and so on. Accordingly, the resulting object can have a plurality of object portions that differ from each other with respect to at least one material property, such as one or more of the following: modulus (e.g., elastic modulus, flexural modulus, storage modulus), glass transition temperature, elongation to break, elongation to yield, strength, solubility, hardness, scratch resistance, roughness, degradability, color, refractive index, energy absorption, energy dissipation, energy reflection, energy scatter, transparency, diffusion, pH, porosity, morphology, chemical composition, molecular recognition, molecular absorption, molecular release, phase separation, morphology, durability, etc.

Figure 7:
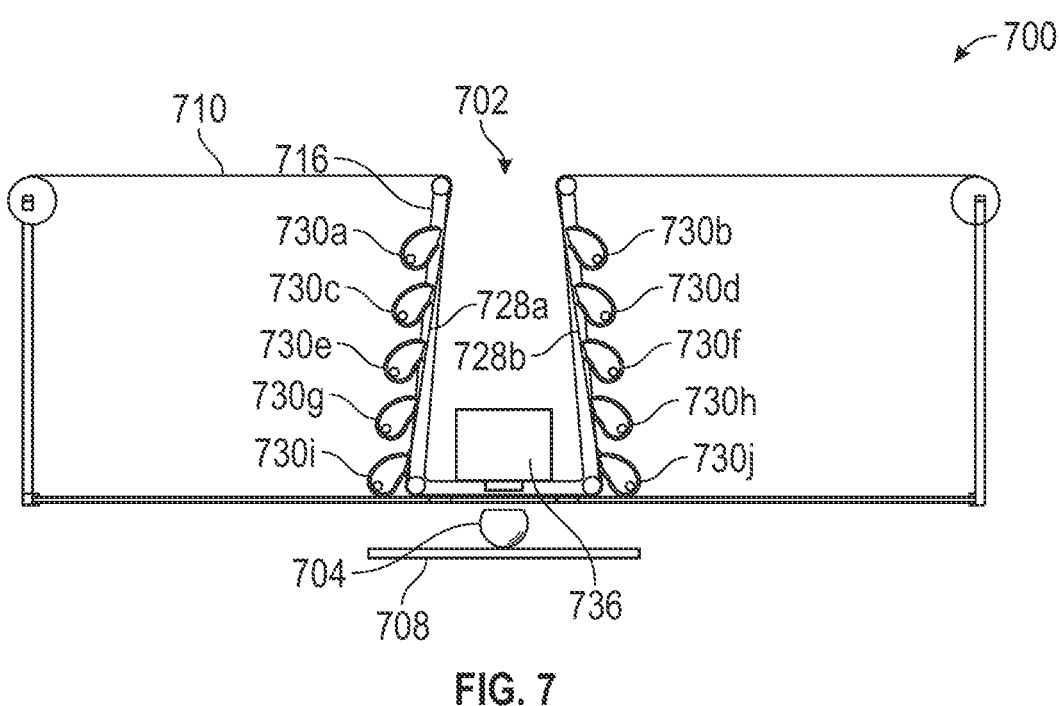
FIG. 7 is a simplified side view of an additive manufacturing system configured to form an object from multiple precursor materials, in accordance with embodiments of the present technology.
Figure 8:
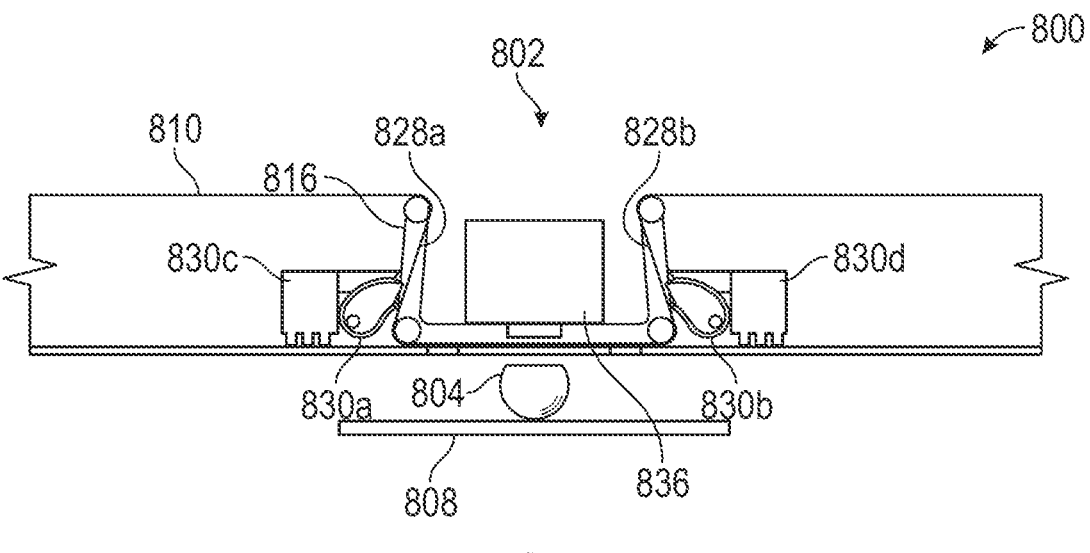
FIG. 8 is a simplified side view of another additive manufacturing system configured to form an object from multiple precursor materials, in accordance with embodiments of the present technology.

FIGS. 7 and 8 illustrate additive manufacturing systems 700, 800 configured to form objects from multiple types of materials. The components and operation of the systems 700, 800 can be identical or generally similar to the other embodiments described herein (e.g., the system 300 of FIGS. 3A-3H and/or the system 400 of FIGS. 4A-4D). Accordingly, like numbers (e.g., flexible substrate 310 versus flexible substrate 710) are used to identify similar or identical structures, and the following discussion of the systems 700, 800 of FIGS. 7 and 8 will focus on those features that differ from the previously described embodiments. Additionally, any of the features described in connection with the systems 700, 800 of FIGS. 7 and 8 can be combined with each other, and/or can be incorporated into the system 300 of FIGS. 3A-3H and/or the system 400 of FIGS. 4A-4D, and vice-versa.

FIG. 7 is a simplified side view of an additive manufacturing system ("system 700") configured to form an object from multiple precursor materials, in accordance with embodiments of the present technology (selected components of the system 700 are omitted from FIG. 7 merely for purposes of simplicity). The system 700 includes a printer assembly 702 with a movable printer carriage 716 that supports a plurality of recoater sets. Each recoater set includes a first recoater at a first (e.g., left) side of the printer carriage 716, and a second recoater at a second (e.g., right) side of the printer carriage 716. In the illustrated embodiment, for example, the printer carriage 716 includes five recoater sets: a first recoater set with a first recoater 730*a* and a second recoater 730*b*, a second recoater set with a first recoater 730*c* and a second recoater 730*d*, a third recoater set with a first recoater 730*e* and a second recoater 730*f*, a fourth recoater set with a first recoater 730*g* and a second recoater 730*h*, and a fifth recoater set with a first recoater 730*i* and a second recoater 730*j*. In other embodiments, the system 700 can include a different number of recoater sets (e.g., two, three, four, six, seven, eight, nine, ten, or more). Additionally, although the recoaters 730*a*-730*j* are each depicted as being similar to the recoater 600 of FIGS. 6A and 6B, in other embodiments, some or all of the recoaters 730*a*-730*j* can be configured differently (e.g., similar to the recoaters 430*a*, 430*b* of FIGS. 4A-4D).

The recoater sets can be arranged vertically along the printer carriage 716, with each recoater adjacent to a corresponding section of the first intermediate region 728*a* or second intermediate region 728*b* of the flexible substrate 710. In some embodiments, the recoaters within a set are positioned at the same height on the printer carriage 716, e.g., the first recoater 730*a* of the first recoater set is at the same vertical position as the second recoater 730*b* of the first recoater set. In other embodiments, however, the recoaters within a set can be positioned at different heights on the printer carriage 716.

At least some or all of the recoater sets can be configured to apply a different type of precursor material to the flexible substrate 710 to form a portion of the object 704 on the build platform 708. For example, the first recoater set can apply a first precursor material, the second recoater set can apply a second precursor material, the third recoater set can apply a third precursor material, etc. Each precursor material can be cured or otherwise solidified by the energy produced by the energy source 736 to form a respective portion of the object 704, in accordance with the techniques described elsewhere herein.

In some embodiments, only one of the recoater sets is active at a time to deposit the respective precursor material to the flexible substrate 710, while the remaining recoater sets are inactive and do not apply material to or remove material from the flexible substrate 710. For example, when the first recoater set is active, the recoaters 730a, 730b can alternate between applying and removing the first precursor material depending on the direction of motion of the printer carriage 716, as described elsewhere herein. The recoaters 730c-730j of the inactive recoater sets can be moved away from the flexible substrate 710 so that the precursor materials within the recoaters 730c-730j are not deposited onto the flexible substrate 710 and/or the current precursor material on the flexible substrate 710 does not enter the recoaters.

The active recoater set can be switched to change the type of precursor material that is currently in use. For example, to form a portion of the object 704 using the second precursor material, the recoaters 730a, 730b of the first recoater set can be moved away from the flexible substrate 710, and the recoaters 730c, 730d of the second recoater set can be moved toward the flexible substrate 710. This process can be repeated with different recoater sets to incrementally build up the object 704 from multiple materials.

FIG. 8 is a side view of another additive manufacturing system ("system 800") configured to form an object from a plurality of different precursor materials, in accordance with embodiments of the present technology. The system 800 includes a printer assembly 802 with a movable printer carriage 816 that supports a pair of recoaters 830a, 830b. Although the recoaters 830a, 830b are each depicted as being similar to the recoater 600 of FIGS. 6A and 6B, in other embodiments, the recoaters 830a, 830b can be configured differently (e.g., similar to the recoaters 430a, 430b of FIGS. 4A-4D). The recoaters 830a, 830b can be configured to apply a first precursor material to the flexible substrate 810, in accordance with the techniques described elsewhere herein.

The printer carriage 816 can also support at least one deposition device for applying at least one additional precursor material to the flexible substrate 810 for forming a portion of the object 804. The at least one additional precursor material can be different from the first precursor material provided by the recoaters 830a, 830b. The additional precursor material(s) can be any suitable type of material, such as a fluid (e.g., resin, ink), a solid (e.g., filament, powder), or suitable combinations thereof (e.g., a suspension of particles in a fluid medium). In the illustrated embodiment, the printer carriage 816 includes a first deposition device 830c at a first (e.g., left) side and a second deposition device 830d at a second (e.g., right side). The deposition devices 830c, 830d can alternatingly apply a second precursor material onto the respective intermediate regions 828a, 828b of the flexible substrate 810, which is then cured or otherwise solidified by the energy source 836 to form a corresponding object portion on the build platform 808. The deposition devices 830c, 830d can each be configured to deposit the same type of precursor material, or can be configured to deposit different precursor materials.

In some embodiments, the deposition devices 830c, 830d form portions of the object 804 using a different additive manufacturing technique than the technique used with the recoaters 830a, 830b. For example, the recoater 830a, 830b can be used to form a first one or more object portions via a photopolymerization technique (e.g., stereolithography, digital light processing), and one or both of the deposition devices 830c, 830d can be used to form a second one or more object portions via a different technique, such as material jetting or fused deposition modeling.

Although FIG. 8 illustrates two deposition devices 830c, 830d, in other embodiments, the system 800 can include a different number of deposition devices (e.g., one, three, four, five, or more). In embodiments where multiple deposition devices are present, some or all of the deposition devices can deposit the same type of precursor material, and/or some or all of the deposition devices can deposit different types of materials. Additionally, some or all of the deposition devices can use the same type of additive manufacturing technique, and/or some or all of the deposition devices can use different additive manufacturing techniques.

Figure 9A:
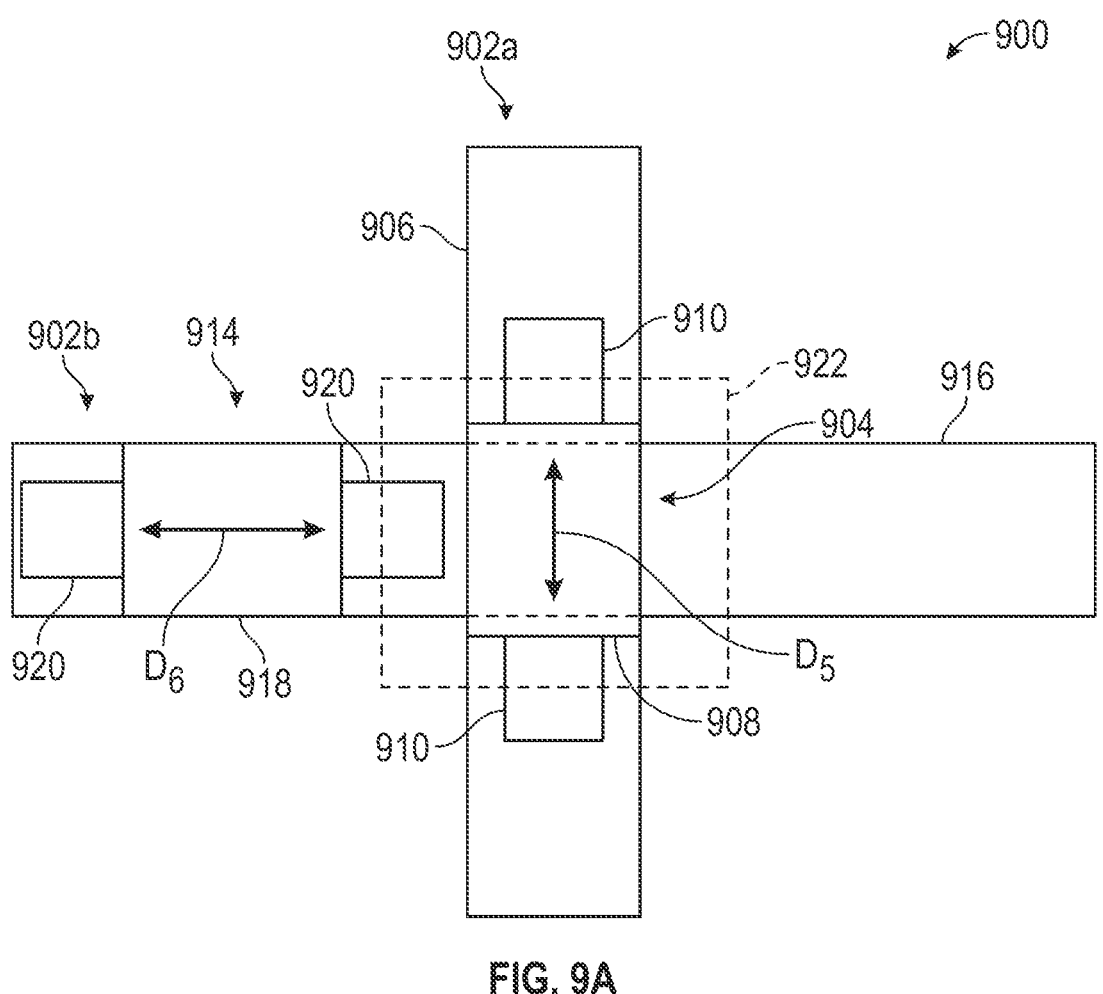
FIG. 9A is a partially schematic top view of another additive manufacturing system configured to form objects from multiple precursor materials, in accordance with embodiments of the present technology.

FIG. 9A is a partially schematic top view of another additive manufacturing system ("system 900") configured to form objects from multiple types of materials. The system 900 includes a first subsystem 902a configured to form one or more portions of an object from a first precursor material, and a second subsystem 902b configured to form one or more portions of the object from a second, different precursor material. The first and second subsystems 902a, 902b, can be identical or generally similar to the other systems described herein (e.g., the system 300 of FIGS. 3A-3H, the system 400 of FIGS. 4A-4D, the system 700 of FIG. 7, and/or the system 800 of FIG. 8). Accordingly, any of the features described in connection with the systems 300, 400, 700, and 800 can be incorporated into the first subsystem 902a and/or the second subsystem 902b, and vice-versa.

The first subsystem 902a includes a first printer assembly 904 coupled to a first flexible substrate 906. The first printer assembly 904 includes a first printer carriage 908 with a set of first recoaters 910. The first printer carriage 908 can move relative to the first flexible substrate 906 along movement directions $D_5$. The second subsystem 902b includes a second printer assembly 914 coupled to a second flexible substrate 916. The second printer assembly 914 includes a second printer carriage 918 with a set of second recoaters 920. The second printer carriage 918 can move relative to the second flexible substrate 916 along movement directions $D_6$.

As shown in FIG. 9A, the first subsystem 902a can be arranged relative to the second subsystem 902b such that the first flexible substrate 906 (and thus, the movement path of the first printer carriage 908) is at an angle to the second flexible substrate 916 (and the movement path of the second printer carriage 918). For example, the angle can be at least 10°, 20°, 30°, 40°, 45°, 50°, 60°, 70°, 80°, or 90°. The first subsystem 902a and second subsystem 902b can overlap each other at a build platform 922, such that both subsystems 902a, 902b can print onto the build platform 922, in accordance with the techniques described elsewhere herein.

Figure 9B:
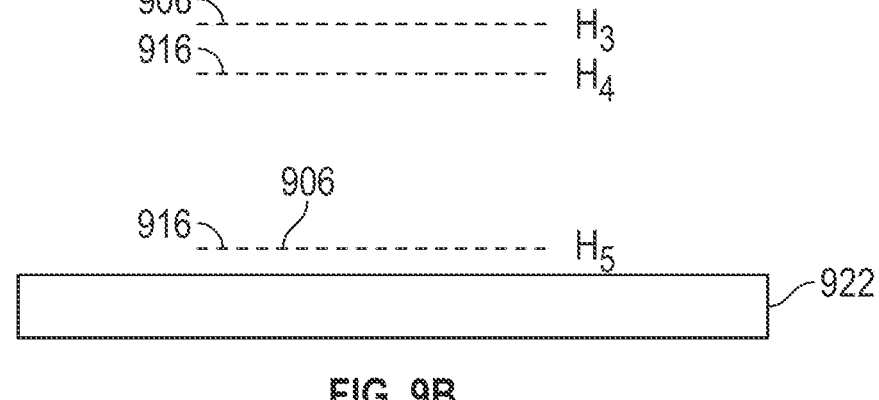
FIG. 9B is a schematic diagram illustrating the relative heights of selected components of the system of FIG. 9A.

FIG. 9B is a schematic diagram illustrating the relative heights of the first flexible substrate 906, the second flexible substrate 916, and the build platform 922. In the illustrated embodiment, the idle regions of the first flexible substrate 906 are at a vertical position $H_3$, while the idle regions of the second flexible substrate 916 are at a lower vertical position $H_4$. Accordingly, the first flexible substrate 906 of the first subsystem 902a can pass over the second flexible substrate 916 of the second subsystem 902b, thus allowing the first and second subsystems 902a, 902b to overlap each other at the build platform 922. The active regions of the first flexible substrate 906 and the second flexible substrate 916 can both be at a displaced vertical position $H_5$ proximate to the build platform 922 to allow the first and second subsystems 902a, 902b to form portions of the object on the build platform 922 with the same layer thickness. In other embodiments, however, the active region of the first flexible substrate 906 can be at a different (e.g., higher or lower) vertical position than the active region of the second flexible substrate 916. In such embodiments, the first subsystem 902a can produce a different layer thickness than the second subsystem 902b, or the spacing between the build platform 922 and the active region to accommodate a uniform layer thickness.

Referring again to FIG. 9A, the first and second subsystems 902a, 902b can be used to sequentially deposit different precursor materials on the build platform 922. For example, when forming an object portion from the first precursor material of the first subsystem 902a, the second printer carriage 918 of the second subsystem 902b can be moved away from the build platform 922, thus clearing a movement path for the first printer carriage 908 to operate, as shown in FIG. 9A. Conversely, when forming an object portion from the second precursor material of the second subsystem 902b, the first printer carriage 908 of the first subsystem 902a can be moved away from the build platform 922, thus clearing a movement path for the second printer carriage 918 to operate.

Optionally, the system 900 can be modified to include at least one additional subsystem (e.g., one, two, three, or more additional subsystems) that prints using at least one additional precursor material. The at least one additional subsystem can overlap with the first and second subsystems 902a, 902b at the build platform 922, and can have a flexible substrate that passes under the first flexible substrate 906 and the second flexible substrate 916.

Figure 10:
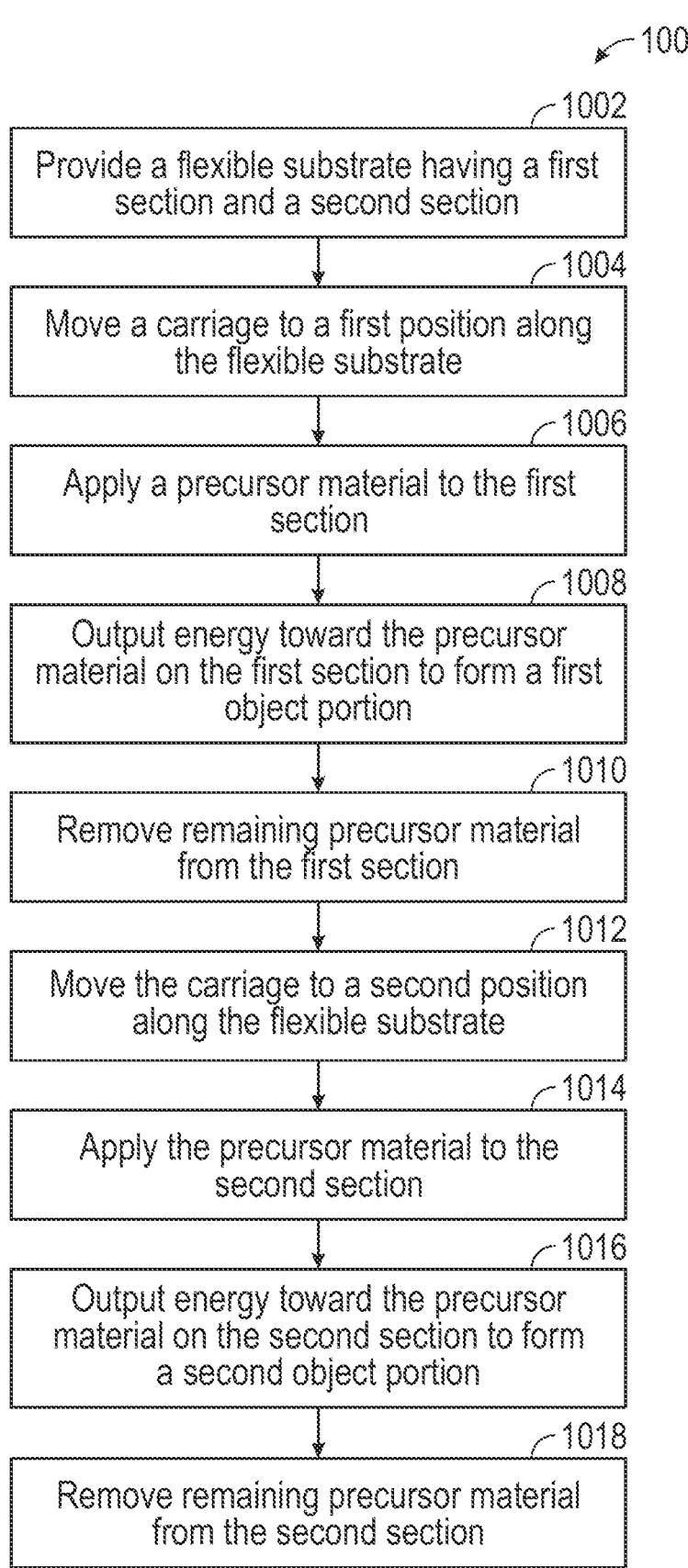
FIG. 10 is a flow diagram illustrating a method for fabricating an object, in accordance with embodiments of the present technology.

FIG. 10 is a flow diagram illustrating a method 1000 for fabricating an object, in accordance with embodiments of the present technology. Although the method 1000 is described below in connection with the components of the system 300 of FIGS. 3A-3H, the method 1000 can be performed using any embodiment of the systems and devices described herein (e.g., the system 400 of FIGS. 4A-4D, the system 700 of FIG. 7, the system 800 of FIG. 8, and/or the system 900 of FIGS. 9A and 9B). In some embodiments, some or all of the steps of the method 1000 are implemented as computer-readable instructions (e.g., program code) that are configured to be executed by one or more processors of a computing device, such as the controller 348 of the system 300 of FIGS. 3A-3H.

The method 1000 begins at block 1002 with providing a flexible substrate having a first section and a second section. The flexible substrate can be a film, sheet, strip, tape, or any other element suitable for carrying a precursor material on a surface thereof. For example, the flexible substrate can be the flexible substrate 310 of FIGS. 3A-3H, including the first section 352 and the second section 354.

At block 1004, the method 1000 can include moving a carriage to a first position along the flexible substrate. The carriage can be a movable printer carriage of an additive manufacturing system, such as the printer carriage 316 of FIGS. 3A-3H. In some embodiments, the carriage is coupled to the flexible substrate via one or more rollers (e.g., the rollers 322), such that the carriage can move laterally relative to the flexible substrate. The rollers can allow the flexible substrate to slide along the carriage as the carriage moves, thus moving the first and second sections through a plurality of different functional regions.

In some embodiments, the first and second sections are both initially in an idle region of the flexible substrate (e.g., first idle region 326a or second idle region 326b), and are both at an initial vertical position (e.g., height Hi) away from a build platform (e.g., build platform 308). When the carriage moves toward the first position, the first section can advance along the carriage into an active region (e.g., active region 324). When in the active region, the first section can be displaced to a lower vertical position (e.g., height H 2) adjacent or proximate to the build platform.

At block 1006, the method 1000 can include applying a precursor material to the first section. In some embodiments, the precursor material is applied to the first section while the carriage is moving toward the first position, and while the first section is passing through an intermediate region (e.g., intermediate region 328a or intermediate region 328b) between the idle region and the active region. When the first section is at the intermediate region, the first section can be angled to allow the precursor material to flow onto an upper surface of the first section by gravity. In some embodiments, the precursor material is applied to the first section via a recoater (e.g., the first recoater 330a or the second recoater 330b). The recoater can be configured to deposit the precursor material onto the first section in a thin, substantially uniform layer. The precursor material can be carried proximate to the build platform as the first section advances to the active region, as described above.

At block 1008, the method 1000 can continue with outputting energy toward the precursor material on the first section to form a first object portion. The energy can be directed to the precursor material while the first section is in the active region proximate to the build platform. The energy can cure or otherwise solidify at least some of the precursor material into a geometry corresponding to the geometry of the first object portion. The solidified precursor material can adhere to the build platform (or to a previously formed portion of the object on the build platform). In some embodiments, the first object portion is formed while the carriage is moving, such that the energy output is synchronized with the movement of the carriage to produce the desired object geometry.

At block 1010, the method 1000 can continue with removing remaining precursor material from the first section. For example, continued movement of the carriage can cause the first section to move away from the from the active region and into an intermediate region (e.g., intermediate region 328a or intermediate region 328b), and any precursor material that was not cured by the energy can be carried by the first section into the intermediate region. As the first section passes through the intermediate region, the remaining precursor material can be scraped from the surface of the first section by a decoater (e.g., the decoater 334a or decoater 334b). The removed material can be reused in the same manufacturing process or a different manufacturing process, or can be discarded.

At block 1012, the method 1000 can include moving the carriage to a second position along the flexible substrate. For example, when the carriage moves toward the second position, the second section can advance along the carriage into the active region (e.g., active region 324) and be displaced to the lower vertical position (e.g., height H 2) adjacent or proximate to the build platform. Concurrently, the first section can advance out of the active region and into an idle region (e.g., first idle region 326a or second idle region 326b) and thus revert to the initial, higher vertical position (e.g., height Hi) away from the build platform.

At block 1014, the method 1000 can include applying the precursor material to the second section. The process of block 1014 can be generally similar to the process of block 1006 described above.

At block 1016, the method 1000 can include outputting energy toward the precursor material on the second section to form a second object portion. The process of block 1016 can be generally similar to the process of block 1008 described above.

At block 1018, the method 1000 can continue with removing remaining precursor material from the second section. The process of block 1018 can be generally similar to the process of block 1010 described above.

In some embodiments, some of the processes of the method 1000 can be performed concurrently with each other. For example, the processes of blocks 1006, 1008, and/or 1010 can be performed concurrently with the process of block 1004; and/or the processes of blocks 1014, 1016, and/or 1018 can be performed concurrently with the process of block 1012.

III. Dental Appliances and Associated Methods

Figure 11A:
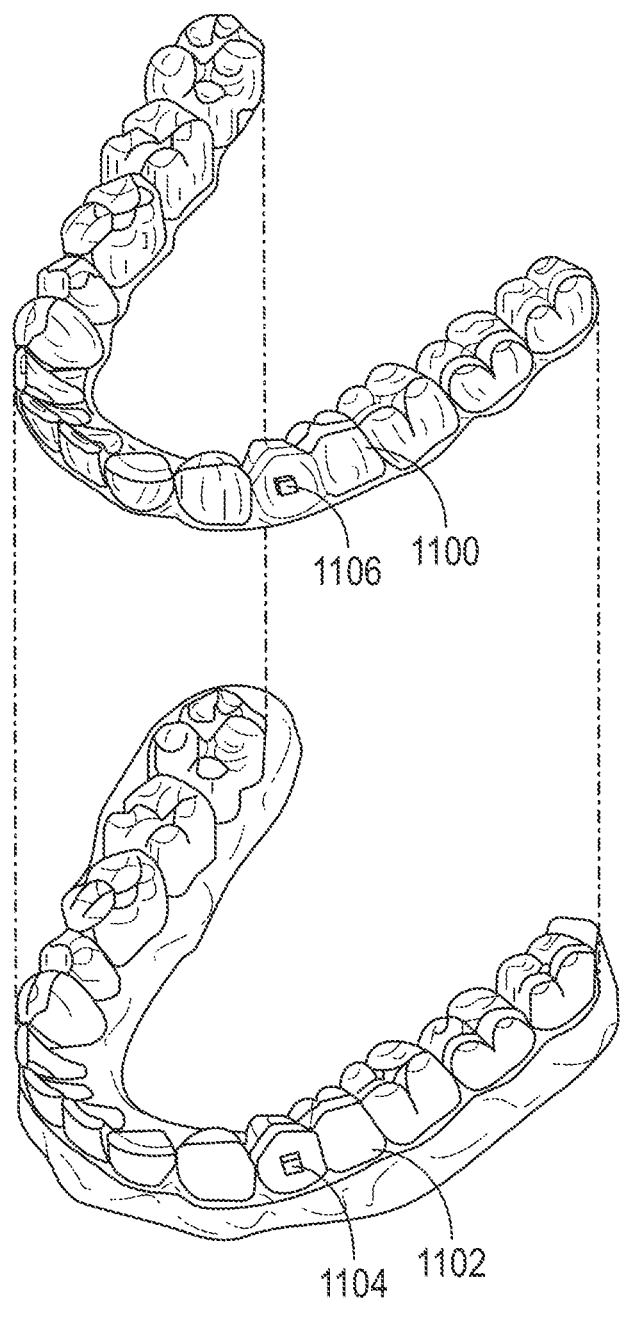
FIG. 11A illustrates a representative example of a tooth repositioning appliance configured in accordance with embodiments of the present technology.

FIG. 11A illustrates a representative example of a tooth repositioning appliance 1100 configured in accordance with embodiments of the present technology. The appliance 1100 can be manufactured and post-processed using any of the systems, methods, and devices described herein. The appliance 1100 (also referred to herein as an "aligner") can be worn by a patient in order to achieve an incremental repositioning of individual teeth 1102 in the jaw. The appliance 1100 can include a shell (e.g., a continuous polymeric shell or a segmented shell) having teeth-receiving cavities that receive and resiliently reposition the teeth. The appliance 1100 or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using additive manufacturing techniques, from a digital model of an appliance.

The appliance 1100 can fit over all teeth present in an upper or lower jaw, or less than all of the teeth. The appliance 1100 can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance 1100 can be a generic appliance configured to receive the teeth, but not necessarily shaped to match the topography of the patient's teeth. In some cases, only certain teeth received by the appliance 1100 are repositioned by the appliance 1100 while other teeth can provide a base or anchor region for holding the appliance 1100 in place as it applies force against the tooth or teeth targeted for repositioning. In some cases, some, most, or even all of the teeth can be repositioned at some point during treatment. Teeth that are moved can also serve as a base or anchor for holding the appliance as it is worn by the patient. In preferred embodiments, no wires or other means are provided for holding the appliance 1100 in place over the teeth. In some cases, however, it may be desirable or necessary to provide individual attachments 1104 or other anchoring elements on teeth 1102 with corresponding receptacles 1106 or apertures in the appliance 1100 so that the appliance 1100 can apply a selected force on the tooth. Representative examples of appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 11B:
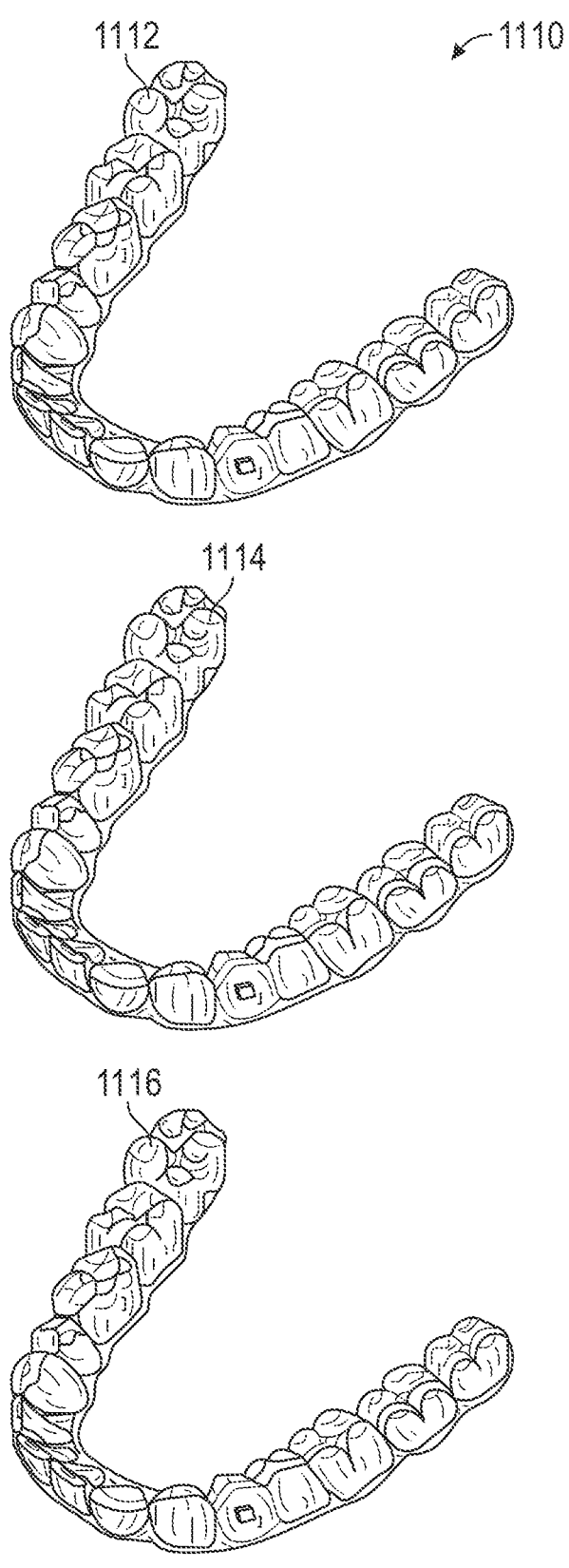
FIG. 11B illustrates a tooth repositioning system including a plurality of appliances, in accordance with embodiments of the present technology.

FIG. 11B illustrates a tooth repositioning system 1110 including a plurality of appliances 1112, 1114, 1116, in accordance with embodiments of the present technology.

Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 1110 can include a first appliance 1112 corresponding to an initial tooth arrangement, one or more intermediate appliances 1114 corresponding to one or more intermediate arrangements, and a final appliance 1116 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 11C:
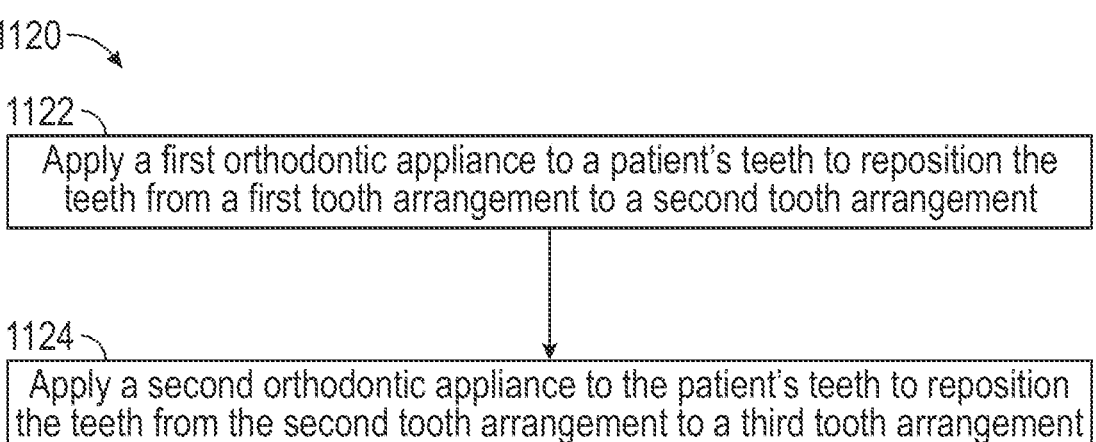
FIG. 11C illustrates a method of orthodontic treatment using a plurality of appliances, in accordance with embodiments of the present technology.

FIG. 11C illustrates a method 1120 of orthodontic treatment using a plurality of appliances, in accordance with embodiments of the present technology. The method 1120 can be practiced using any of the appliances or appliance sets described herein. In block 1122, a first orthodontic appliance is applied to a patient's teeth in order to reposition the teeth from a first tooth arrangement to a second tooth arrangement. In block 1124, a second orthodontic appliance is applied to the patient's teeth in order to reposition the teeth from the second tooth arrangement to a third tooth arrangement. The method 1120 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

FIG. 12 illustrates a method 1200 for designing an orthodontic appliance, in accordance with embodiments of the present technology. The method 1200 can be applied to any embodiment of the orthodontic appliances described herein. Some or all of the steps of the method 1200 can be performed by any suitable data processing system or device, e.g., one or more processors configured with suitable instructions.

In block 1202, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 1204, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

Determination of the force system can be performed in a variety of ways. For example, in some embodiments, the force system is determined on a patient-by-patient basis, e.g., using patient-specific data. Alternatively or in combination, the force system can be determined based on a generalized model of tooth movement (e.g., based on experimentation, modeling, clinical data, etc.), such that patient-specific data is not necessarily used. In some embodiments, determination of a force system involves calculating specific force values to be applied to one or more teeth to produce a particular movement. Alternatively, determination of a force system can be performed at a high level without calculating specific force values for the teeth. For instance, block 1204 can involve determining a particular type of force to be applied (e.g., extrusive force, intrusive force, translational force, rotational force, tipping force, torquing force, etc.) without calculating the specific magnitude and/or direction of the force.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients can require lower forces to expand the suture than older patients, as the suture has not yet fully formed.

In block 1206, a design for an orthodontic appliance configured to produce the force system is determined. The design can include the appliance geometry, material composition and/or material properties, and can be determined in various ways, such as using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the Auto-CAD® software products available from Autodesk, Inc., of San Rafael, CA. For creating finite element models and analyzing them, program products from a number of vendors can be used, including finite element analysis packages from ANSYS, Inc., of Canonsburg, PA, and SIMULIA (Abaqus) software products from Dassault Systèmes of Waltham, MA.

Optionally, one or more designs can be selected for testing or force modeling. As noted above, a desired tooth movement, as well as a force system required or desired for eliciting the desired tooth movement, can be identified. Using the simulation environment, a candidate design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In block 1208, instructions for fabrication of the orthodontic appliance incorporating the design are generated. The instructions can be configured to control a fabrication system or device in order to produce the orthodontic appliance with the specified design. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Although the above steps show a method 1200 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 1200 may be performed with any suitable fabrication system or device, such as the embodiments described herein. Some of the steps may be optional, e.g., the process of block 1204 can be omitted, such that the orthodontic appliance is designed based on the desired tooth movements and/or determined tooth movement path, rather than based on a force system. Moreover, the order of the steps can be varied as desired.

FIG. 13 illustrates a method 1300 for digitally planning an orthodontic treatment and/or design or fabrication of an appliance, in accordance with embodiments. The method

1300 can be applied to any of the treatment procedures described herein and can be performed by any suitable data processing system.

In block 1302, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 1304, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 1306, at least one orthodontic appliance is fabricated based on the generated treatment stages. For example, a set of appliances can be fabricated, each shaped according to a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 13, design and/or fabrication of an orthodontic appliance, and perhaps a particular orthodontic treatment, may include use of a representation of the patient's teeth (e.g., including receiving a digital representation of the patient's teeth (block 1302)), followed by design and/or fabrication of an orthodontic appliance based on a representation of the patient's teeth in the arrangement represented by the received representation.

As noted herein, the techniques described herein can be used for the direct fabrication of dental appliances, such as aligners and/or a series of aligners with tooth-receiving cavities configured to move a person's teeth from an initial arrangement toward a target arrangement in accordance with a treatment plan. Aligners can include mandibular repositioning elements, such as those described in U.S. Pat. No. 10,912,629, entitled "Dental Appliances with Repositioning Jaw Elements," filed Nov. 30, 2015; U.S. Pat. No. 10,537, 406, entitled "Dental Appliances with Repositioning Jaw Elements," filed Sep. 19, 2014; and U.S. Pat. No. 9,844,424, entitled "Dental Appliances with Repositioning Jaw Elements," filed Feb. 21, 2014; all of which are incorporated by reference herein in their entirety.

The techniques used herein can also be used to manufacture attachment placement devices, e.g., appliances used to position prefabricated attachments on a person's teeth in accordance with one or more aspects of a treatment plan. Examples of attachment placement devices (also known as "attachment placement templates" or "attachment fabrication templates") can be found at least in: U.S. application Ser. No. 17/249,218, entitled "Flexible 3D Printed Orthodontic Device," filed Feb. 24, 2021; U.S. application Ser. No. 16/366,686, entitled "Dental Attachment Placement Structure," filed Mar. 27, 2019; U.S. application Ser. No. 15/674,662, entitled "Devices and Systems for Creation of Attachments," filed Aug. 11, 2017; U.S. Pat. No. 11,103, 330, entitled "Dental Attachment Placement Structure," filed Jun. 14, 2017; U.S. application Ser. No. 14/963,527, entitled "Dental Attachment Placement Structure," filed Dec. 9, 2015; U.S. application Ser. No. 14/939,246, entitled "Dental Attachment Placement Structure," filed Nov. 12, 2015; U.S. application Ser. No. 14/939,252, entitled "Dental Attachment Formation Structures," filed Nov. 12, 2015; and U.S. Pat. No. 9,700,385, entitled "Attachment Structure," filed Aug. 22, 2014; all of which are incorporated by reference herein in their entirety.

The techniques described herein can be used to make incremental palatal expanders and/or a series of incremental palatal expanders used to expand a person's palate from an initial position toward a target position in accordance with one or more aspects of a treatment plan. Examples of incremental palatal expanders can be found at least in: U.S. application Ser. No. 16/380,801, entitled "Releasable Palatal Expanders," filed Apr. 10, 2019; U.S. application Ser. No. 16/022,552, entitled "Devices, Systems, and Methods for Dental Arch Expansion," filed Jun. 28, 2018; U.S. Pat. No. 11,045,283, entitled "Palatal Expander with Skeletal Anchorage Devices," filed Jun. 8, 2018; U.S. application Ser. No. 15/831,159, entitled "Palatal Expanders and Methods of Expanding a Palate," filed Dec. 4, 2017; U.S. Pat. No. 10,993,783, entitled "Methods and Apparatuses for Customizing a Rapid Palatal Expander," filed Dec. 4, 2017; and U.S. Pat. No. 7,192,273, entitled "System and Method for Palatal Expansion," filed Aug. 7, 2003; all of which are incorporated by reference herein in their entirety.

EXAMPLES

The following examples are included to further describe some aspects of the present technology, and should not be used to limit the scope of the technology.

Example 1. A system for fabricating an object, the system comprising:

a flexible substrate configured to carry a precursor material;

a carriage coupled to the flexible substrate, wherein the carriage vertically displaces an active region of the flexible substrate away from a remaining region of the flexible substrate and toward a build platform;

an actuator configured to move the carriage relative to the flexible substrate, wherein a section of the flexible substrate corresponding to the active region changes as the carriage moves;

at least one recoater supported by the carriage and configured to apply the precursor material to the flexible substrate; and an energy source configured to output energy toward the precursor material at the active region of the flexible substrate to form a portion of an object on the build platform.

Example 2. The system of Example 1, wherein the flexible substrate comprises a film that is at least partially transparent to the energy.

Example 3. The system of Example 1 or 2, wherein:

the flexible substrate includes a first section and a second section, the carriage is movable between a first lateral position and a second lateral position, when the carriage is in the first lateral position, the active region comprises the first section and the remaining region comprises the second section, and when the carriage in the second lateral position, the active region comprises the second section and the remaining region comprises the first section.

Example 4. The system of any one of Examples 1 to 3, wherein the active region of the flexible substrate is at a first vertical position, and at least a portion of the remaining region of the flexible substrate is at a second vertical position different from the first vertical position.

Example 5. The system of any one of Examples 1 to 4, wherein:

the flexible substrate comprises a first end and a second opposite the first end, and the actuator is configured to move the carriage in (1) a first direction toward the first end of the flexible substrate and (2) a second direction toward the second end of the flexible substrate.

Example 6. The system of Example 5, wherein the first and second ends of the flexible substrate are stationary while the carriage moves.

Example 7. The system of Example 5 or 6, wherein the energy source is configured to output the energy while the carriage is moving in the first direction and while the carriage is moving in the second direction.

Example 8. The system of any one of Examples 5 to 7, wherein the carriage includes a first side portion oriented toward the first end of the flexible substrate, and a second side portion oriented toward the second end of the flexible substrate.

Example 9. The system of Example 8, wherein the at least one recoater comprises:

a first recoater coupled to the first side portion of the carriage, and a second recoater coupled to the second side portion of the carriage.

Example 10. The system of Example 9, wherein:

when the carriage is moving in the first direction, the second recoater applies the precursor material to the flexible substrate, and the first recoater removes remaining precursor material from the flexible substrate, and when the carriage is moving in the second direction, the first recoater applies the precursor material to the flexible substrate, and the second recoater removes remaining precursor material from the flexible substrate.

Example 11. The system of Example 9 or 10, wherein the first and second recoaters each include a reservoir configured to hold the precursor material.

Example 12. The system of Example 11, wherein the reservoir is spaced apart from the flexible substrate by a distance corresponding to a target layer thickness for the precursor material.

Example 13. The system of Example 12, further comprising a movable backstop configured to engage the flexible substrate to control the distance between each reservoir and the flexible substrate.

Example 14. The system of any one of Examples 11 to 13, wherein the reservoir is movable between a first configuration to apply the precursor material to the flexible substrate and a second configuration to remove the precursor material from the flexible substrate.

Example 15. The system of any one of Examples 11 to 14, wherein the first and second recoaters each include a sensor configured to monitor a level of the precursor material in the respective reservoir.

Example 16. The system of any one of Examples 9 to 15, wherein the first and second recoaters each include a decoater configured to remove remaining precursor material from the flexible substrate.

Example 17. The system of any one of Examples 8 to 16, wherein:

the carriage comprises a first upper roller, a second upper roller, a first lower roller, and a second lower roller, the first upper roller and the first lower roller are located at the first side portion of the carriage, and the second upper roller and the second lower roller are located at the second side portion of the carriage.

Example 18. The system of Example 17, wherein the active region of the flexible substrate extends between the first and second lower rollers.

Example 19. The system of any one of Examples 1 to 18, wherein the precursor material comprises a resin.

Example 20. The system of any one of Examples 1 to 19, further comprising at least one heating element configured to heat the precursor material.

Example 21. The system of any one of Examples 1 to 20, wherein the energy source is supported by the carriage.

Example 22. The system of any one of Examples 1 to 21, wherein the energy source comprises a light engine.

Example 23. The system of any one of Examples 1 to 22, wherein the energy is configured to at least partially cure the precursor material on the active region of the flexible substrate.

Example 24. The system of Example 23, wherein the movement of the carriage causes the partially cured precursor material to peel off from the active region.

Example 25. The system of any one of Examples 1 to 24, further comprising a controller configured to coordinate the energy output by the energy source with the movement of the carriage.

Example 26. The system of any one of Examples 1 to 25, further comprising a deposition device supported by the carriage, wherein the deposition device is configured to form a second portion of the object from a material different from the precursor material.

Example 27. The system of any one of Examples 1 to 26, wherein the object comprises a dental appliance.

Example 28. A method comprising:

providing a flexible substrate having a first section and a second section, wherein the first and second sections are each initially at a first vertical position;

moving a carriage to a first lateral position along the flexible substrate such that the carriage displaces the first section of the flexible substrate to a second vertical position proximate to a build platform;

outputting energy toward a precursor material on the first section of the flexible substrate to form a first portion of an object on the build platform;

moving the carriage to a second lateral position along the flexible substrate such that the carriage displaces the second section of the flexible substrate to the second vertical position, and the first section reverts to the first vertical position; and outputting the energy toward a precursor material on the second section of the flexible substrate to form a second portion of the object on the build platform.

Example 29. The method of Example 28, further comprising applying the precursor material to the first section of the flexible substrate via a reservoir coupled to the carriage.

Example 30. The method of Example 29, wherein applying the precursor material comprises:

sensing a level of the precursor material in the reservoir, and adjusting the level of the precursor material so the precursor material flows out of the reservoir and onto the first section of the flexible substrate.

Example 31. The method of Example 29 or 30, wherein applying the precursor material comprises tilting the reservoir so the precursor material flows out of the reservoir and onto the first section of the flexible substrate.

Example 32. The method of any one of Examples 29 to 31, further comprising controlling a thickness of the precursor material applied to the first section of the flexible substrate by adjusting a distance between the first section of the flexible substrate and the reservoir via a movable backstop.

Example 33. The method of any one of Examples 29 to 32, wherein the precursor material is applied while the carriage is moving toward the first lateral position.

Example 34. The method of any one of Examples 29 to 33, further comprising removing remaining precursor material from the first section of the flexible substrate after outputting the energy toward the precursor material on the first section of the flexible substrate.

Example 35. The method of Example 34, wherein the remaining precursor material is removed while the carriage is moving from the first lateral position toward the second lateral position.

Example 36. The method of Example 34 or 35, wherein the remaining precursor material is removed using a decoater.

Example 37. The method of Example 36, wherein the decoater is coupled to the reservoir.

Example 38. The method of Example 36, wherein the decoater is separate from the reservoir.

Example 39. The method of any one of Examples 34 to 38, wherein the precursor material is applied to the first section by a first recoater at a first side of the carriage, and the remaining precursor material is removed from the first section by a second recoater at a second side of the carriage opposite the first side.

Example 40. The method of any one of Examples 28 to 39, further comprising:

moving the carriage from the second lateral position to the first lateral position such that the carriage displaces the first section of the flexible substrate to the second vertical position, and the second section reverts to the first vertical position, and outputting the energy toward a precursor material on the first section of the flexible substrate to form a third portion of the object on the build platform.

Example 41. The method of any one of Examples 28 to 40, further comprising heating the precursor material.

Example 42. The method of Example 41, wherein the precursor material comprises a resin, and the resin is heated to a temperature configured to reduce a viscosity of the resin.

Example 43. The method of any one of Examples 28 to 42, further comprising replacing at least a portion of the flexible substrate with new substrate material while the carriage remains coupled to the flexible substrate.

Example 44. The method of any one of Examples 28 to 43, further comprising coordinating the outputting of the energy with the movement of the carriage.

Example 45. The method of any one of Examples 28 to 44, further comprising forming a third portion of the object from a material different from the precursor material.

Example 46. The method of Example 45, wherein the first and second portions are formed using a first additive manufacturing technique, and the third portion is formed using a second, different additive manufacturing technique.

Example 47. The method of Example 45, wherein the first, second, and third portions are formed using the same additive manufacturing technique.

Example 48. The method of any one of Examples 28 to 47, wherein the object comprises a dental appliance.

Example 49. A system for fabricating an object, the system comprising:

a processor; and a memory operably coupled to the processor and storing instructions that, when executed by the processor, cause the system to perform operations comprising:

moving a carriage to a first lateral position along a flexible substrate such that the carriage displaces a first section of the flexible substrate from a first vertical position to a second vertical position proximate to a build platform, outputting energy toward a precursor material on the first section of the flexible substrate to form a first portion of an object on the build platform, moving the carriage to a second lateral position along the flexible substrate such that the carriage displaces a second section of the flexible substrate from the first vertical position to the second vertical position, and the first section reverts to the first vertical position, and outputting the energy toward a precursor material on the second section of the flexible substrate to form a second portion of the object on the build platform.

Example 50. A non-transitory computer-readable storage medium comprising instructions that, when executed by one or more processors of a system for fabricating an object, cause the system to perform operations comprising:

moving a carriage to a first lateral position along a flexible substrate such that the carriage displaces a first section of the flexible substrate from a first vertical position to a second vertical position proximate to a build platform;

outputting energy toward a precursor material on the first section of the flexible substrate to form a first portion of an object on the build platform;

moving the carriage to a second lateral position along the flexible substrate such that the carriage displaces a second section of the flexible substrate from the first vertical position to the second vertical position, and the first section reverts to the first vertical position; and outputting the energy toward a precursor material on the second section of the flexible substrate to form a second portion of the object on the build platform.

CONCLUSION

Although many of the embodiments are described above with respect to systems, devices, and methods for manufacturing dental and orthodontic appliances, the technology is applicable to other applications and/or other approaches, such as other types of additively manufactured objects. Moreover, other embodiments in addition to those described herein are within the scope of the technology. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described above with reference to FIGS. 1-13.

The various processes described herein can be partially or fully implemented using program code including instructions executable by one or more processors of a computing system for implementing specific logical functions or steps in the process. The program code can be stored on any type of computer-readable medium, such as a storage device including a disk or hard drive. Computer-readable media containing code, or portions of code, can include any appropriate media known in the art, such as non-transitory computer-readable storage media. Computer-readable media can include volatile and non-volatile, removable and non-removable media implemented in any method or technology for storage and/or transmission of information, including, but not limited to, random-access memory (RAM), read-only memory (ROM), electrically erasable programmable read-only memory (EEPROM), flash memory, or other memory technology; compact disc read-only memory (CD-ROM), digital video disc (DVD), or other optical storage; magnetic cassettes, magnetic tape, magnetic disk storage, or other magnetic storage devices; solid state drives (SSD) or other solid state storage devices; or any other medium which can be used to store the desired information and which can be accessed by a system device.

The descriptions of embodiments of the technology are not intended to be exhaustive or to limit the technology to the precise form disclosed above. Where the context permits, singular or plural terms may also include the plural or singular term, respectively. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments.

As used herein, the terms "generally," "substantially," "about," and similar terms are used as terms of approximation and not as terms of degree, and are intended to account for the inherent variations in measured or calculated values that would be recognized by those of ordinary skill in the art.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded.

To the extent any materials incorporated herein by reference conflict with the present disclosure, the present disclosure controls.

It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A system for fabricating an object, the system comprising:

a flexible substrate configured to carry a precursor material;

a carriage coupled to the flexible substrate, wherein the carriage vertically displaces an active region of the flexible substrate downward and away from a remaining region of the flexible substrate and toward a build platform;

an actuator configured to move the carriage relative to the flexible substrate, wherein a section of the flexible substrate corresponding to the active region changes as the carriage moves;

at least one recoater supported by the carriage and configured to apply the precursor material to the flexible substrate; and an energy source configured to output energy toward the precursor material at the active region of the flexible substrate to form a portion of an object on the build platform, wherein the energy source is positioned above and directs the energy down toward the active region.

2. The system of claim 1, wherein the flexible substrate comprises a film that is at least partially transparent to the energy.

3. The system of claim 1, wherein:

the flexible substrate includes a first section and a second section, the carriage is movable between a first lateral position and a second lateral position, when the carriage is in the first lateral position, the active region comprises the first section and the remaining region comprises the second section, and when the carriage is in the second lateral position, the active region comprises the second section and the remaining region comprises the first section.

4. The system of claim 1, wherein the active region of the flexible substrate is at a first vertical position, and at least a portion of the remaining region of the flexible substrate is at a second vertical position different from the first vertical position.

5. The system of claim 1, wherein:

the flexible substrate comprises a first end and a second end opposite the first end, and the actuator is configured to move the carriage in (1) a first direction toward the first end of the flexible substrate and (2) a second direction toward the second end of the flexible substrate.

6. The system of claim 5, wherein the first and second ends of the flexible substrate are stationary while the carriage moves.

7. The system of claim 5, wherein the energy source is configured to output the energy while the carriage is moving in the first direction and while the carriage is moving in the second direction.

8. The system of claim 5, wherein the carriage includes a first side portion oriented toward the first end of the flexible substrate, and a second side portion oriented toward the second end of the flexible substrate.

9. The system of claim 8, wherein the at least one recoater comprises:

a first recoater coupled to the first side portion of the carriage, and a second recoater coupled to the second side portion of the carriage.

10. The system of claim 9, wherein:

when the carriage is moving in the first direction, the second recoater applies the precursor material to the flexible substrate, and the first recoater removes remaining precursor material from the flexible substrate, and when the carriage is moving in the second direction, the first recoater applies the precursor material to the flexible substrate, and the second recoater removes remaining precursor material from the flexible substrate.

11. The system of claim 9, wherein the first and second recoaters each include a reservoir configured to hold the precursor material.

12. The system of claim 11, wherein each reservoir is spaced apart from the flexible substrate by a distance corresponding to a target layer thickness for the precursor material.

13. The system of claim 12, further comprising a movable backstop configured to engage the flexible substrate to control the distance between each reservoir and the flexible substrate.

14. The system of claim 11, wherein each reservoir is movable between a first configuration to apply the precursor material to the flexible substrate and a second configuration to remove the precursor material from the flexible substrate.

15. The system of claim 11, wherein the first and second recoaters each include a sensor configured to monitor a level of the precursor material in the respective reservoir.

16. The system of claim 9, wherein the first and second recoaters each include a decoater configured to remove remaining precursor material from the flexible substrate.

17. The system of claim 1, wherein the energy source is supported by the carriage.

18. The system of claim 1, further comprising a controller configured to coordinate the energy output by the energy source with movement of the carriage.

19. The system of claim 1, further comprising a deposition device supported by the carriage, wherein the deposition device is configured to form a second portion of the object from a material different from the precursor material.

20. The system of claim 1, wherein the object comprises a dental appliance.

* * * * *